(12) United States Patent
Halgren et al.

(10) Patent No.: US 10,843,860 B2
(45) Date of Patent: Nov. 24, 2020

(54) RESEALABLE PACKAGE WITH IMPROVED CONTENTS ACCESSIBILITY

(71) Applicant: Intercontinental Great Brands LLC, East Hanover, NJ (US)

(72) Inventors: Kristi M. Halgren, East Hanover, NJ (US); Carole A. Vogt, East Hanover, NJ (US)

(73) Assignee: Intercontinental Great Brands LLC, East Hanover, NJ (US)

(*) Notice: Subject to any disclaimer, the term of this patent is extended or adjusted under 35 U.S.C. 154(b) by 637 days.

(21) Appl. No.: 15/525,890

(22) PCT Filed: Nov. 20, 2015

(86) PCT No.: PCT/US2015/061898
§ 371 (c)(1),
(2) Date: May 10, 2017

(87) PCT Pub. No.: WO2016/081851
PCT Pub. Date: May 26, 2016

(65) Prior Publication Data
US 2017/0355503 A1    Dec. 14, 2017

Related U.S. Application Data

(60) Provisional application No. 62/083,007, filed on Nov. 21, 2014.

(51) Int. Cl.
*B65D 75/58* (2006.01)
*B65D 77/00* (2006.01)
*B29C 65/76* (2006.01)

(52) U.S. Cl.
CPC .......... *B65D 75/5838* (2013.01); *B29C 65/76* (2013.01); *B65D 77/003* (2013.01)

(58) Field of Classification Search
CPC .... B65D 75/5838; B65D 77/003; B29C 65/76
(Continued)

(56) References Cited

U.S. PATENT DOCUMENTS 329,562 A    11/1885   Howe
876,808 A    1/1908    Kinert
(Continued)

FOREIGN PATENT DOCUMENTS

EP    1712488    10/2006
EP    1749756    2/2007
GB    365797     1/1932

OTHER PUBLICATIONS

International Search Report and Written Opinion of the International Searching Authority, dated Apr. 20, 2016, for International Application No. PCT/US2015/061898 (16 pgs.).

*Primary Examiner* — Chun Hoi Cheung
*Assistant Examiner* — Brijesh V. Patel
(74) *Attorney, Agent, or Firm* — Fitch, Even, Tabin & Flannery LLP

(57) ABSTRACT

A film package with a resealable access opening providing improved access to the package contents is provided. The film package may include a tray, frame, or other reinforcing structure containing or holding discrete articles disposed in a row, column, or array, a flexible film forming at least a top of the film package, an access opening disposed at least in the top defined by a cut in the film, and a sealing layer adhesively sealed to the film or a remainder of the film around the access opening. In one embodiment, the access cut forming the access opening into the film has an expanded portion that extends outward from the remainder of the access cut to facilitate easier removal of the discrete articles within the package. To further improve access, the tray may (Continued)

have an opening or window therein to permit the discrete articles to move longitudinally and/or laterally therein.

27 Claims, 50 Drawing Sheets

(58) Field of Classification Search
USPC ........ 221/63, 302, 303, 45, 46, 48; 229/207, 229/242, 123.2, 125.35, 209; 383/211, 383/66, 5; 206/449, 494, 813
See application file for complete search history.

(56) References Cited

U.S. PATENT DOCUMENTS

| | | | |
|---|---|---|---|
| 1,929,599 A | 10/1933 | Millholland | |
| D187,304 S | 2/1960 | Hopper | |
| 3,019,944 A * | 2/1962 | Nelson | B65D 5/16 221/302 |
| 3,021,002 A | 2/1962 | Guyer | |
| 3,043,472 A * | 7/1962 | Nemoede | B65D 83/0835 221/48 |
| RE25,449 E * | 9/1963 | Gill | B65D 5/701 229/233 |
| 3,262,632 A | 7/1966 | Brady | |
| 3,578,235 A | 5/1971 | Weiss | |
| 3,905,506 A | 9/1975 | Florian | |
| 3,982,685 A | 9/1976 | Shimada | |
| 4,055,670 A | 10/1977 | Belmont | |
| 4,449,633 A * | 5/1984 | Johnson | A47J 36/022 229/100 |
| 4,462,507 A * | 7/1984 | Margulies | A47K 10/3818 206/210 |
| 4,531,668 A * | 7/1985 | Forbes, Jr. | B65D 77/206 229/123.2 |
| 4,552,269 A * | 11/1985 | Chang | B65D 75/5838 229/125.09 |
| 4,706,875 A * | 11/1987 | Blackman | B65D 5/701 229/125 |
| 4,790,436 A * | 12/1988 | Nakamura | B65D 83/0805 206/449 |
| 4,840,270 A * | 6/1989 | Caputo | B31D 1/021 206/205 |
| 4,848,575 A * | 7/1989 | Nakamura | B65D 83/0805 206/449 |
| 4,852,738 A | 8/1989 | Craig | |
| 5,145,091 A * | 9/1992 | Meyers | B65D 75/5838 206/494 |
| 5,503,858 A | 4/1996 | Reskow | |
| 5,647,506 A * | 7/1997 | Julius | A47K 10/421 206/449 |
| 5,655,661 A * | 8/1997 | Rigby | B65D 75/5838 206/494 |
| 5,938,013 A | 8/1999 | Palumbo | |
| 6,206,356 B1 | 3/2001 | Beloff | |
| D447,054 S | 8/2001 | Hill | |
| 6,309,105 B1 | 10/2001 | Palumbo | |
| 6,499,626 B1 * | 12/2002 | Julius | B65D 5/563 229/122 |
| 6,746,743 B2 | 6/2004 | Knoerzer | |
| 6,918,532 B2 | 7/2005 | Sierra-Gomez | |
| 7,350,688 B2 | 4/2008 | Sierra-Gomez | |
| 7,665,629 B2 * | 2/2010 | Julius | A47K 10/421 221/302 |
| D610,920 S | 3/2010 | Bogdanova | |
| D614,491 S | 4/2010 | Rhoad | |
| 2003/0006238 A1 | 1/2003 | Iacovelli | |
| 2007/0119742 A1 * | 5/2007 | Thielman | B65D 75/5838 206/494 |
| 2010/0019022 A1 * | 1/2010 | Ryan | B65D 5/563 229/122 |
| 2011/0204056 A1 * | 8/2011 | Veternik | B65D 77/38 220/270 |
| 2011/0253771 A1 * | 10/2011 | Willey | B65D 75/5833 229/87.05 |
| 2013/0114918 A1 * | 5/2013 | Lyzenga | B65B 9/10 383/203 |
| 2014/0000219 A1 * | 1/2014 | Pezzoli | B65B 61/18 53/416 |
| 2014/0001196 A1 * | 1/2014 | Bushman | B65D 75/5833 221/45 |
| 2014/0314339 A1 * | 10/2014 | Docherty | B32B 9/00 383/5 |
| 2015/0016756 A1 * | 1/2015 | Down | B65D 75/5833 383/203 |
| 2015/0069081 A1 * | 3/2015 | Fujimoto | B65D 83/0805 221/63 |
| 2015/0217897 A1 * | 8/2015 | Fitzwater | B65D 5/5425 229/117.28 |

* cited by examiner

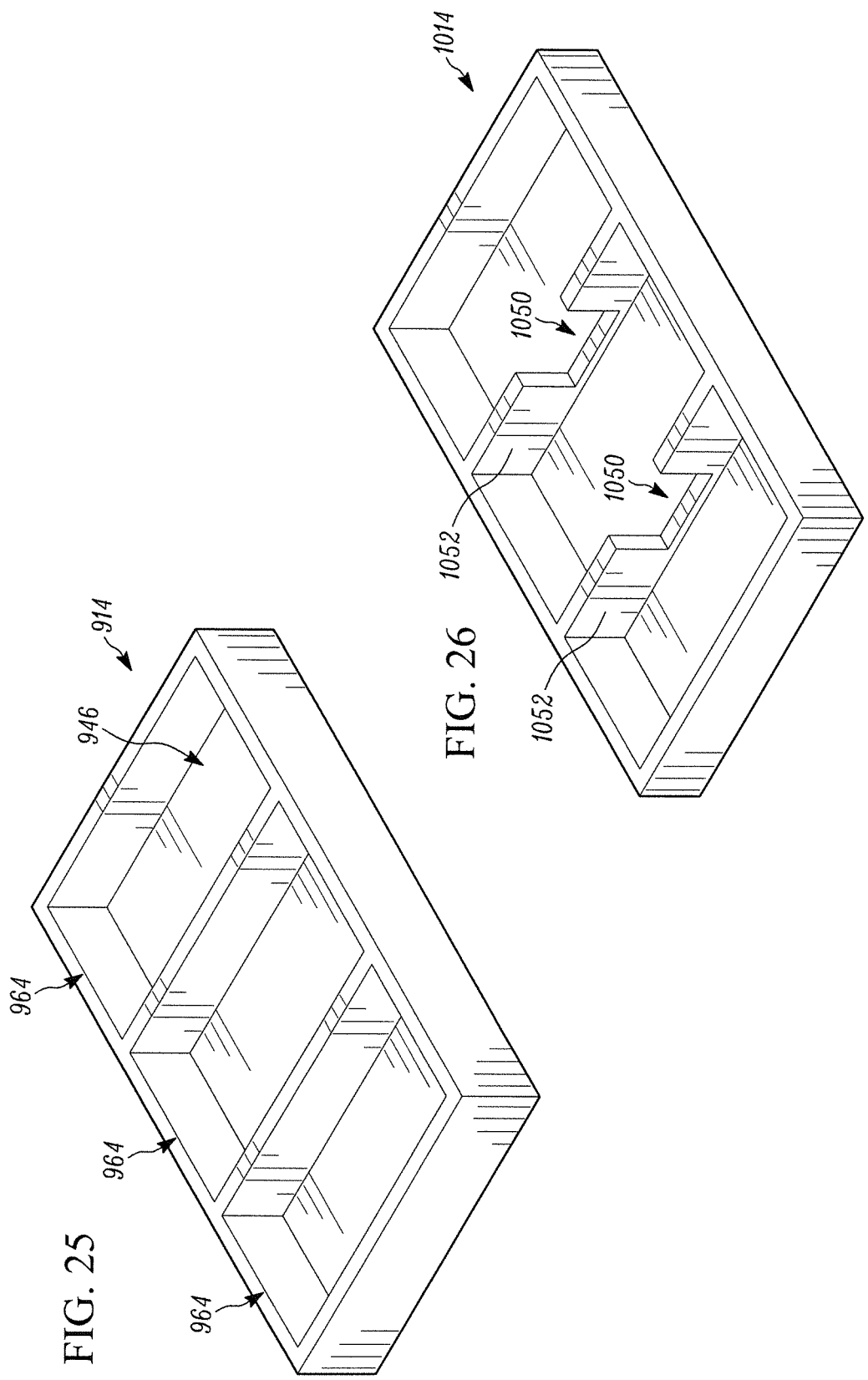

RESEALABLE PACKAGE WITH IMPROVED CONTENTS ACCESSIBILITY

CROSS REFERENCE TO RELATED APPLICATIONS

This application is a U.S. national phase application of International Application No. PCT/US2015/061898, filed Nov. 20, 2015, which claims benefit from U.S. Provisional Application 62/083,007, filed Nov. 21, 2014, which are each hereby incorporated herein by reference in their entirety.

TECHNICAL FIELD

This disclosure relates generally to packages such as resealable packages for consumer products.

BACKGROUND

Film packages are well known in the art for storing and shipping products. These film packages can provide a lightweight package with a hermetic seal. A partial or substantial hermetic seal makes such film packages useful for storing a variety of food products, including, for example, crackers, chewing gum, chocolate, cookies, sandwiches, biscuits, candy, meat products, and dried fruits and vegetables, to note but a few. Further, such film packages may be used for non-food applications, such as medical, pharmaceutical, or industrial packaging applications. Depending on the products, many of these film packages may contain structural supports such as a reinforcing structure, frame, or tray to provide additional support to the flexible film.

Furthermore, depending on the amount and product therein, many containers for discrete food products, such as cookies, crackers, chips, chocolate, and others, are resealable. For example, if the container is designed to hold more than one serving of a food product, the film package may be resealable to help extend the shelf life of the food products remaining in the container after rupture of the initial hermetic seal.

Though resealable and flexible packages are highly desirable for packing and shipping, consumers sometimes have difficulty accessing the contents of the packages. To provide consumers the ability to easily access the food products, the openings on some packages are designed to permit users to grasp the contents by hand and remove the food products by withdrawing them through a resealable opening in the package. Nonetheless, though the products or articles may be graspable by hand through the opening, the ability to easily remove the products through the opening is sometimes affected by portions of the container, such as the film or wrapper or the other contents. While having the products contact the film wrapper as they are removed from the package may not affect some products, for delicate food products the contact with the film wrapper may prove detrimental to the food products' appearance. Furthermore, for consumers with limited manual dexterity, having to move or adjust the products or the package as the products are removed from the package can be difficult.

BRIEF DESCRIPTION OF THE DRAWINGS

FIG. 25 comprises a top perspective view of a tray;

FIG. 26 comprises a top perspective view of another tray;

DETAILED DESCRIPTION

Figure 1:
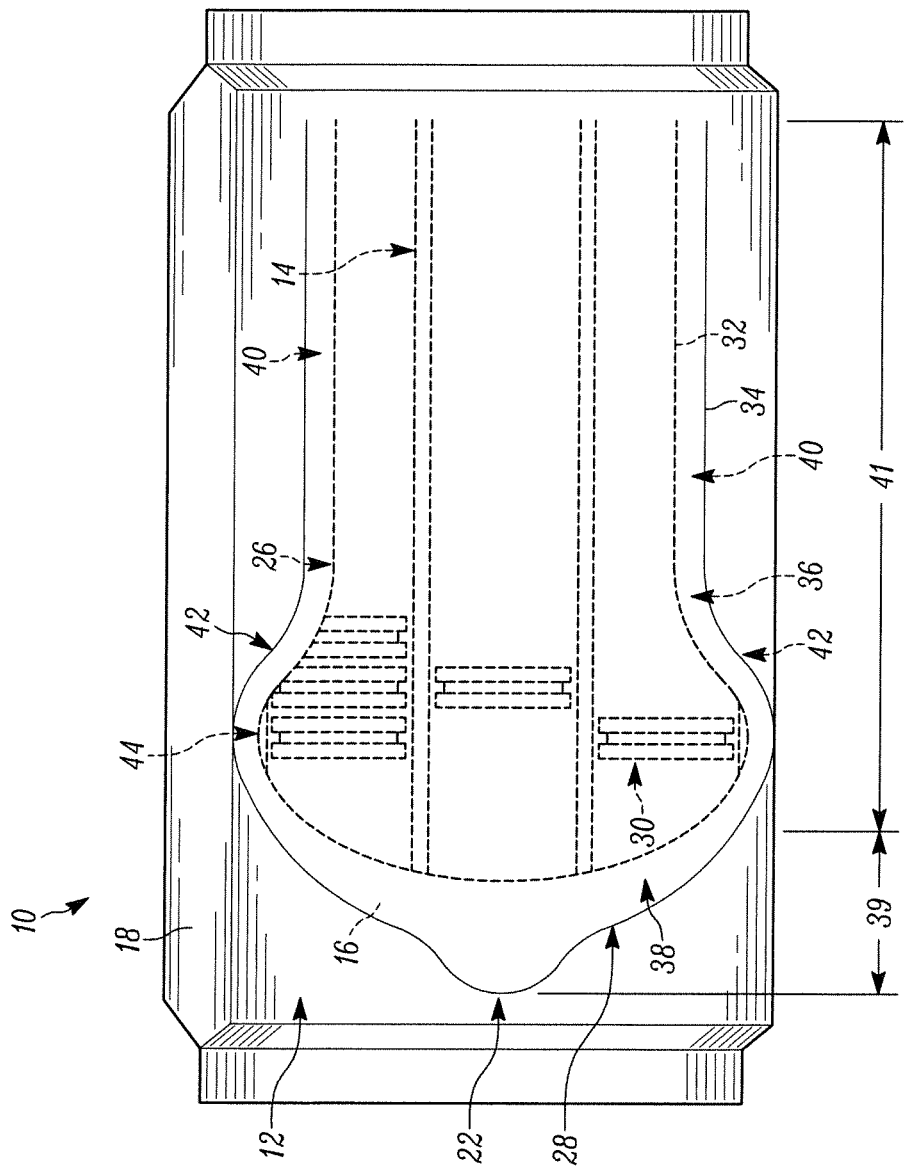
FIG. 1 comprises a top perspective view of a package with an improved access opening.

Pursuant to these various embodiments, film packages having a resealable access opening providing improved access to the package contents are provided. The improved access opening may be incorporated into a variety of package formats, such as, for example, a "flow-wrapped" package as described below. By one approach, the film package includes a tray, frame, or other reinforcing structure containing or holding discrete food articles disposed in a row, column, or array, a flexible film forming at least a top of the film package (i.e., wrapped around the tray and/or sealed to a flange of the tray), an access opening disposed at least in the top defined by a cut in the film, a flap liftable to expose the access opening, a sealing layer adhesively sealed to the film around the access opening, and a starter portion permitting the user to lift the flap and/or the sealing layer to expose the access opening. In one configuration, the access cut forming the access opening into the film has a bump-out, bulbous portion, shoulder, or expanded portion that extends outward from the remainder of the access cut to facilitate easier removal of the discrete food articles within the flexible package. In one example, the sealing layer includes the starter portion that is graspable to lift both the sealing layer and the flap to expose the access opening.

In one approach, the access cut includes a front portion cut into the film adjacent the starter portion of the sealing layer and a pair of opposing side portions cut into the film forming the sides of the access opening. The side portions of the cut may be formed or configured to create an expanded opening section of the access opening that has an opening width greater than an adjacent width on both sides thereof. The access cut may extend to, nearly to, or beyond a sidewall or flange of the tray at the expanded opening section. In one illustrative embodiment, the access cut extends outwardly toward an adjacent top edge of the package and at least to an inner edge of the flange of the tray such that the discrete food articles disposed underneath the expanded opening section may be removed therefrom unimpeded by the film of the package. Further, the expanded opening section may include a reseal area, discussed below, that bows outwardly toward the package edge.

The reseal area or reseal landing, which may be formed between the access cut forming the access opening and a perimeter of the sealing panel around the access opening, may have a number of different configurations. The reseal area may include two sections: a first area near or adjacent the starter portion or leading edge of the reseal area and a second portion that is disposed a distance from the leading edge of the reseal area or the starter portion. The second area includes the portions of the reseal area along the sides of the access opening. Generally, the reseal area partially, or at least partially, surrounds the access opening. Further, the sealing layer, sealing panel, or possibly the flap, may be resealable against the reseal area.

In one approach, the second portion of the reseal area between the access cut at the opposing side portions and a perimeter of the sealing layer may have a width that varies or is constant along the length of the sides of the access opening. In this manner, a pull force required to release the sealing layer from a remainder of the package may be generally constant along the length of the side portions of the access opening or may vary along the length of the sides. Further, the reseal area along the sides of the access opening may have a width or a reseal distance that is not smaller than 0.125-inch. In one example, the width of the reseal area may be about 0.125-inch to about 1.0-inch. In one approach, a perimeter cut that defines the perimeter of the sealing layer or panel corresponds to an overall shape of the access cut such that the perimeter cut and the access cut have generally equivalent configurations. In another approach, the perimeter cut and the access cut are generally dissimilar. For example, if the second portion of the reseal area varies along the length of the sides, the reseal area may be narrower at or adjacent the expanded opening section and this narrowing may be disposed on one or both sides thereof.

As noted above, the reseal area may include two sections or portions. The first portion or area is disposed at the leading edge of the opening or adjacent the starter portion or pull tab. This area may have a variable width as the access cut and the perimeter of the sealing layer may not be disposed equal distance from one another, such as, for example, at a location adjacent the pull tab. The second portion or area is generally disposed along the sides of the opening. The second area also may have a constant or dissimilar width.

By one approach, the reseal area in the first portion, near the leading edge of the opening, may have a width of about 0.125 in. to about 1.5 in., not including the area of the pull tab. By another approach, the first portion of the reseal area has a width that is about 0.125 in. to about 0.75 in. In yet another approach, the first portion of the reseal area has a width of about 0.25 in. to about 0.75 in. In regards to the second portion of the reseal area, the second portion may have a width of about 0.125 in. to about 1 in. By another approach, the second portion of the reseal area has a width of about 0.125 in. to about 0.5 in. Finally, in yet another approach, the second portion has a width of about 0.25 in. to about 0.5 in. As noted above, the first and second portions can have variable or constant widths. As discussed further below, the second portion may have a variable width to permit the access opening to extend outward at portions along the opening without the reseal area extending over to the sides of the package.

In another exemplary embodiment, the package may have a reseal area with a line of weakness, perforation, or score that permits a user to further expand the access opening after a user has begun initial package opening. By one approach, an extension line of weakness is formed in the film wrapper or inner film layer extending from the first, access cut that forms, in part, the access opening. The extension line of weakness is unruptured, untorn, and unbroken prior to initial package opening and the extension line of weakness generally does not automatically rupture upon initial package opening. Instead, the extension line of weakness requires manual manipulation from the user or consumer, such as by applying pressure or pulling on the film around or at the extension line of weakness. Thus, after a user pulls a starter portion to lift the sealing layer and expose the access opening, a user may rupture the extension line of weakness that is formed into the film around the access opening to thereby expand the access opening and expose more of the discrete articles contained within the package.

Once the extension line of weakness is ruptured, portions of the inner film layer may fall downward into the package and can be folded backward or tucked away toward the outer edges of the tray. The access opening, in an area adjacent the extension lines of weakness, may not be defined solely by the access cut, but instead, by the edges of the folded film.

By one approach, the package has a reseal area that extends beyond the extension line of weakness such that the package can be resealed after the access opening has been expanded by rupturing the extension line of weakness. To that end, the extension line of weakness may include a tear-inhibiting feature to prevent or inhibit the extension line of weakness from extending or tearing beyond the reseal area.

As noted above, the reseal area may vary along the sides of the access opening. Further, the width of the reseal area may change upon the rupture of any of the extension lines of weakness, which expand the access opening. In such a configuration the reseal area may be larger than others disclosed herein prior to rupture, but nonetheless, the reseal area generally retains at least a width of about 0.125-in. between the first, access cut or the edges of the folded film and a perimeter of the sealing layer.

In addition to the openings with improved accessibility, the packages described herein may include one or more integrity features that indicate whether the package has not been previously opened. In one illustrative embodiment, the package may include a portion of film that may break, stretch, or tear to indicate that the package has been opened. By one approach, these may be formed by a die cut or a break or interruption in the die cuts forming the access opening or the sealing panel.

In another illustrative example, the sealing panel or layer may have a portion that extends from the package top over an adjacent top edge of the package and onto an adjacent side. For example, the perimeter or perimeter cut of the sealing panel may extend from a top surface to a side surface. In one illustrative approach, the sealing panel may have a scalloped, sinusoidal, wavy, angled, arcing, or undulating perimeter or cut that forms a portion, such as a side, of the sealing panel. Further, such a cut may be disposed over one of the top edges of the package such that the sealing panel has side extensions that are disposed on a side of the package.

When the sealing panel is lifted from the remainder of the package to expose the access opening, the portions of the sealing panel disposed on the sides of the package are lifted with a remainder of the sealing panel. When the package is resealed, after initial opening, the outward or side sections of the sealing panel that previously extended over the top edge of the package are not easily readhered to the outside of the package, thereby serving as an indicator that the package has been previously opened. Further, in some embodiments, the package may include a weaker adhesive in that area to make the outer or side portions of the sealing panel that previously adhered to a side of the package unable to readhere to the inner film layer in this area. In this manner, the outward or side portions of sealing panel that previously extended over the top edge of the package subsequently extend outward and away from the remainder of the package.

Though the access openings described herein provide improved contents accessibility, the tray within the package remains retained by the overwrap. By one approach, the film has a pair of perimeter portions adjacent the access opening that capture or extend inward beyond at least a portion of the tray or flange to prevent unintentional removal of the tray through the access opening. To provide improved access to the package contents, the film or overwrap may not include capture portions at the expanded opening portions, or may only include capture portions having a reduced size. The perimeter, capture portions on either side of the expanded opening portions or adjacent the expanded opening section may still prevent the tray from being withdrawn from the package. In this manner, a user cannot remove the tray through the access opening, even with the expanded opening sections increasing a user's access to the product through the access opening.

To further improve access to the package contents, the tray may have an opening or window therein to permit the discrete food articles to move laterally therein (i.e., between the rows or columns of the tray). By one approach, the tray will have the discrete food articles disposed in multiple rows or columns and the opening or window may be disposed in an interior wall separating the rows or columns such that the discrete food articles can move from one row or column to another within the tray. In addition, the rows or columns may be configured to facilitate movement of the discrete food articles longitudinally within a particular row or column such that the discrete food articles are not fixed into position within the tray, but are able to move from a first position disposed adjacent a first end of the tray to a second position disposed a distance away from or nonadjacent to the first end. Permitting the discrete food articles to move longitudinally within a tray may be particularly beneficial where the articles can advance into position underneath the expanded opening sections.

As mentioned above, one type of film package is formed from a web of material that is formed or wrapped around a product. These 'flow-wrap' type packages (i.e., horizontally or vertically formed packages using a single web of material) may be formed by enveloping or wrapping the product with the web of material and forming a longitudinal seal, such as a fin, bottom, or lap seal with two edge portions of the web of material. A pair of end or side seals may then be formed in the web to form the packages. In another embodiment, packages may be formed from more than a single web of material and with a plurality of side seals. Because these types of packages can provide hermetically sealed enclosures, they are suitable for packaging food products and other products requiring protection against contamination by moisture, oxygen, and ambient atmosphere.

As suggested, the film packages may be formed with a variety of seals, such as end or side seals (including two-, three-, or four-side seal packages) and/or a longitudinal seal (including fin or lap seals). The film may be a multi-layer laminate with a built-in resealable closure or a film with another film layer or label disposed thereover. For example, the film may include first and second film layers that are coextensive with one another. In other configurations, one of the first or second films may not be coextensive with the other or a discrete layer or label may be adhered to a film layer. In addition to a discrete label, a continuously applied label or layer that extends from end-to-end or from side-to-side of the film may be disposed over the access opening such that the multi-layer laminate is not entirely coextensive in both length and width.

By one approach, the flexible film will include a pressure sensitive adhesive or another resealable adhesive disposed in between at least portions of the first and second film layers. In one example, the resealable adhesive may be disposed throughout the area between the first and second film layers. In other configurations, the resealable adhesive is disposed in only some areas between the first and second film layers such that the resealable adhesive may be pulse coated or pattern applied. Depending on the package formed, the pattern application process may dispose only resealable adhesive, or it can dispose permanent adhesive in addition to the resealable adhesive, if desired for the package. In other configurations, the package may include only permanent adhesive or sealant between the film layers, which may be applied continuously or in a pulse or pattern application process. In yet another configuration, the package may include pressure sensitive adhesives with different strengths to facilitate a package integrity feature as described further below.

In one approach, the pressure sensitive or resealable adhesive is neutral and non-reactive with the product being packaged. For example, the pressure sensitive or resealable adhesive may include a cold formed adhesive, a hot melt adhesive, a cold seal adhesive, a natural or synthetic latex adhesive, a low tack adhesive, ethylene vinyl acetate (EVA), an acrylic adhesive (such as a water-based or solvent acrylic adhesive), a styrene block copolymer adhesive, a butyl rubber adhesive, a silicone rubber adhesive, a natural rubber adhesive, a nitriles adhesive, an acrylic emulsion adhesive, an acrylic water-based adhesive, and combinations thereof. Further, the pressure sensitive or resealable adhesive may be extruded, coextruded, printed, or a combination thereof.

In one configuration, the flexible film may have a first pair of edge portions formed into a first end seal, a second pair of edge portions formed into a second seal, and a third pair of edge portions formed into a third seal, such as a longitudinal seal including a fin seal or lap seal. On a top or face of the package in between the first and second ends seals, the package may include an access opening, which may be defined by a cut, tear line, or score line in the first film layer. The cut or score line in the first film layer may form a flap in the first layer of film. The flap may be configured to be lifted from a remainder of the first layer film to expose the access opening into the film package.

A sealing layer may be disposed over and/or around the access opening. In one illustrative approach, the sealing layer is adhesively sealed to the first layer film around the access opening. The sealing layer, as suggested above, may be a discrete label, may be cut into a second film layer that is co-extensive with the first film layer, or may be cut into a second layer or label continuously applied to the first film layer.

As noted above, the package may include a starter portion that is graspable and liftable by a consumer to permit the access opening to be exposed. In one configuration, the starter portion is disposed on the sealing layer such that a portion of the sealing layer is lifted to expose the access opening. Depending on the desired package configuration, the starter portion may be disposed proximate or adjacent a package seal. By one approach, the access opening is disposed along the length of the package and the starter portion is proximate a package end seal. By another approach, the starter portion is disposed on a side of the package away from the packages seals such that the access opening is across a width of the package. In other configurations, the access opening is angled across the package such that it is not orthogonal to the length or width of the package. In another configuration, the package may include multiple access openings and multiple sealing panels or layers.

By one approach, a method for manufacturing a package may include providing a web of multi-layer film laminate with at least first and second film layers and cutting a first cut in the first, inner film layer and a second cut in the second, outer film layer. The first and second film layers may or may not be coextensive with one another. The first and second cuts being offset and forming an access opening and an expanded opening section or portion along the sides of the access opening. Furthermore, the distance between the first and second cuts is not smaller than 0.125-inch, including at the expanded opening sections. The cuts may be formed in a variety of manners including mechanical or laser formation. As discussed further below, the end or terminus of the first and second cuts may be configured to inhibit or prevent further tearing of the film beyond the formed cut. For example, the end of the cut may have a configuration similar to a "J", a hook, a smile, a shepard's hook, a teardrop, and a double teardrop, to note but a few termination features. In addition, the direction of the hook or curved portion can extend inward or outward toward a package edge.

By another approach, the method for manufacturing a package may include providing a film web and a second film layer thereover comprising a discrete label. Furthermore, the method may further include forming a cut in the film web to define a flap that may be lifted upward to expose an access opening.

The method further includes providing a tray containing, holding, retaining, or supporting discrete food articles disposed in at least one row or column and wrapping a film around the tray and forming a longitudinal seal, first end seal, and a second end seal. Further, the method may include separating the individual packages from the web of film by forming a cut between the end seals of adjacent packages such that a separation cut is disposed in between the second end seal of a leading package and the first seal of a trailing package.

The film packages described herein may contain a food product, though the packaging applications also may include non-food applications such as medical, pharmaceutical, or industrial packaging applications, to note but a few additional options. Further, the packages may have at least a partial, initial hermetic seal to provide at least a partial barrier against ambient atmosphere. More particularly, to extend the shelf-life of products contained within the film package, the seals forming the package may be hermetic or at least partially or substantially hermetic. To that end, the package may include seals formed by a variety of processes such as, for example, hot seal, cold seal, low tack seal (including employing a low tack adhesive or fastener), sonic waves, and combinations thereof.

The film packages may have a variety of configurations, including, for example, a bag, a pouch, a rectilinear-shape, a cylindrical-shape, and a column-shape, among others. By one approach, the package configuration and shape are primarily influenced by the products contained within the package, in part, due to the flexibility of the flexible film laminate. By yet another approach, the package configuration is primarily influenced by structure within the package such as the internal rigid support or product tray or frame. In such configurations, the flexible film may be configured as a flow-wrap or overwrap around the structure.

The film packages may be produced in a number of manners. For example, the film packages may be formed around the food product or may be fully or partially formed and then filled with the food products. In addition, it is anticipated that the film packages may be formed in-line just before the food product is packaged or formed around the food product. In some applications, it may be desirable to form the film laminate or even the entire film package off-line well before the products are packaged.

As used herein, the film laminate may be formed of a variety of materials and can be disposed as a web of material on a roll or as individual blanks. For example, the film laminate may be laminated, extruded, cast, blown, or a combination thereof. By one approach, the film laminate may include several thin layers of material, such as thin layers of a polymer material. More specifically, the structure of the film laminate may include a polyethylene terephthalate (PET) layer, polyethylene, an oriented polyproplylene (OPP) layer, a polylactic acid (PLA) layer, a single layer (mono-web) polymer, a sealant layer (such as ethylene vinyl acetate (EVA), ionomer plastic, matallicine, organoclay, and the like), an ink or print layer, nylon, a metalized layer, such as a metalized oriented polypropylene (MET OPP) layer, paper, foil, an adhesive, and/or a non-woven material, among others. These various layers may be included in the film laminate and may have a variety of thicknesses and densities.

In one illustrative approach, the film laminate may be a combination of several of the above-mentioned materials or film structures. For example, one film laminate structure may include a PET layer, an ink layer, an adhesive layer, and a bi-axially oriented polypropylene (BOPP) layer. In another example, the structure may include a BOPP layer, an ink layer, a low-density polyethylene layer, and a metalized OPP. In yet another configuration, the structure may include a surface lacquer layer, an ink layer, and a cavitated OPP. Further, the components of the structure or film laminate may be joined, for example, by adhesives or by an extrusion process. Though the film laminate may be described herein as having a first film layer, a second film layer, and/or an adhesive layer, the laminate may include additional layers beyond these three layers, and one of skill in the art would be able to adopt the teachings herein to accommodate additional layers of the film laminate.

As discussed above, the front portion of the access opening cut into the film, which may be adjacent the starter portion, can be disposed perpendicular to a row or array of the discrete food articles. In other embodiments described herein, the front portion of the access opening is parallel to a row or array of the discrete food articles disposed in the package.

In another embodiment, a film package includes a tray with discrete food articles disposed in at least two rows or columns, a film wrapped around the tray, the film forming a top, sides, and bottom of the package, and an access opening formed into the film package defined by an access cut into the film, the access cut extending from a first side of the package to a second side of the package and over the top. In this manner, the access cut defines a flap that is liftable to expose the access opening. By one approach, a sealing layer is adhesively sealed to the film around the access opening. Further, a starter portion may permit a user to lift the flap and/or sealing layer to expose the access opening. In one configuration, the tray has a side wall disposed around or adjacent a perimeter of the tray, at least one interior wall forming the rows or columns of the tray, and a tray opening or openings, such as windows, disposed in the interior wall permitting the discrete articles within the rows or columns to move between the rows or columns of the tray without being removed from the package.

Though previously described packages included a single access opening, in one embodiment, the package may include a plurality of access openings. By one approach, the plurality of access openings, defined by a plurality of access cuts in the film, extend from the first side of the package, over a top of the package, and to the second side of the package. Further, a plurality of sealing layers may be adhesively sealed to the film around the plurality of access openings that extend over portions of two adjacent faces of the container.

The tray may have a perimeter wall and an interior wall with a first wall height and a second wall height at the tray openings. In one example, the second wall height is more than 50% smaller than the first wall height. In another example, the second wall height is less than about 10% of the first wall height.

FIG. 1 illustrates a flexible film package 10 that includes a flexible film 12 that is wrapped around a reinforcing structure, frame, or tray 14. To illustrate the improved accessibility of the contents within the package 10, a few of the discrete food products 30 and portions of the tray 14 of the package 10, are illustrated in dashed line where they would be visible to a user when the package 10 is in the opened configuration. The flexible film 12 may be formed of a variety of films such as, for example, a multi-layer film web or a single web of film with a label thereover. By one approach, the flexible film 12 includes a first film layer 16 and a second film layer 18. If the flexible film 12 is a multi-layer laminate, as shown in FIG. 1, the first film layer 16 may be the inner film layer disposed toward the interior of the package and the second film layer 18 may be the outer film layer disposed toward the exterior of the package. On the other hand, if the flexible film 12 does not include coextensive first and second layers, the second film layer 18 may be a discrete label or a label continuously disposed upon a portion of the first film layer 16. Between at least portions of the first and second film layers 16, 18, a pressure sensitive adhesive 20 (FIG. 2) is disposed.

The first film layer 16 may include a flap 24 (FIG. 2) that can be lifted to expose access opening 26. By one approach, the second film layer 18 is disposed over at least portions of the first film layer 16 and includes a sealing panel or layer 28 that can be lifted, along with the flap 24 to expose the access opening 26. In this manner, the sealing layer 28 includes a starter portion 22 that can be manually grasped by a consumer to lift and pull the sealing layer from the remainder of the film package 10. The starter portion 22 may be formed, in part, by having no pressure sensitive adhesive 20 disposed between the first and second film layers in the area forming the starter portion 22, may have a deadener applied to any adhesive in the area, or the pressure sensitive adhesive may be masked by another agent or substrate.

Figure 2:
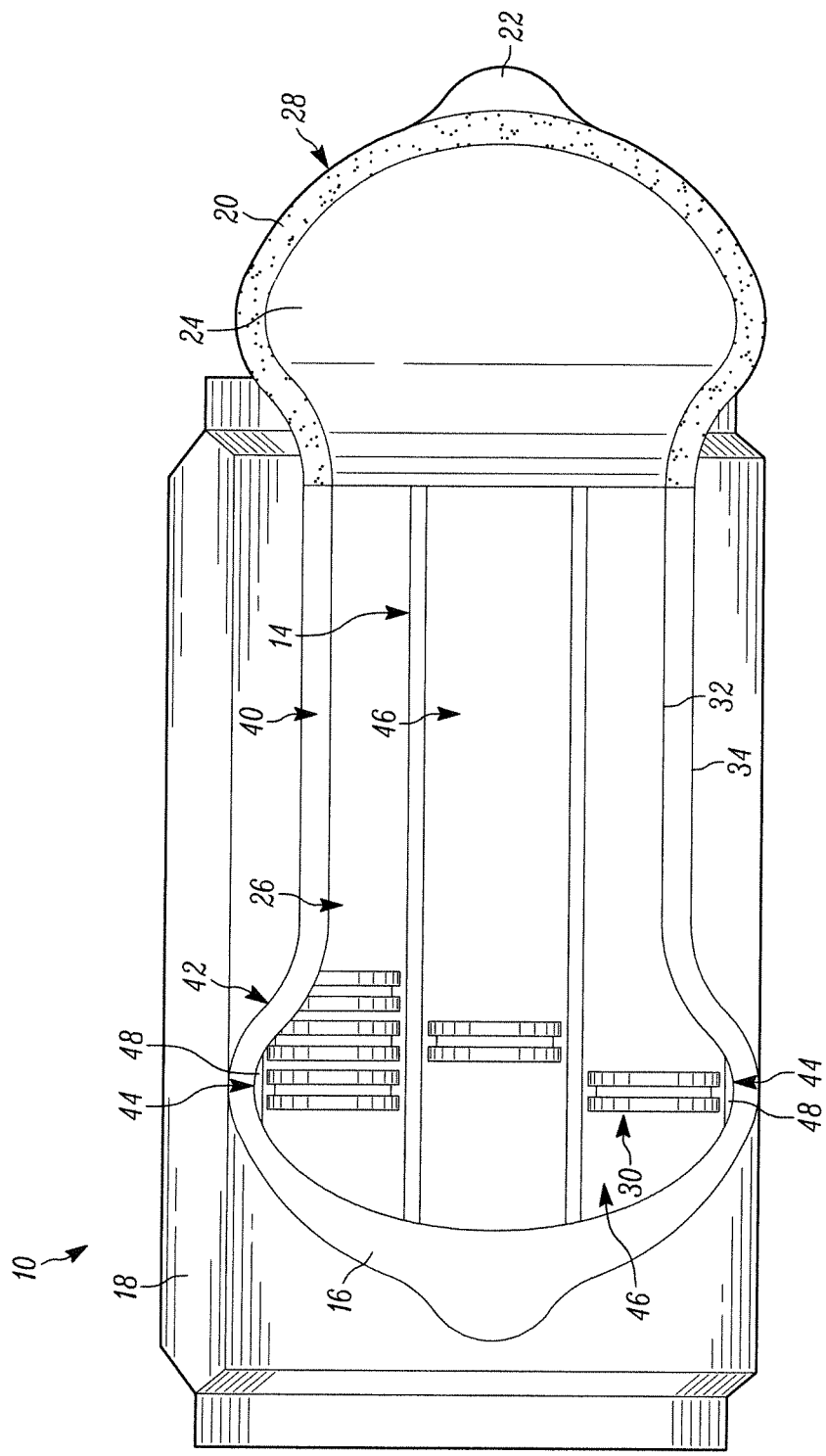
FIG. 2 comprises a top perspective view of the package of FIG. 1 in an open configuration.

When the sealing layer 28 and flap 24 are moved to expose the access opening 26, the food products 30 disposed in the interior of the package 10 are exposed. FIG. 2 illustrates the sealing layer 28 and flap 24 lifted from the package to expose the access opening 26 and a portion of the package interior.

As illustrated in FIGS. 1 and 2, the access opening 26 is defined, in part, by a first cut 32 in the first, inner film layer 16. The access opening 26 is further defined by a second cut 34 in the second, outer film layer 18. In another configuration, the second cut could be a perimeter of a discrete label. The reseal area 36, sometimes described as a racetrack, disposed between the first cut 32 and the second cut 34 permits a consumer to reseal the access opening 26 via the pressure sensitive adhesive 20. The first and second cuts 32, 34 are not disposed fully through the thickness of the film 12, but instead are disposed partially therethrough. By one approach, the first cut 32 is disposed through about the entire thickness of the first film layer 16 and the second cut 34 is disposed through about the entire thickness of the second film layer 18. In another configuration, the first and second cuts 32, 34 are disposed through more than just the thickness of their respective first and second film layers 16, 18, but not entirely through the thickness of the flexible film 12.

The reseal area 36 has two primary components: a first or front portion 38 that is disposed at a leading edge of the sealing layer 26 in a first area 39 (i.e., near or adjacent the starter portion 22 in FIG. 1, though not necessarily including the starter portion 22 as it lacks any pressure sensitive adhesive 20 that can reseal the package 10) and a second or rear portion 40 in a second area 41 that is disposed a distance from the leading edge or starter portion 22. As illustrated in FIG. 1, the second portion 40 of the reseal area 36 includes a pair of opposing sides 42. In short, the first portion 38 defines the portion of the reseal area 36 near the starter portion 22, which is disposed adjacent one end of the package 10 and the second portion 40 defines the sides of the reseal area 36. In one configuration, the reseal area has a pair of arcuate portions disposed where the front portion 38 joins the sides of the second portions 40. Further, in one embodiment, the arcuate portions are disposed not less than about 0.5-inch from an end of the tray adjacent the starter portion.

The size of the access opening typically varies according to the size of the tray, which also impacts the width of the package. For example, with previous designs if the tray was about 3 in. wide and the conventional reseal area required about 0.5 in. to 1.0 in. of reseal area on each side of the opening, the opening could only be about 2. in. wide at any point along the opening. On the other hand, with the improved access openings described herein, the opening can considerably be larger. For example, as mentioned above the reseal area on the sides of the improved opening can be about 0.125 in. to about 0.5 in. Thus, at the portions of the opening having a reseal area of 0.125 in. along both sides of the opening, the width of the opening may be only about 0.25 in. less than the width of the package or tray. In another configuration, the reseal area is about 0.25 in. along the sides of the opening, and therefore, the opening may be only 0.5 in. less than the width of the package or tray.

By one approach, the side portions 40 of the reseal area 36 have expanded opening portions or sections 44 that provide for the food products therebelow to be more easily accessible. The side portions 40, as illustrated in FIG. 1, mirror one another such that a centerline of the opening is linear and the sides of the opening are symmetrical. By one approach, the expanded opening sections 44 are disposed closer to the leading end or front of the package or the first portion 38 than the opposite end of the access opening. Nonetheless, the expanded opening sections 44 may be disposed anywhere along the sides of the reseal area.

Figure 11:
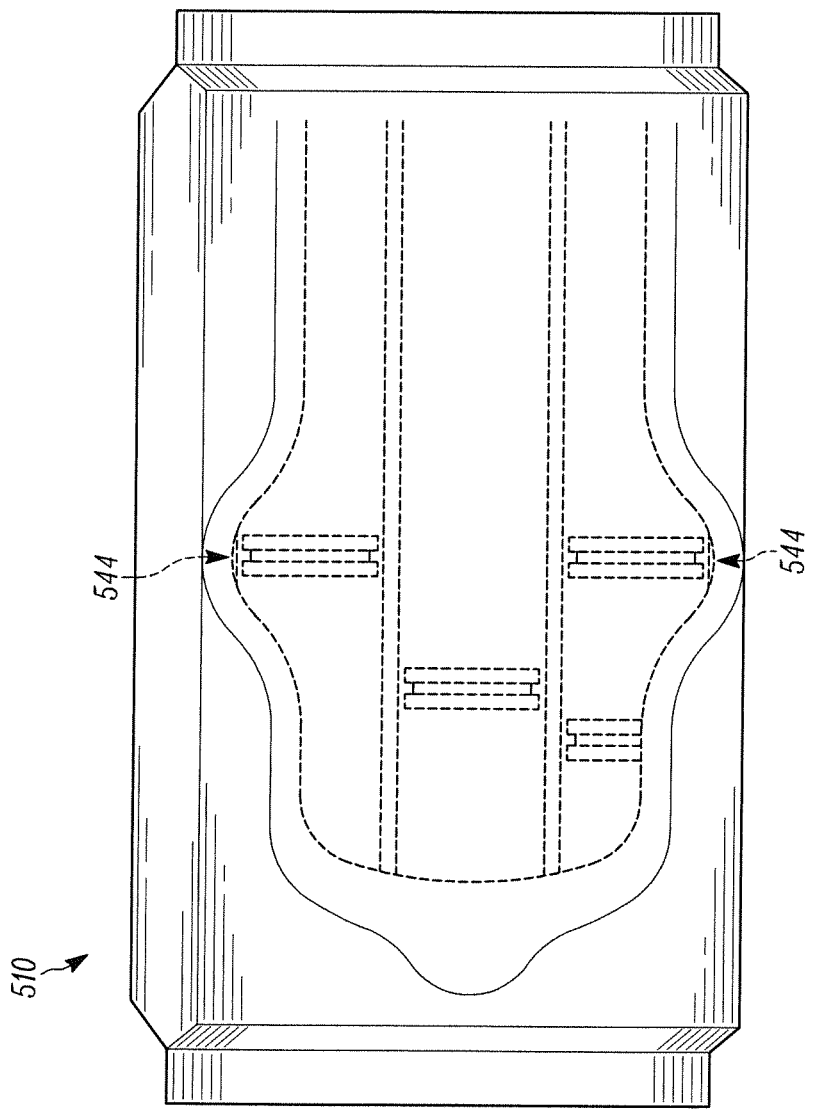
FIG. 11 comprises a top perspective view of another package with an improved access opening.
Figure 12:
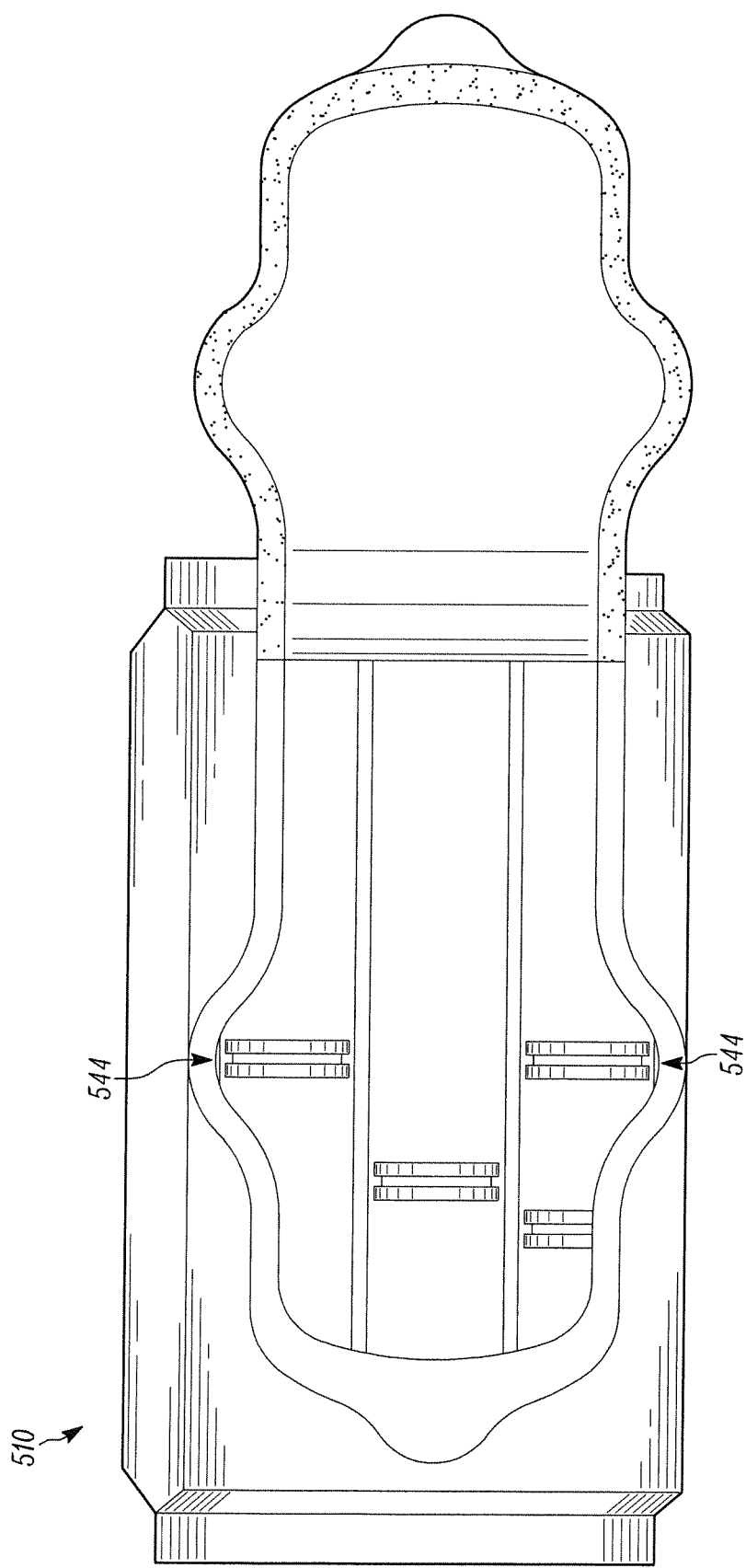
FIG. 12 comprises a top perspective view of the package of FIG. 11 in an open configuration.

As illustrated in FIGS. 11 and 12, the expanded opening sections 44 may be disposed centrally along the sides of the reseal opening. The package 510 is nearly identical to package 10 described herein, except the expanded opening sections 544 are disposed near a middle of the package 510.

In yet another configuration, the expanded opening sections may be disposed closer to the rear of the access opening. In this manner, the expanded opening section is disposed further from the front portion of the access opening as compared to an opposite end of the access opening.

Further, as discussed below, each of the sides may include more than one expanded opening section, as illustrated, for example, in FIGS. 5 and 6. In such a configuration one of the expanded opening sections may be disposed closer to the leading or front portion of the access opening and another of the expanded opening sections may be disposed closer to the rear or trailing portion of the access opening.

As mentioned above, though the food products in many containers often can be forced out of a package, for those with limited manual dexterity and/or food products that are delicate or easily crumble, the careful removal of the food products can be difficult and/or important to maintain product integrity. Thus, having an expanded opening section 44 that provides unimpeded access to the food products adjacent thereto may be particularly useful for such scenarios. In many food packages, the trays 14 have rows, arrays, sleeves, or columns 46, with food products disposed therein. While many of the food products within a package are typically freely accessible without interference from the package or other contents, occasionally some of the food products therein are only available by forcing the food product past a bit of the package, such as the film or tray or after removing other food contents. With the expanded opening section 44, the food products therebelow are more easily accessed. Furthermore, with the limited breadth of the expanded opening section 44, the reseal feature is not adversely affected. For example, the reseal area 36 of package 10 remains on a top portion of the package such that the user or consumer does not need to readhere the sealing layer 28 to the sides of the package. By another approach, the reseal area 36 may extend slightly over the edge of the package, but typically is primarily disposed on a top of the package. Indeed, in other embodiments disclosed below, the access opening and associated reseal area may extend over more than one surface of the package.

In one configuration, shown in FIG. 1, the tray 14 includes three rows 46 of food product 30 within the package 10. The discrete food articles are disposed in arrays within the rows 46 of the tray 14. The center row 46 has contents that can be easily accessed without any hindrance or interference, once the sealing layer 28 is lifted to expose the access opening 26. On the other hand, the two rows 46 along the sides of the package have a portion of the row 46 obscured by a portion of the film 12. These portions of the film along the perimeter of the access opening may help capture the tray within the package to prevent unintentional removal of the tray from within the package. These capture portions, however, may make removal of the package contents more difficult. To make these products, such as discrete cookies, more easily accessible, a larger portion or width of the rows 46 adjacent the sides of the package is exposed with the expanded opening section 44.

Though the expanded opening section and the reseal area may be configured in a number of manners, in the embodiment of FIG. 1, the first cut 16 is disposed in the film 12 such that the expanded opening section 44 exposes the side wall 48 of the tray 14 that defines the outer side of the rows 46 disposed adjacent the package side or perimeter of the tray. Though only a portion of the sidewall 48 is exposed, after some of the food products 30 have been removed from the side rows 46, the food products generally become easier to remove because the food products have more room to move or rotate with the row and because the food products may longitudinally slide down or move within the column or row 46 to be advanced into position underneath the expanded opening section 44. As discussed below, the tray may be specifically configured to permit the discrete food articles to move longitudinally therein and even laterally between the columns or rows within the tray 14.

As shown in FIGS. 1 and 2, the second portion 40 of the reseal area 36 has a consistent width such that the first cut 32 and second cut 34 in this area have the same general configuration. In this manner, the opening force required to expose the access opening 26 is roughly the same along the length of the sides of the access opening 26. Also, though the reseal areas described herein may include a first cut 32 with a portion that extends outward from a remainder of the cut, the second cut 34 remains disposed beyond the first cut 32 such that the package retains its resealability. Thus, though the second cut 34 may follow the first cut 32 (such that the reseal area 36 has a constant width) or may have an independent configuration, the first and second cuts 32, 34 do not overlap one another to ensure that the package remains resealable.

Figure 3:
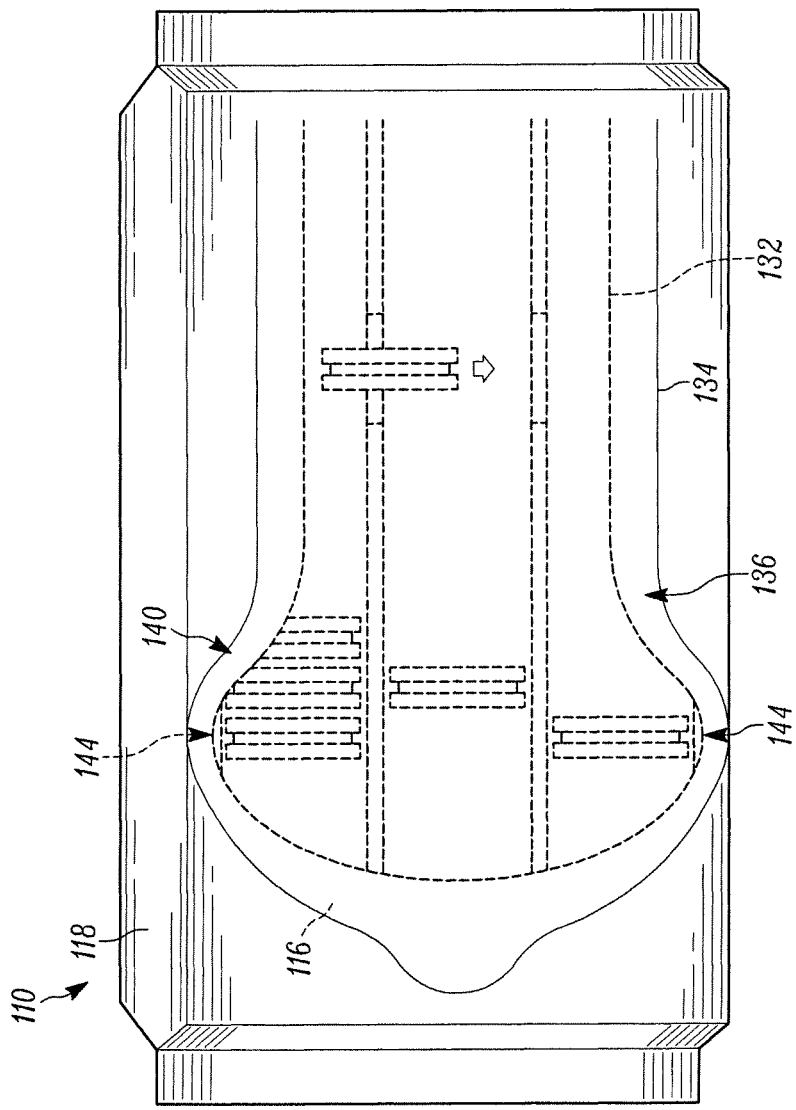
FIG. 3 comprises a top perspective view of another package with an improved access opening.
Figure 4:
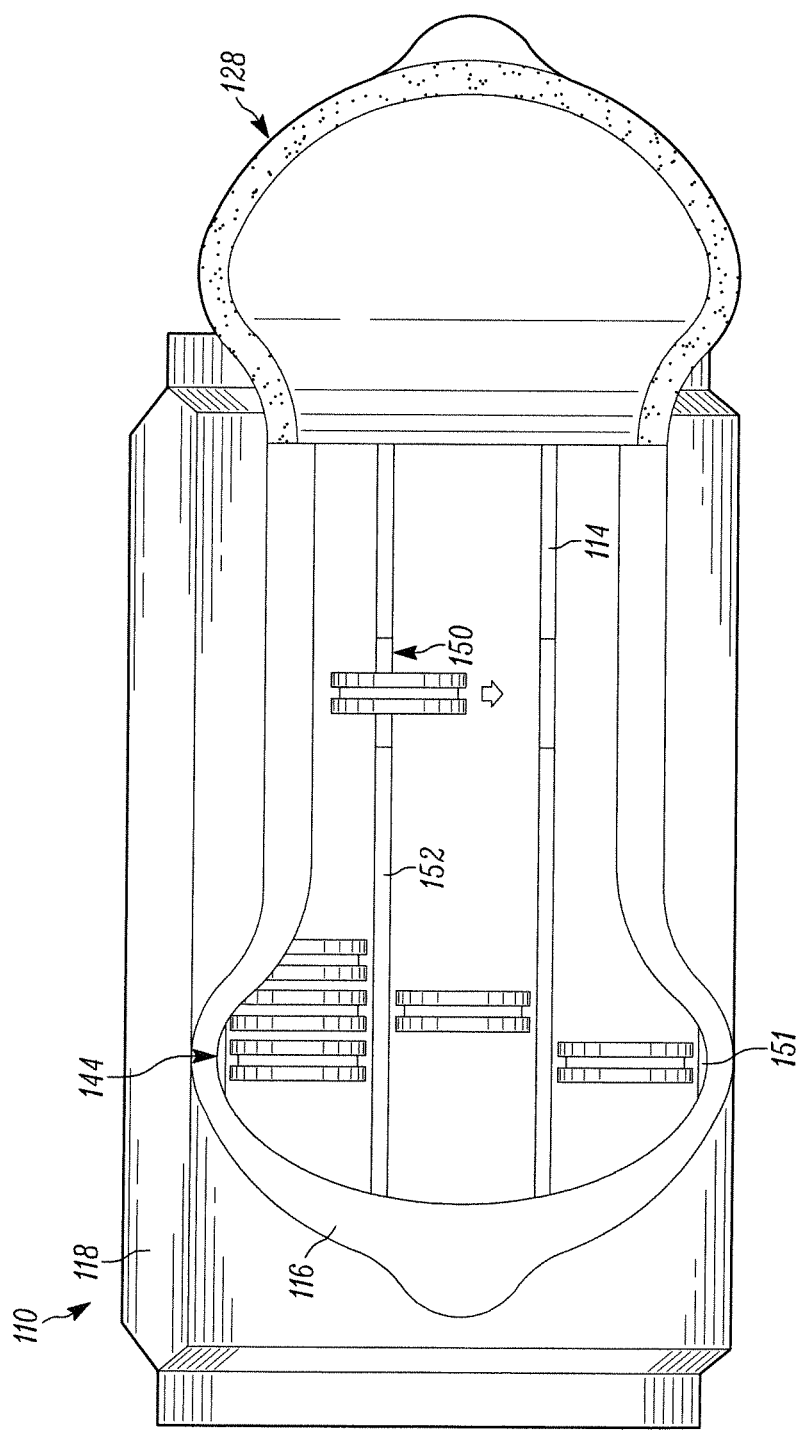
FIG. 4 comprises a top perspective view of the package of FIG. 3 in an open configuration.

In another configuration, illustrated in FIGS. 3 and 4, a package 110 has a reseal area 136 with a second portion 140 having an inconsistent or variable width in between the first and second cuts 132, 134. In such a configuration, the reseal area 136 is narrower adjacent the expanded opening section 144. In this manner, the first cut 132 in the first film layer 116 extends outward at the expanded opening sections 144 toward the adjacent package edge without moving the second cut 134 of the second layer 118 in the same manner. The film package 110 retains its resealability because the strength of the reseal provided by a remainder of the reseal area is strong enough to properly reseal the package 110. Further, in contrast to package 10, the package 110 generally requires an opening force that varies along the length of the sealing layer 128.

Figure 18:
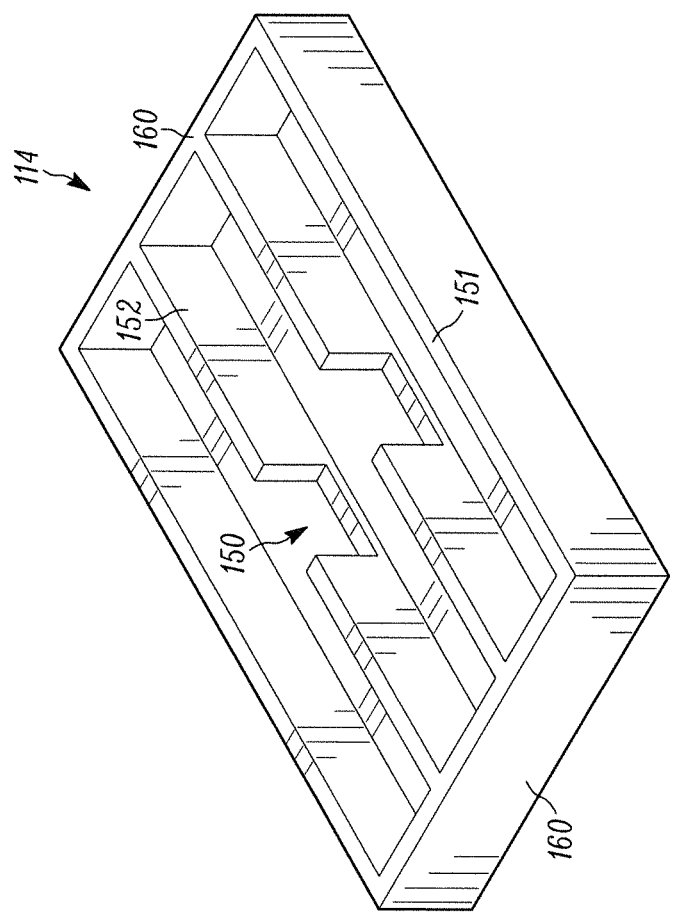
FIG. 18 comprises a perspective view of tray with accessibility openings.

As shown in FIG. 4, the tray 114 includes a perimeter or side wall 151 and interior tray walls 152 that separate the food product into rows, columns, or arrays in the package. Further, tray 114 includes tray openings, windows, or access points 150 within the tray walls 152. These tray openings 150, also illustrated in FIG. 18, are disposed in the interior tray walls 152 that separate the rows, columns, or arrays of product in the package. By one approach, the tray openings 150 are a lowering of the top edge of the tray wall 152. By another approach, the tray openings 150 include complete removal of the tray wall 152 at the opening location. In other configurations described below, the tray may have a hole disposed in the tray at the location of the tray openings between the rows or columns.

In operation, the tray openings 150, however formed, permit the discrete food articles disposed in one row, column, or array to laterally move in the tray 114 to another row, column, or array without removing the articles from the package 110. In this manner, the discrete food articles, such as cookies 130, may move within the package 110 to become more readily accessible by a user or consumer. For example, the tray openings 150 may permit the food product to move between rows or columns without being lifted out of the tray or beyond the upper surface of the tray. Further, the food product can be moved without directly touching or manually moving the product. For example, the package may be tilted, angled, or otherwise adjusted to encourage the movement of the product within the package without opening the package and handling the cookies. The movement of particular articles within the package is permitted after another article or portion of the articles have been previously removed from the package so that the tray has space to accommodate the movement. Further, prior to removal of at least some of the articles, the contents of the package retain their general location to avoid damaging the articles during shipping or handling.

Pursuant to the disclosure, both the expanded access sections 44, 144 and the tray openings 150 can be used alone or in combination with one another to provide a package with improved contents accessibility. In addition, one or more of each of these accessibility features may be incorporated into a package.

Figure 5:
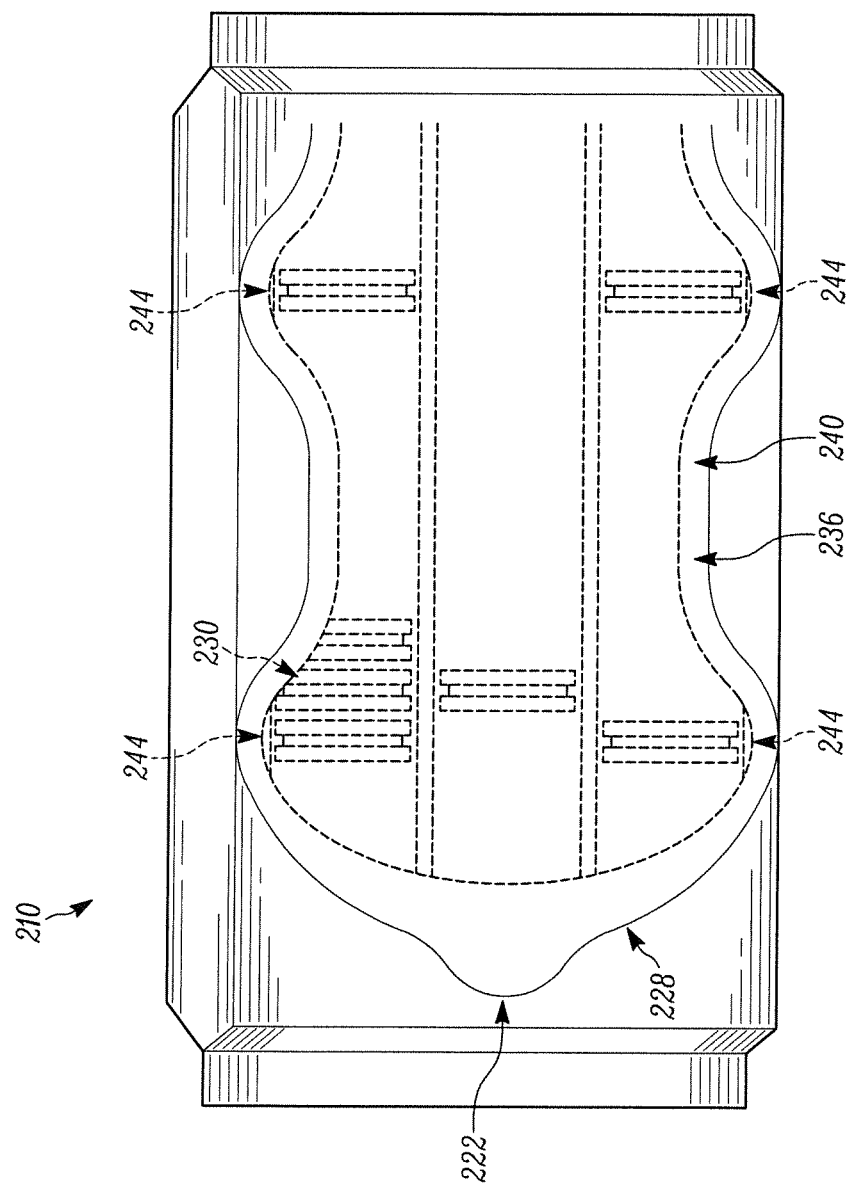
FIG. 5 comprises a top perspective view of another package with an improved access opening.
Figure 7:
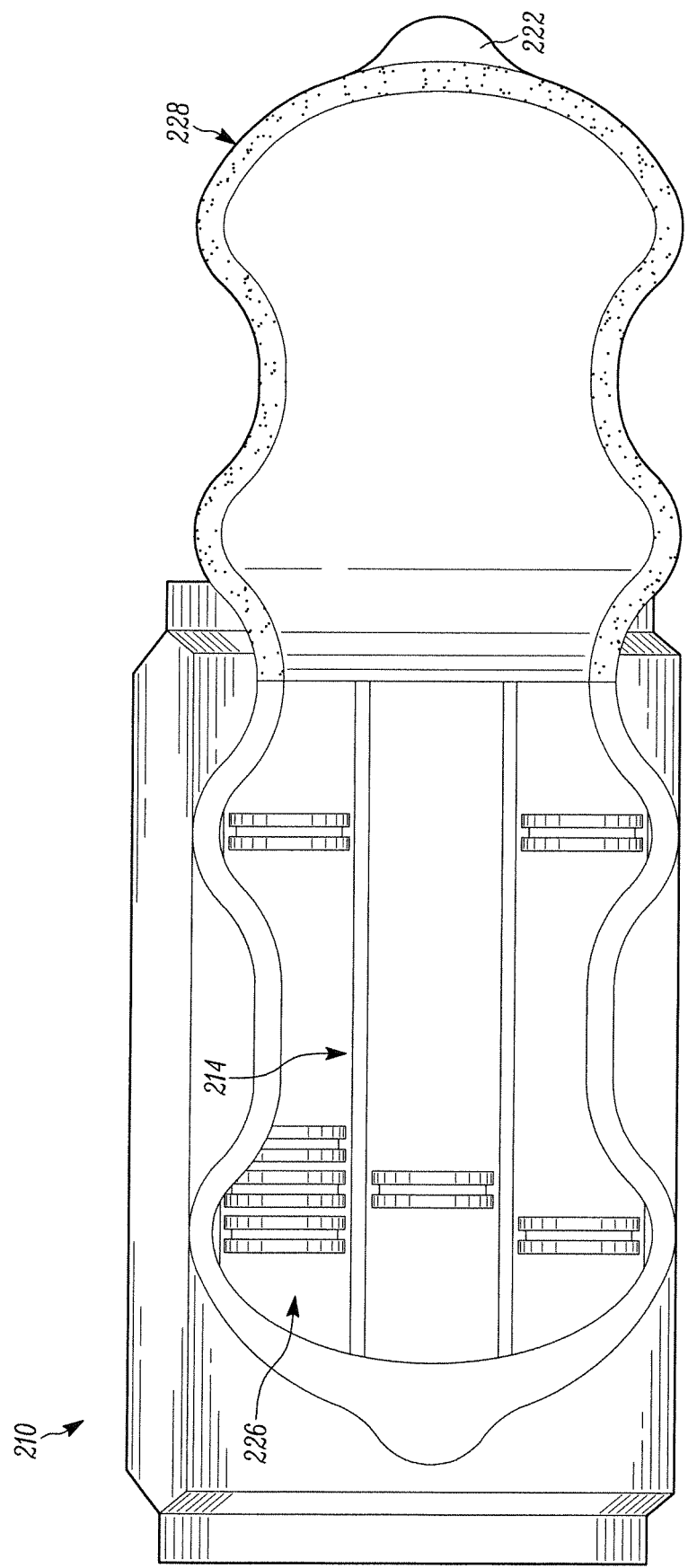
FIG. 7 comprises top perspective view of the package of FIG. 5 in an open configuration.

FIG. 5 illustrates a package 210 with a sealing layer 228 that can be lifted upward from a remainder of the package 210 to expose an access opening 226 (FIG. 7). Like the previously discussed package 10, the package 210 has expanded opening sections 244 that permit the food products 230 within the package to be easily removed from the package without interference from the package or the other products therein. Instead of two expanded opening sections 44 disposed proximate the end of the package with the starter portion, the package 210 includes a set of expanded opening sections 244 disposed proximate the starter portion 222 and a set of expanded opening sections 244 disposed proximate an opposite end of the package. As previously discussed, such expanded opening sections 44, 244, provide unimpeded access to the food products disposed adjacent to or therebelow. Thus, the addition of these expanded opening sections 44, 244 permits more food to be more easily accessible. Though the tray 214 depicted in FIGS. 5 and 7 has interior walls without the access tray openings 150, these also could be included in the package 210.

Figure 6:
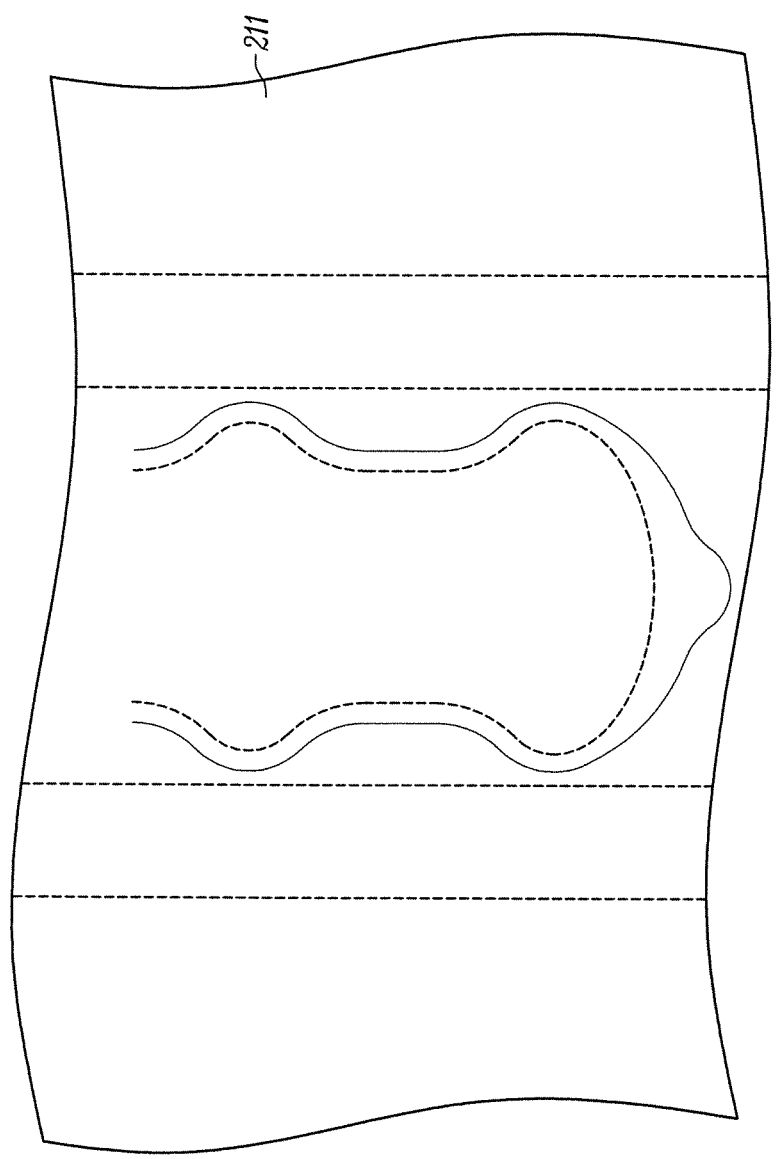
FIG. 6 comprises a plan view of a section of a film laminate formable into the package of FIG. 5.

FIG. 6 illustrates a portion of a flexible film laminate 211 that can be used to form the package 210 of FIGS. 5 and 7. This laminate 211 can be wrapped around one of the trays described herein and a plurality of seals formed therein to create a package. As can be seen in FIGS. 5-7, the reseal area 236 is generally consistent along the second portions 240.

Figure 8:
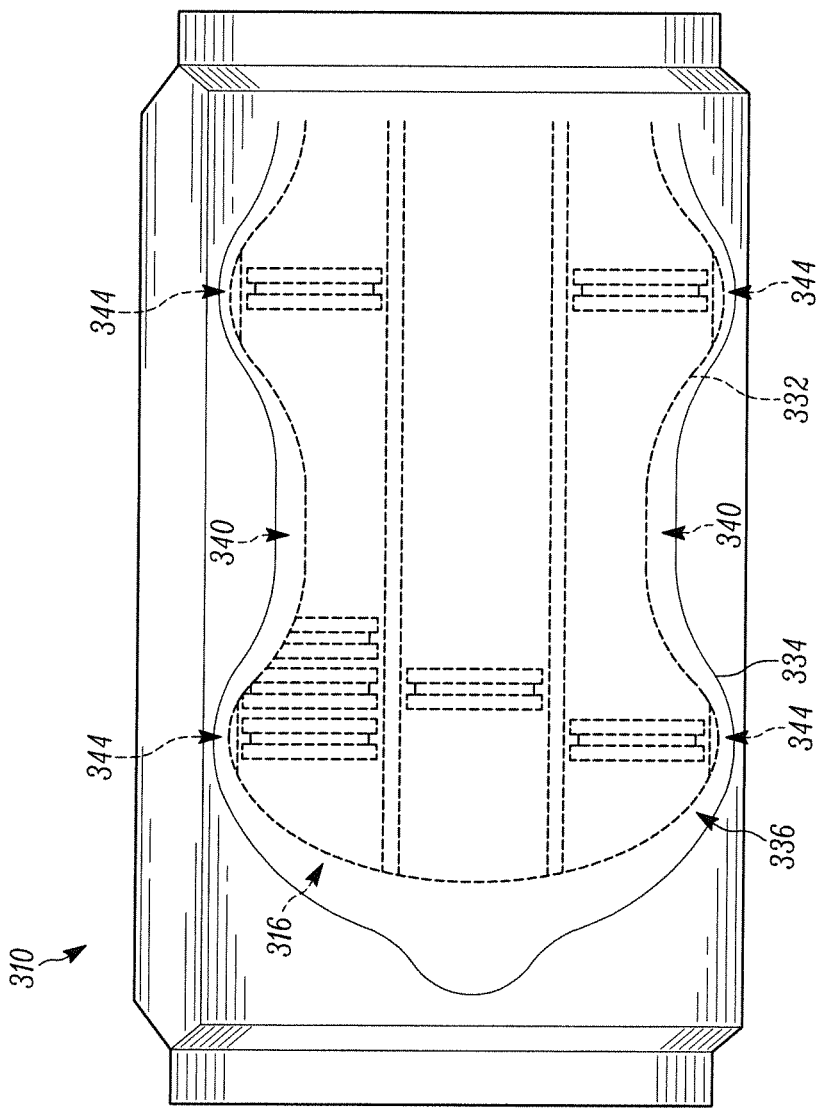
FIG. 8 comprises a top perspective view of another package with an improved access opening.
Figure 9:
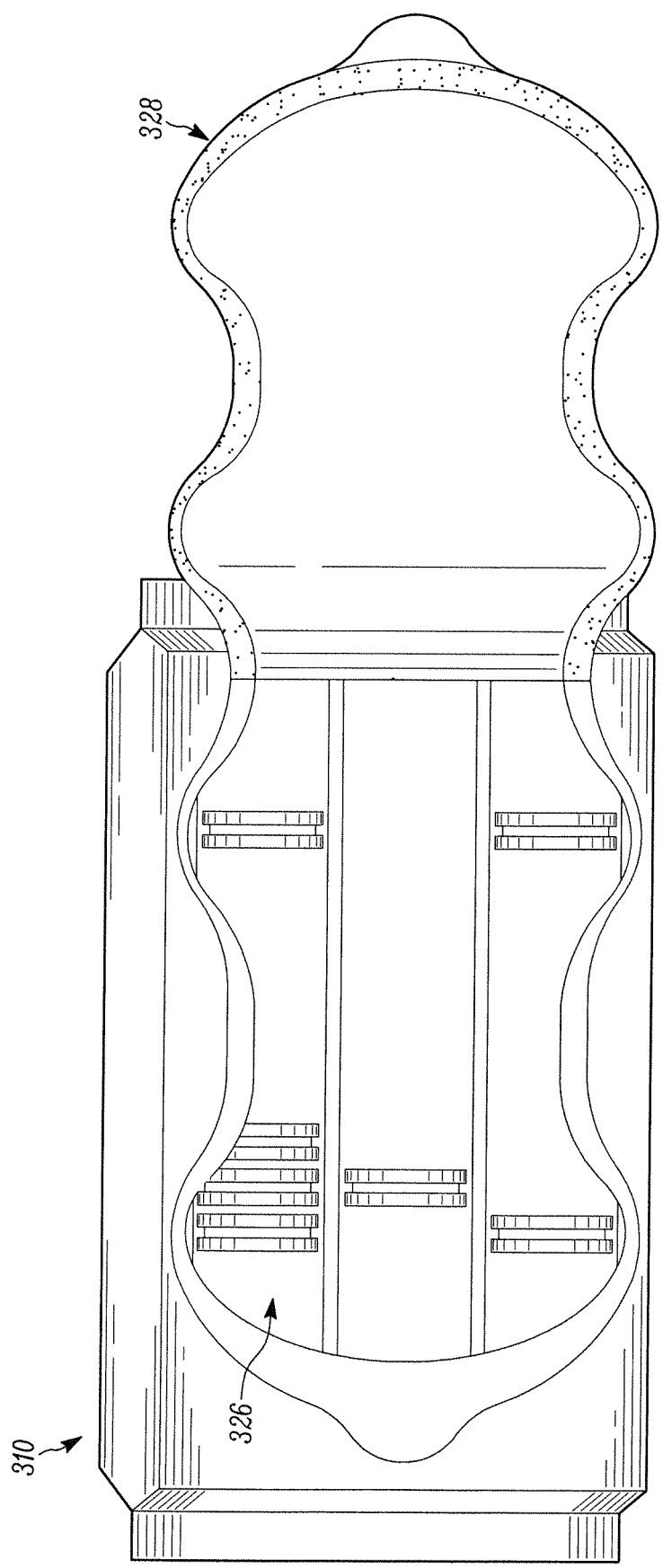
FIG. 9 comprises a top perspective view of the package of FIG. 8 in an open configuration.

Package 310, illustrated in FIGS. 8 and 9, is similar to package 210, however, the reseal area 336 has a second portion 340 with a variable width in between the first and second cuts 332, 334. As can be seen, the reseal area 336 is narrower in the portion adjacent the expanded opening sections 344 such that a distance between the first and second cuts at the expanded opening sections 344 is smaller than the distance between the remaining portions of the cuts. In this manner, the first cut 332 and 334 are not disposed a consistent distance from one another, and a variable force is needed to open the package 310 and peel the sealing layer 328 upward to expose the access opening 326.

Figure 10:
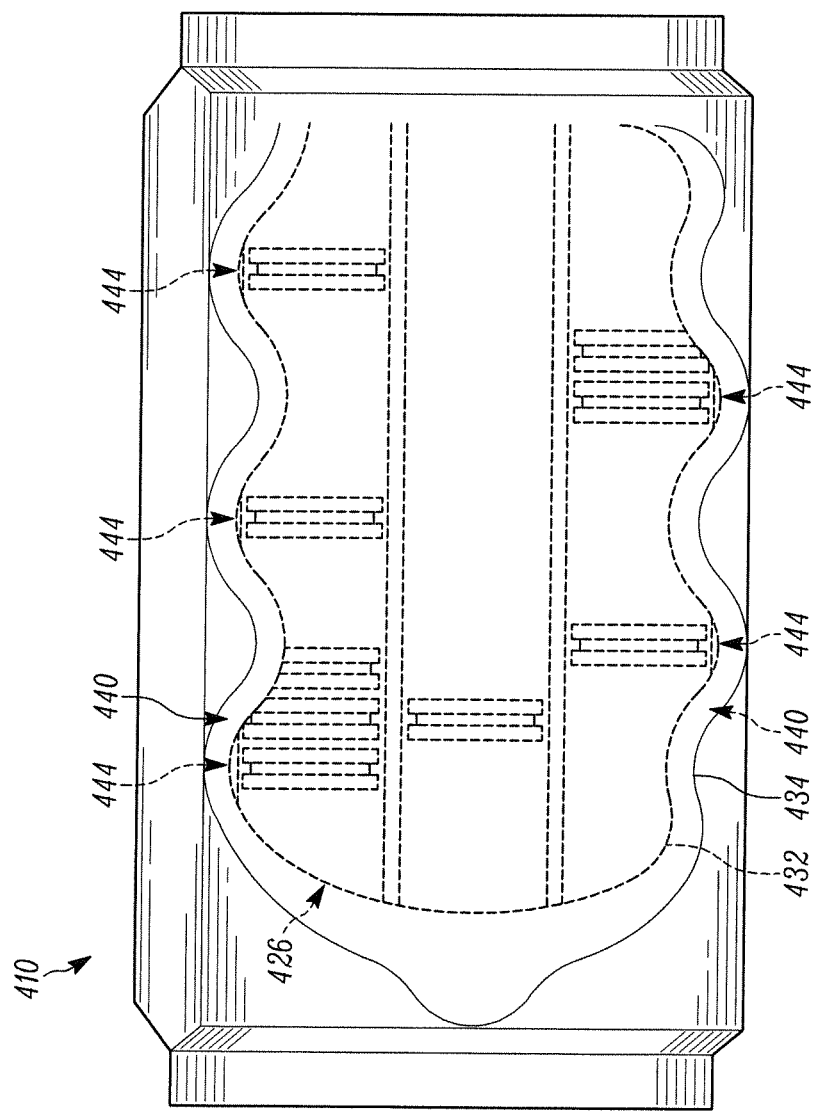
FIG. 10 comprises a top perspective view of another package with an improved access opening.

By one approach, the opposing side portions of the access cut have a wavy configuration defining multiple expanded opening sections. Further, whereas the previously described packages had expanded opening sections 44, 144, 244, 344 that extended outward from the center of the package at the same distance from the package ends such that the side portions of the cut are symmetrical with one another, the cuts also may replicate one another. For example, the package 410 illustrated in FIG. 10 has first and second cuts 432, 434 that follow the same configuration or replicate one another such that the expanded opening sections 444 on the sides of the reseal area 440 are disposed offset from one another along a length of the package 410. In the configuration of FIG. 10, the cuts 432, 434 form three expanded opening sections 444 on one side portion 440 and two expanded opening sections 444 on the other side 440 of the access opening 426. In this manner, the access opening has a centerline that is non-linear. Further, the package 410 may include a tray with openings, similar to those previously described herein.

Figure 13:
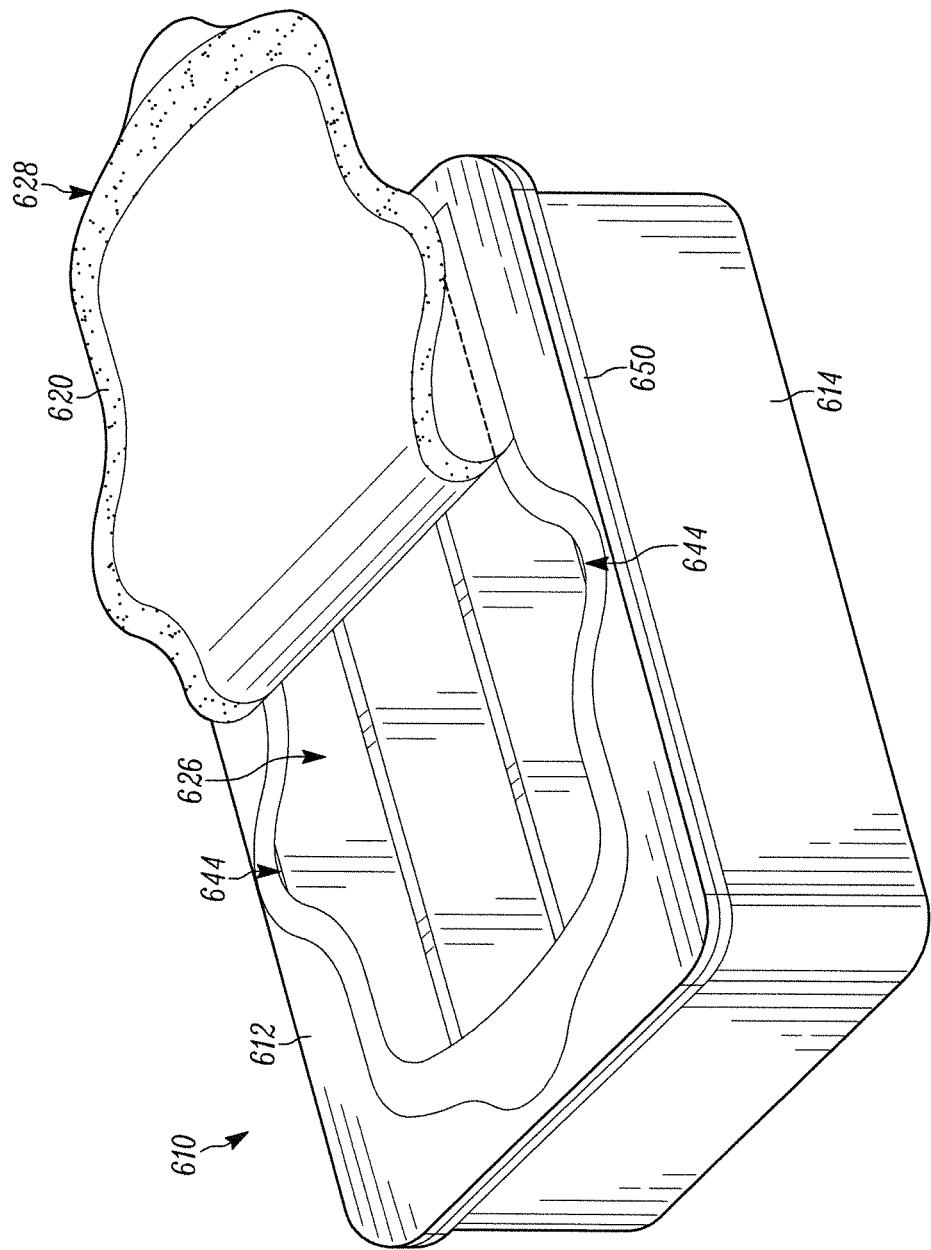
FIG. 13 comprises a top perspective view of another package with an improved access opening in an open configuration.

Though the previously depicted packages included a flexible film wrapped around a tray (i.e., a flow-wrapped package), the flexible film forming at least a top of the container may include a flexible film adhered or sealed to a tray itself. For example, as shown in FIG. 13, the tray 614 may include a flange 650 along its upper portion to which the flexible film 612 may adhere. The film 612 may include a sealing layer 628 that resealably covers an access opening 626 via a pressure sensitive adhesive 620. The access opening 626 includes expanded opening sections 644 that permit the discrete articles disposed adjacent thereto to more easily removed from the package 610.

Figure 14:
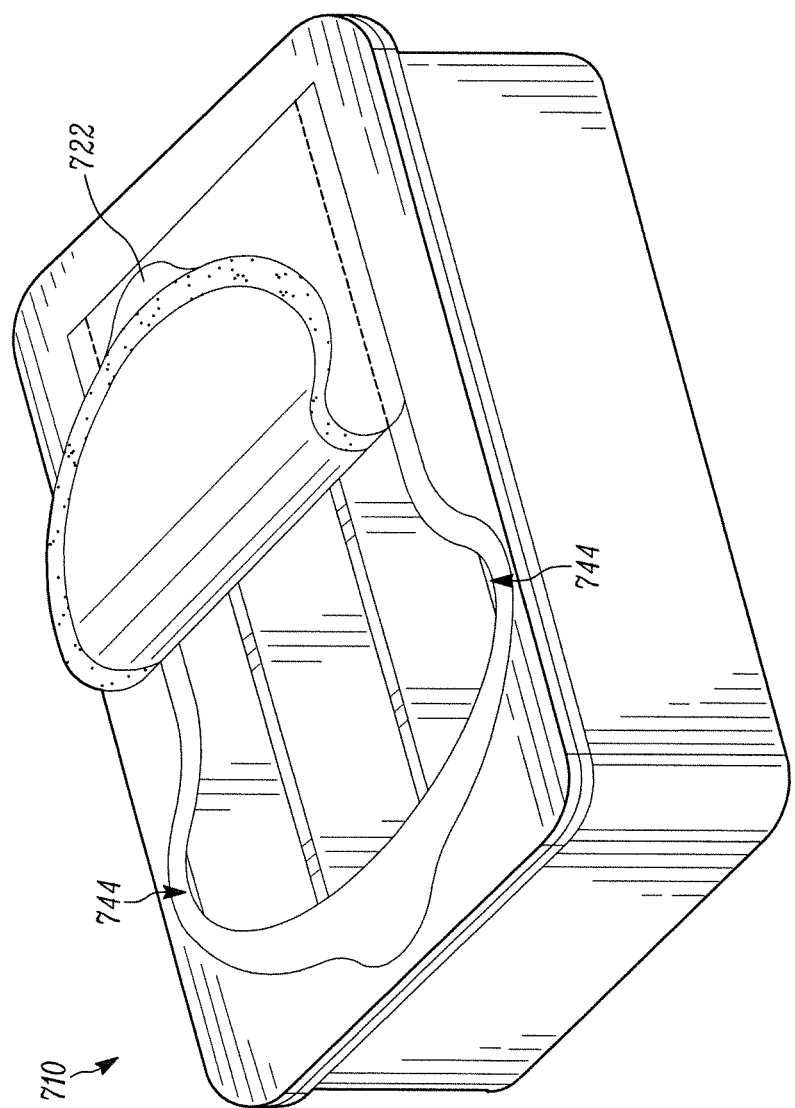
FIG. 14 comprises a top perspective view of another package with an improved access opening in an open configuration.

Though the expanded opening portions 644 in the package 610 are disposed near a center of the package along its length, the package 710, shown in FIG. 14, has expanded opening sections 744 disposed proximate the end of the package where the starter portion 722 is disposed in the closed configuration.

Figure 15:
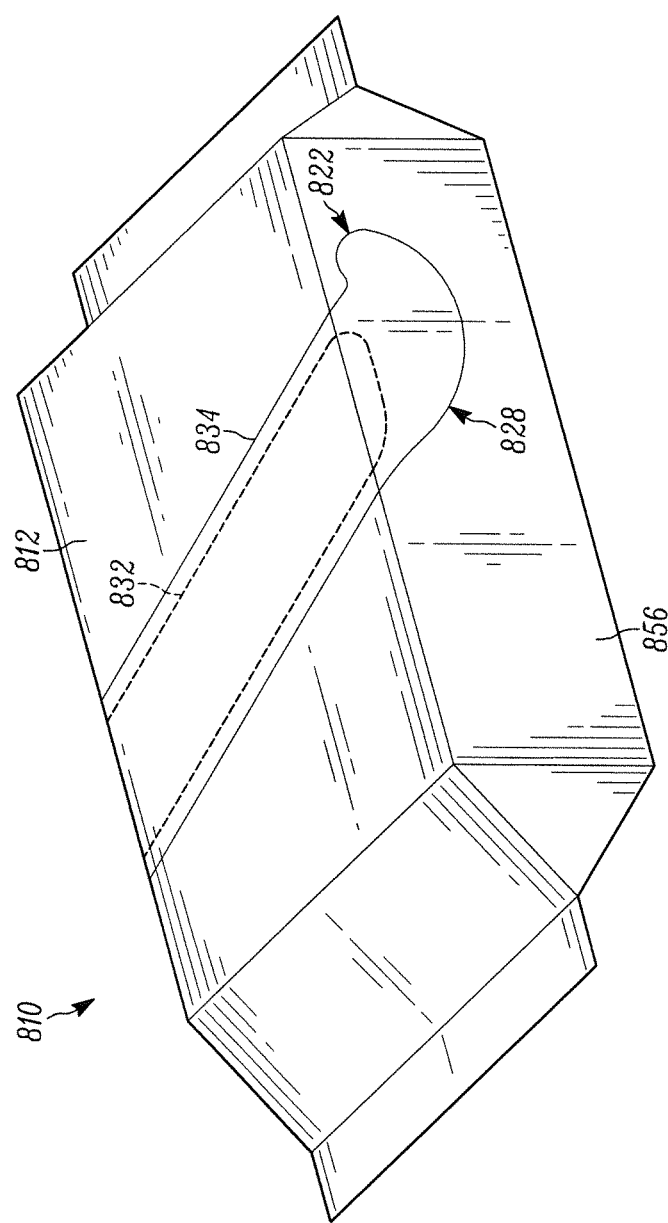
FIG. 15 comprises a side perspective view of another package with an improved access opening.

As noted above, to provide improved access, the package may include a tray with openings or windows therein to permit the discrete food articles to move within the container to become more readily accessible for the user or consumer. Such a tray need not be incorporated into a container or package with an access opening having expanded portions along the sides of a reseal area. As shown in FIG. 15, a package 810 may have a more narrowly configured sealing layer 828 than those previously described. Further, though the previously described sealing layers, access openings, and reseal areas extended the length of the package, such feature also could extend across the width of the packages, as illustrated in FIGS. 15-17, 22, and 23. Further, the sealing layers, access openings, and reseal areas may extend diagonally across the package such that these are not orthogonal to the width or length of the package.

In addition to extending across the width of the package 810, the sealing layer 828 and the access opening 826 extends from a front or side wall or surface 856 of package 810 to a back or side wall or surface 858 of the package. In this manner the discrete products 830 disposed within the package are easily accessible from within the package 810 without interference from the film 812. More particularly, in the illustrative configuration of FIG. 15, the first and second cuts 832, 834 extend across the width of the package to the front wall 856 of the package 810. The starter portion 822 also is disposed on the front wall 856, and may be disposed in a number of different locations. The starter portion 822, as illustrated, is disposed on a side of the sealing layer 828 and not at the leading edge of the sealing layer 828. By being positioned on a side of the sealing layer 828 and a side of the package 856, a user can easily grasp the starter portion 822 when the package 810 has its bottom or lower surface on another surface such as a table or countertop. The rear wall 858 illustrates the first and second cuts 832, 834 having terminal ends that round or angle inward, though the cuts also could extend in the opposite direction away from the center of the package. This termination of cuts 832, 834 prevents or restricts the cuts from further tearing.

Figure 16:
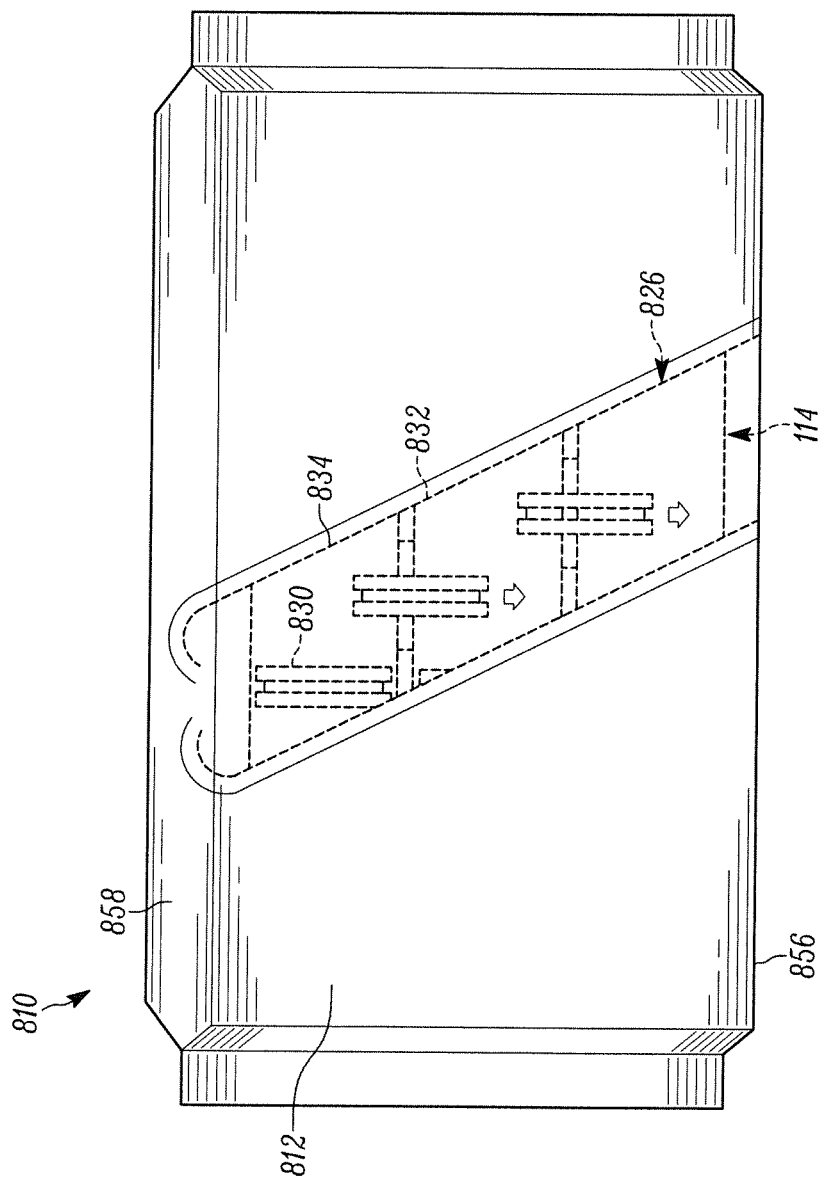
FIG. 16 comprises a top perspective view of the package of FIG. 15.
Figure 17:
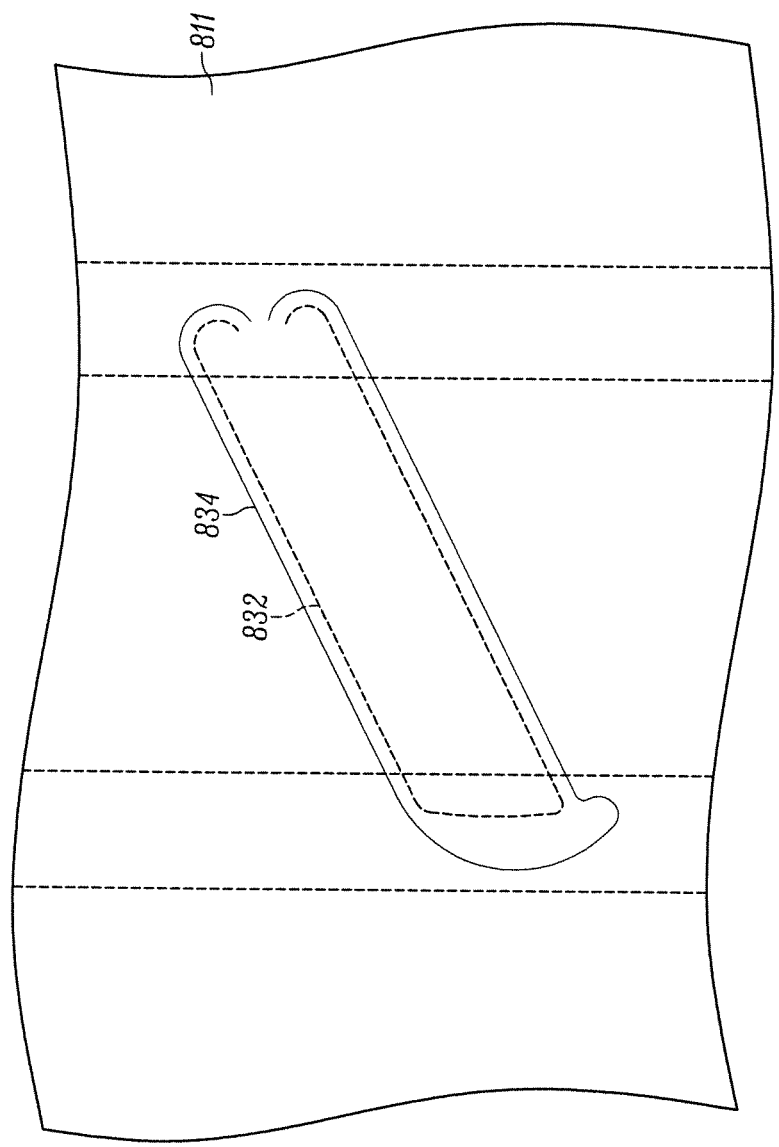
FIG. 17 comprises a plan view of a section of a film laminate formable into the package of FIG. 15.
Figure 19:
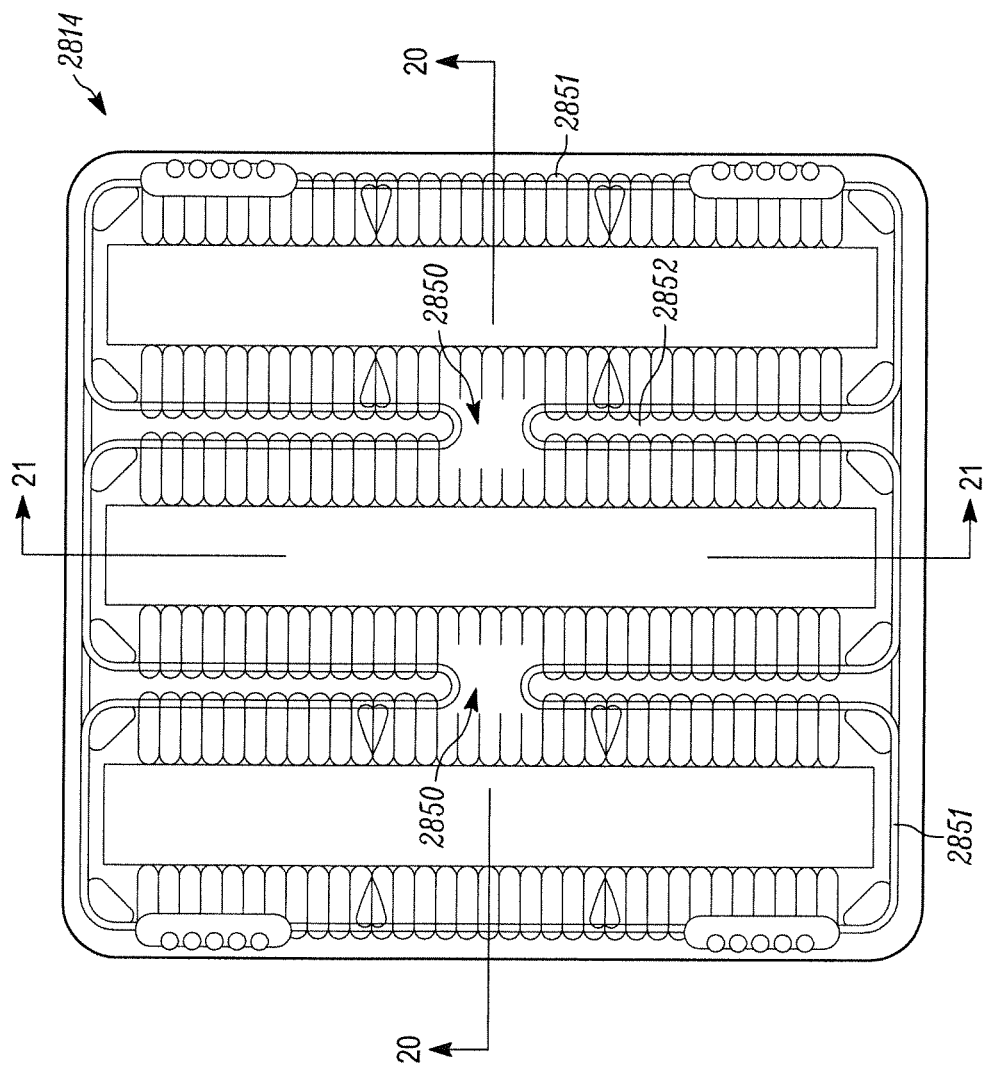
FIG. 19 comprises a top plan view of a tray with accessibility openings.

The package 810 of FIG. 16 illustrates a tray 114 that permits the food products 830 to transfer or move from one row or column to another row or column without removal from the package. Tray 114, also illustrated in FIG. 18, permits the food products 830 to slide or move within the row or column itself. Thus, the food product 830 disposed within the package 810, but not below the opening 826 can move from a location near an end 160 of the tray toward the center of the tray. Another tray, similar to tray 114 is illustrated with more detail in FIG. 19. Like tray 114, tray 2814 of FIG. 19 includes openings 2850 and also may be incorporated in the package 810. FIG. 17 illustrates a portion of a laminate 811 that can be used to manufacture the package 810 described herein. As illustrated, the first and second cuts 832, 834 extend over the lines that subsequently form the edges of the top of the package.

Figure 27:
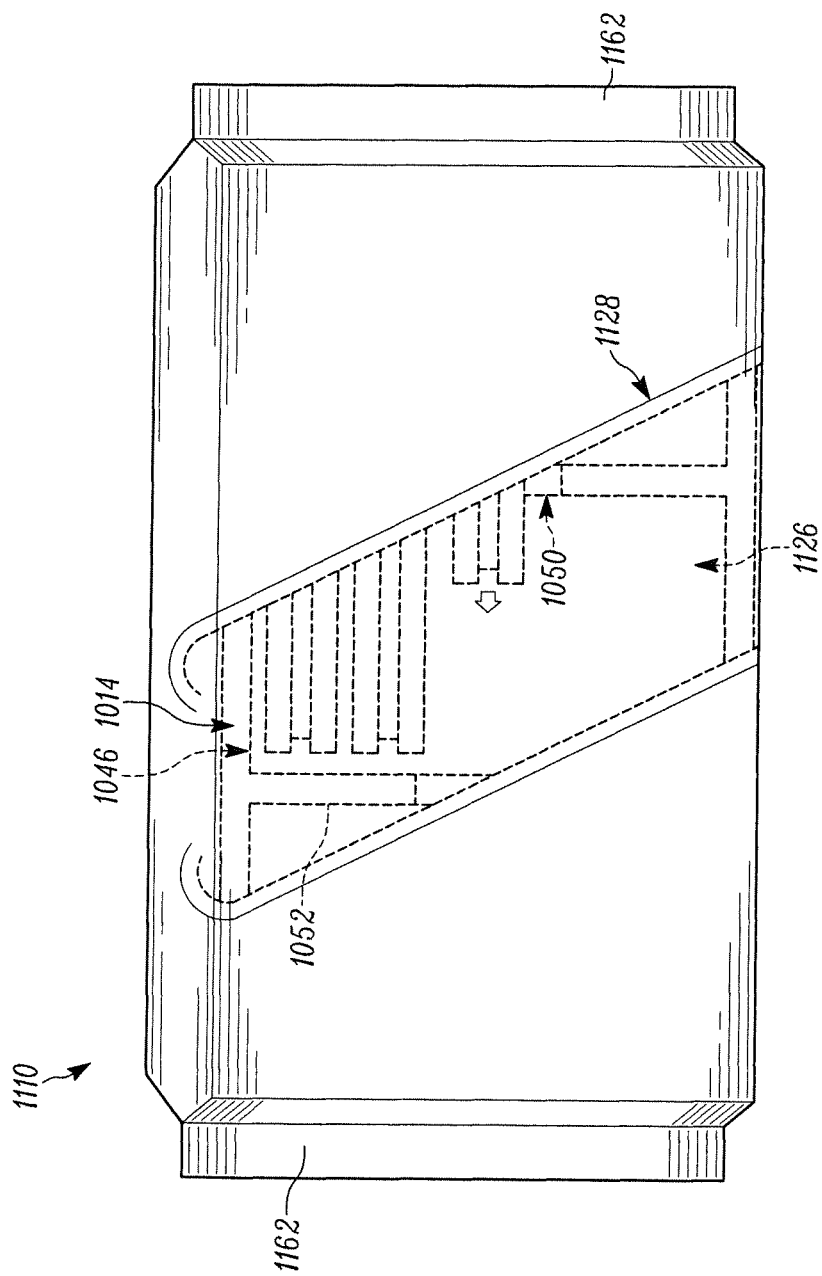
FIG. 27 comprises a top perspective view of another package with an improved access opening.
Figure 28:
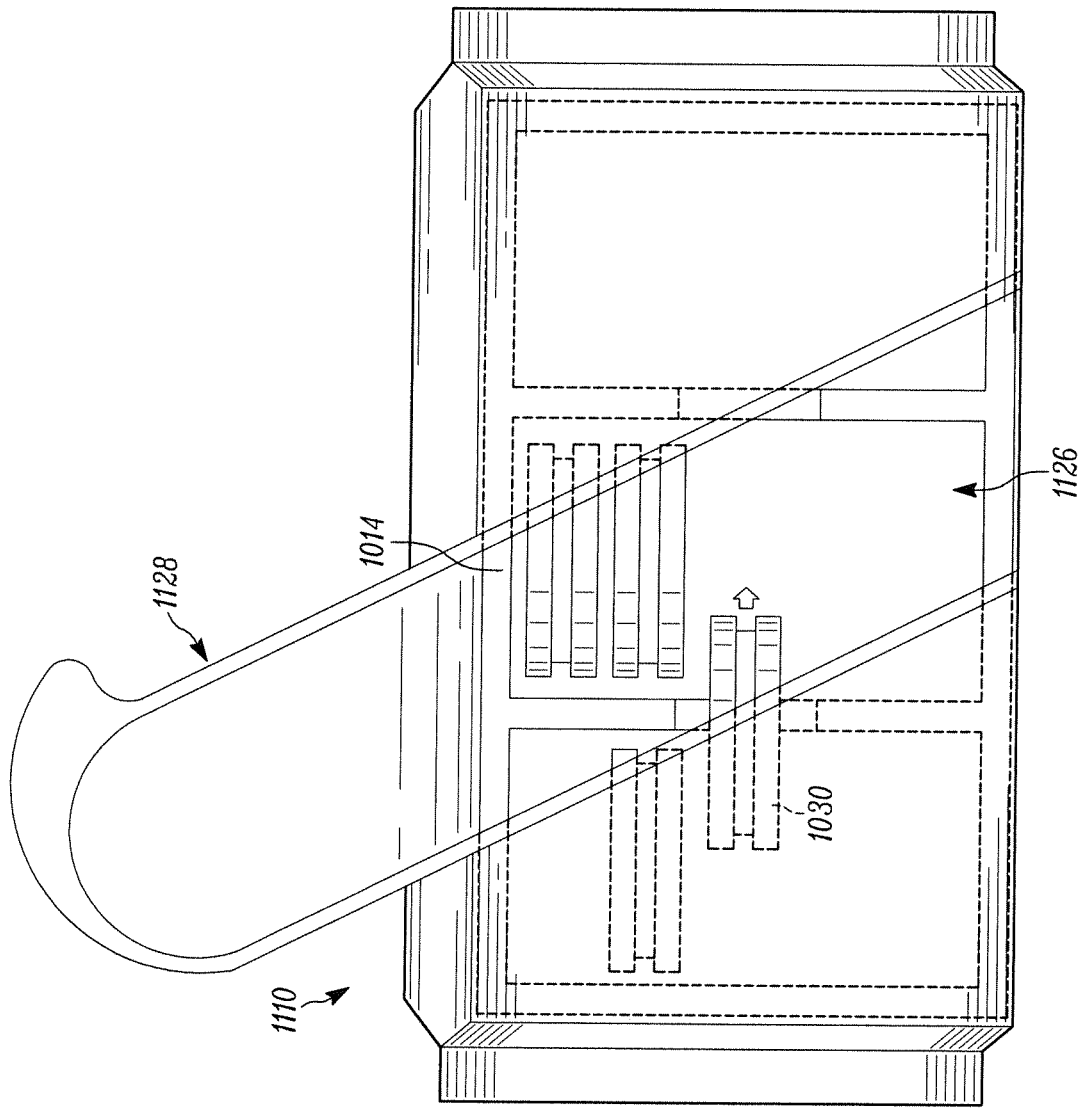
FIG. 28 comprises a top perspective view of the package of FIG. 27 in an open configuration.

FIGS. 27 and 28 illustrate a package 1110, similar to package 810, but with a differently configured tray 1014 disposed therein. FIG. 27 illustrates the package in the closed configuration, with the contents disposed below the subsequently exposed access opening 1126 shown in dashed lines. FIG. 28 illustrates the package in the open configuration, with the contents obscured by the film being shown in dashed lines. In this manner, the tray 1014 has rows or columns that extend across the width of the package, like the sealing layer 1128 and access opening 1126 that extend or angle across the package 810. Further, the tray 1014 has tray openings 1050 disposed within the tray walls 1052 that permit the food product 1030 disposed below the film 1012 near the side or end seals 1162 of the package 1110 to move into the center row or column 1046 of the tray 1014.

Figure 22:
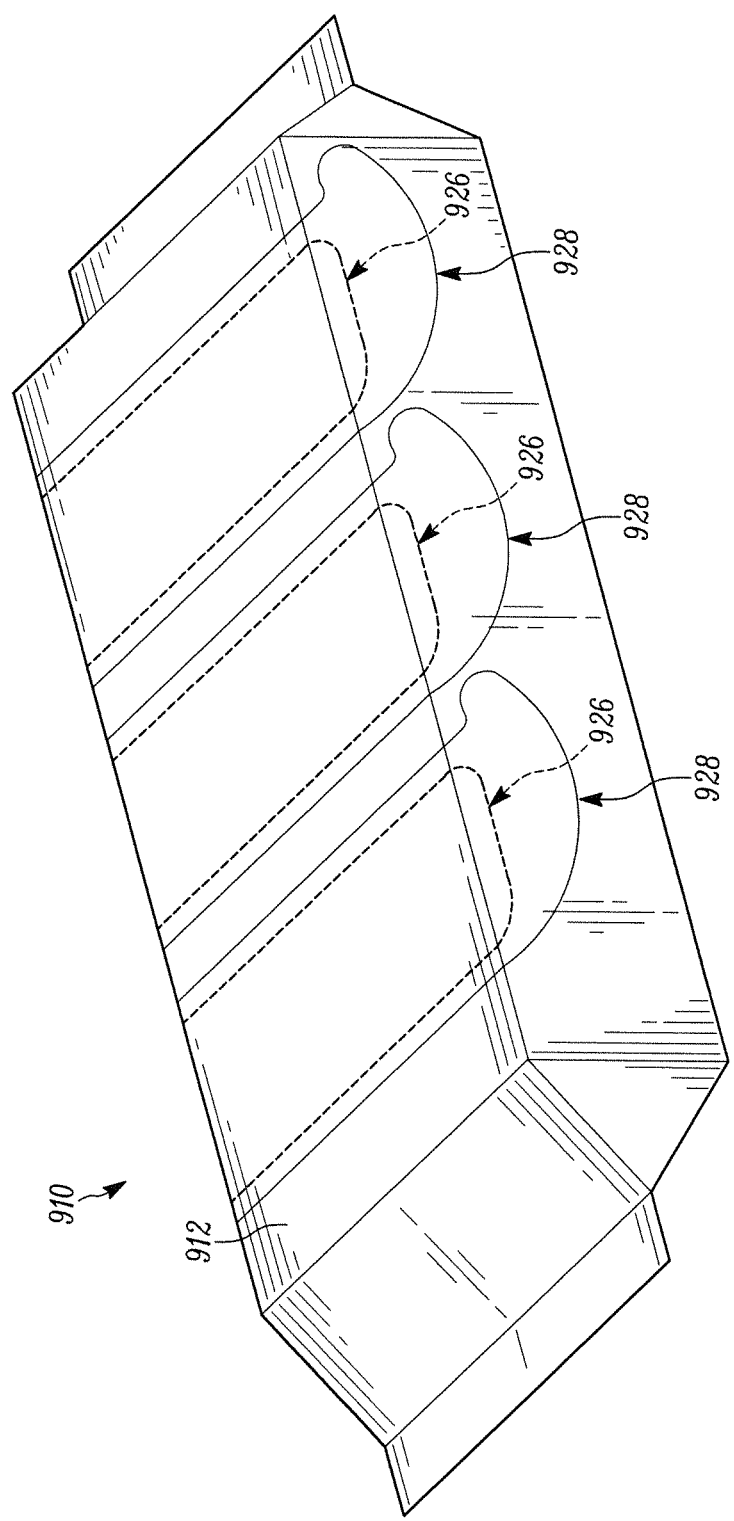
FIG. 22 comprises a side perspective view of another package with improved access openings.
Figure 23:
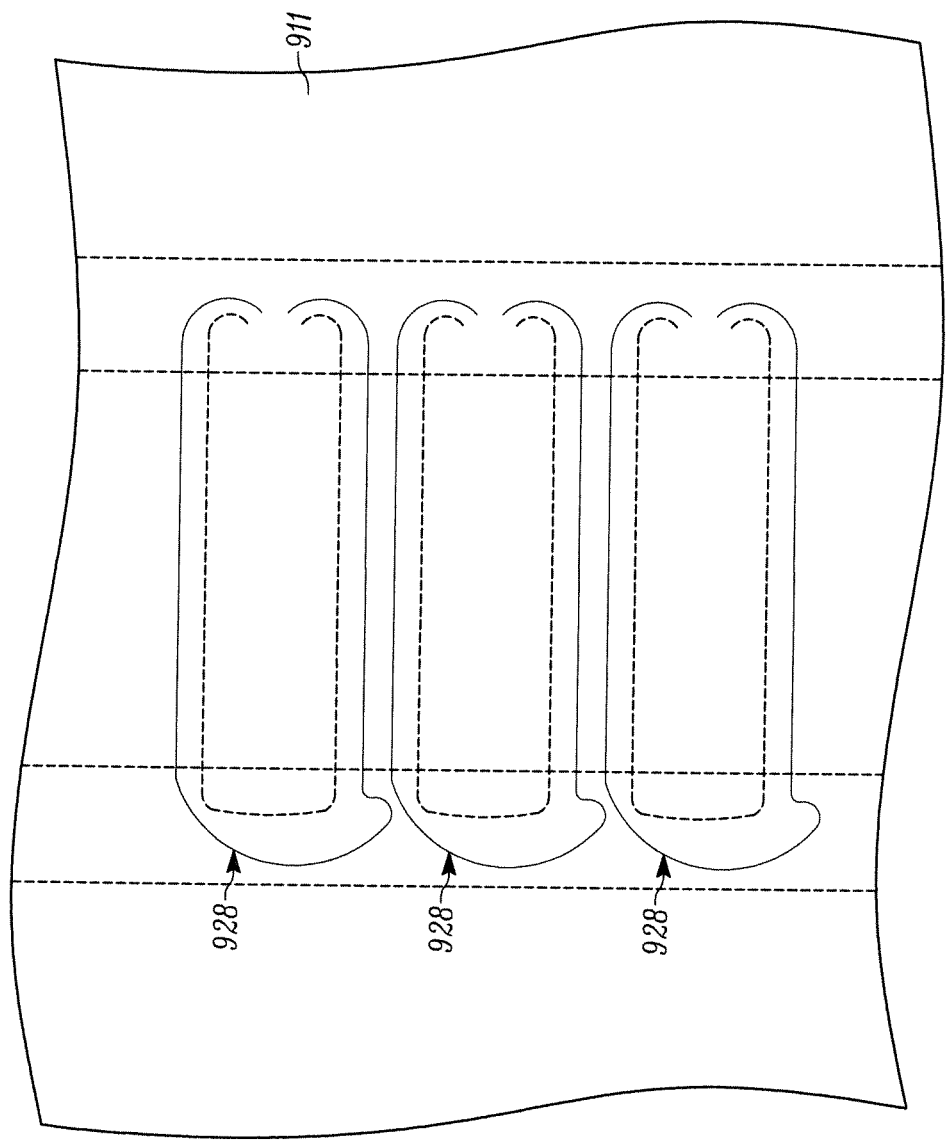
FIG. 23 comprises a plan view of a section of film laminate formable into the package of FIG. 22.

FIG. 22 illustrates a package 910 with a plurality of access openings 926 and sealing layers 928 disposed across the width of the package. The plurality of access openings 926 and sealing layers 928 provide access to substantially all of the food products 930 (FIG. 24) disposed within the package 910 without relying on the configuration of the tray disposed within the package 910. For example, though the package 810 featured a tray 814 that facilitated movement of the discrete articles, the package 910 does not require such movement of the contents and may be employed with a tray lacking tray openings, such as tray 914 shown in FIG. 25.

Figure 24:
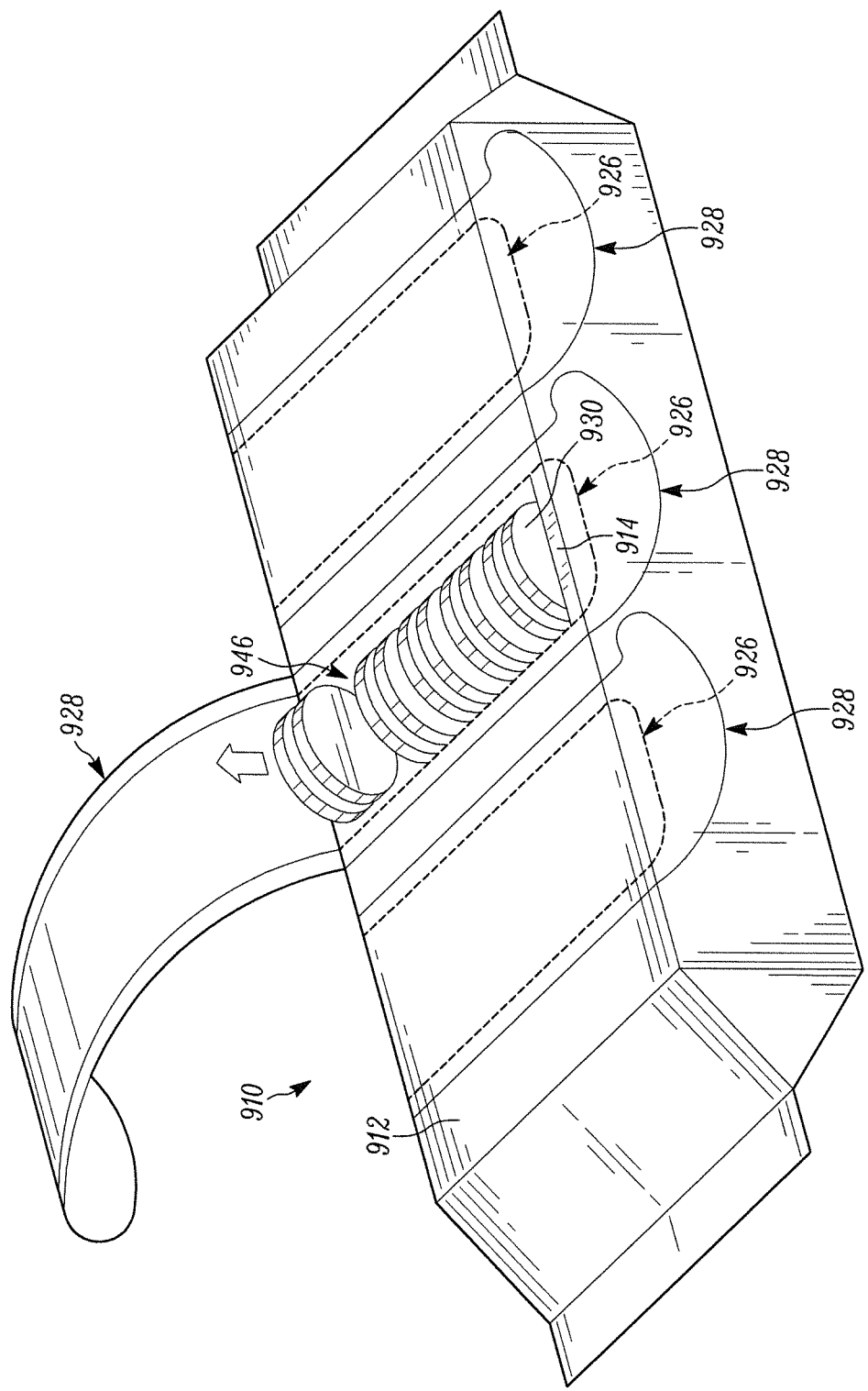
FIG. 24 comprises a perspective view of the package of FIG. 22 in a partially open configuration.

As shown in FIG. 24, when one of the sealing layers 928 is lifted upward from a remainder of the package 910, the food products 930 disposed in the row 946 therebelow are easily accessible and can be lifted and removed from the package 910 as shown. In this manner, the cross-package openings 926 permit access to each of the discrete food articles without interference from the sides of the flexible film 912.

The package 910 has a tray 914, which is further illustrated in FIG. 25. Each of the sealing layers 928 covers a distinct row, column, or cell of the tray 914. In one approach, the width of the sealing layers 928 is large enough to permit the discrete products disposed within the package to be removed from the tray 914 without interference from the film 912. Though not required, a tray, such as tray 1014, may be incorporated into the package 910 to permit the discrete products to move more freely within the package 910.

A laminate 911 (FIG. 23), which can be used to form the package 910, includes three sealing layers 928 and cuts that subsequently form access openings 926 that extend across the width of the package and perpendicular to the length of the package 910. In this manner, when the laminate 911 is wrapped and sealed around the tray 914, the sealing layers 926 are disposed along the open tops 964 of the tray 914 corresponding to the rows or columns 946.

Figure 29:
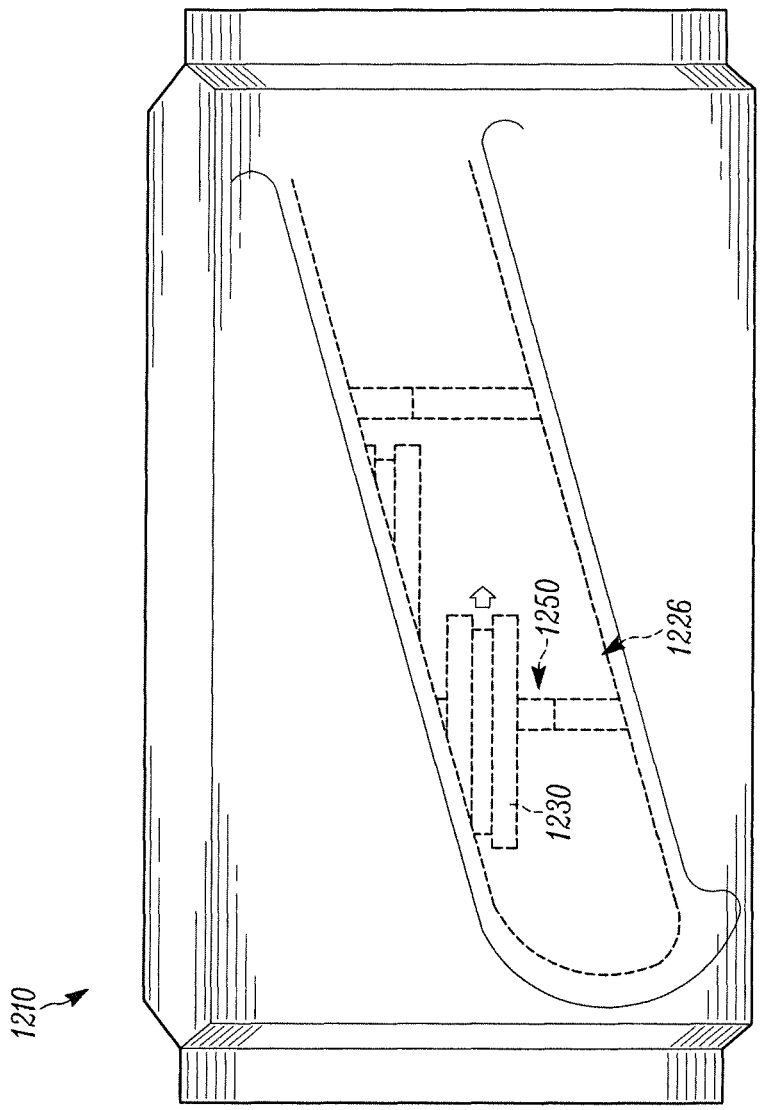
FIG. 29 comprises a top perspective view of another package with an improved access opening.

As discussed and illustrated, the access openings and reseal areas may extend perpendicular to or parallel with the length or width of the package. Furthermore, the access openings and reseal areas may be diagonal or angled across the width or length of the package. For example, FIGS. 27 and 28 illustrate an access opening 1126 that is angled across the width of the package. Further, FIG. 29 illustrates another package 1210 with a non-orthogonal opening. The opening 1226 of FIG. 29 is angled along the length of the package. For example, a first, leading end of the access opening 1226 may be closer to a first corner and the trailing end of the access opening 1226 may be closer to a second corner that is offset or diagonal from the first corner. These angled cuts or cross package openings may provide significant access to the products within the container depending on the tray therein. To provide access to the contents 1230, the tray 1214 within the package may have openings 1250 therein. The trays described herein may have a configuration that permits increased access to the products within the package. As illustrated in FIGS. 18, 19, 26, 30, and 32, the trays may have tray openings or windows in the interior walls that permit the contained articles or product to move between the rows or columns of the tray. The trays typically have a perimeter wall with a first height and an interior wall with an interior wall height that may be the same as or nearly as tall the first height. If the interior wall height is shorter than the first height, the height difference is not significant enough to permit the products to move between rows or columns without a tray window or opening.

The tray may further include a second height at the tray openings. In one approach, the tray opening has a second wall height that is more than 50% smaller than the first wall height. By yet another approach, second wall height is less than about 10% of the first wall height such that the tray opening has a height that is 90% smaller than the height of the perimeter wall. In yet another configuration, the tray opening will not have a wall height or the second height will be zero, as discussed below.

The tray openings permitting movement of the product may be formed in a number of manners. In one approach, illustrated in FIGS. 19-21, the tray 2814 includes a perimeter wall 2851 having a flange 2853 at a top edge of the wall 2851. Further, the tray 2814 may include interior walls 2852 that extend the length of the tray. These interior walls 2852 also include tray openings 2850 disposed therein. Though the tray openings 2850 are disposed at the mid-point along the length of the walls 2852, the openings 2850 may be off-set from the center of the length of the wall.

Figure 20:
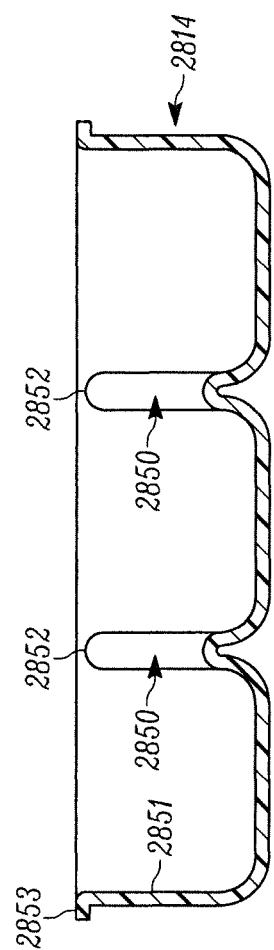
FIG. 20 comprises a cross sectional view taken along line 20-20 of FIG. 19.
Figure 21:
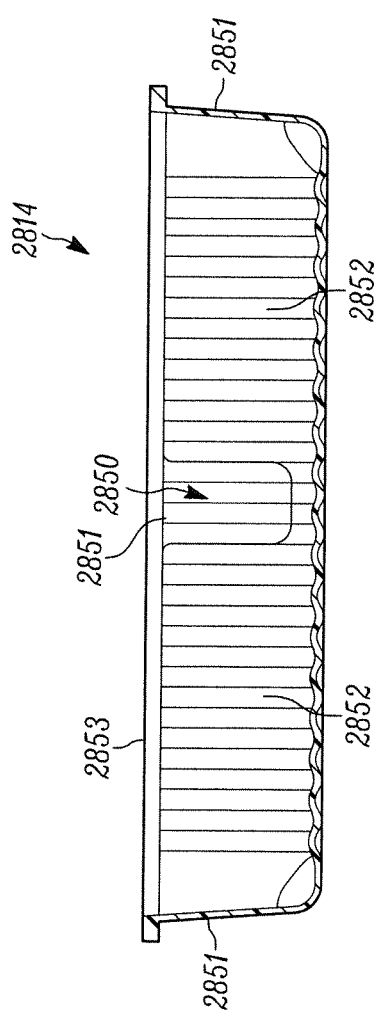
FIG. 21 comprises a cross sectional view taken along line 21-21 of FIG. 19.

As illustrated in the cross-sectional view of FIG. 20, the tray has a second height at the tray openings 2850 such that the floor of the opening is not parallel with the floor of the column or row, but slightly higher than the floor of the column or row. As noted above, the second height may be less than 50% of the height of the perimeter wall, and may be less than 10% of the perimeter wall height.

Figure 31:
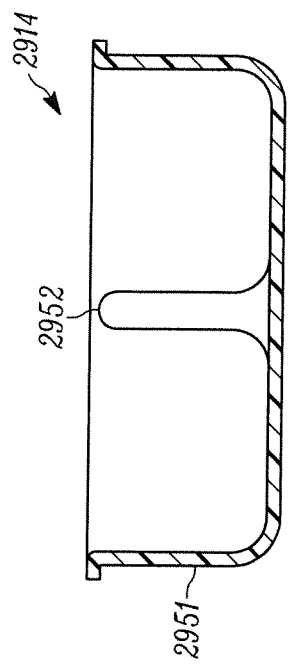
FIG. 31 comprises a cross sectional view taken along line 31-31 of FIG. 30.
Figure 30:
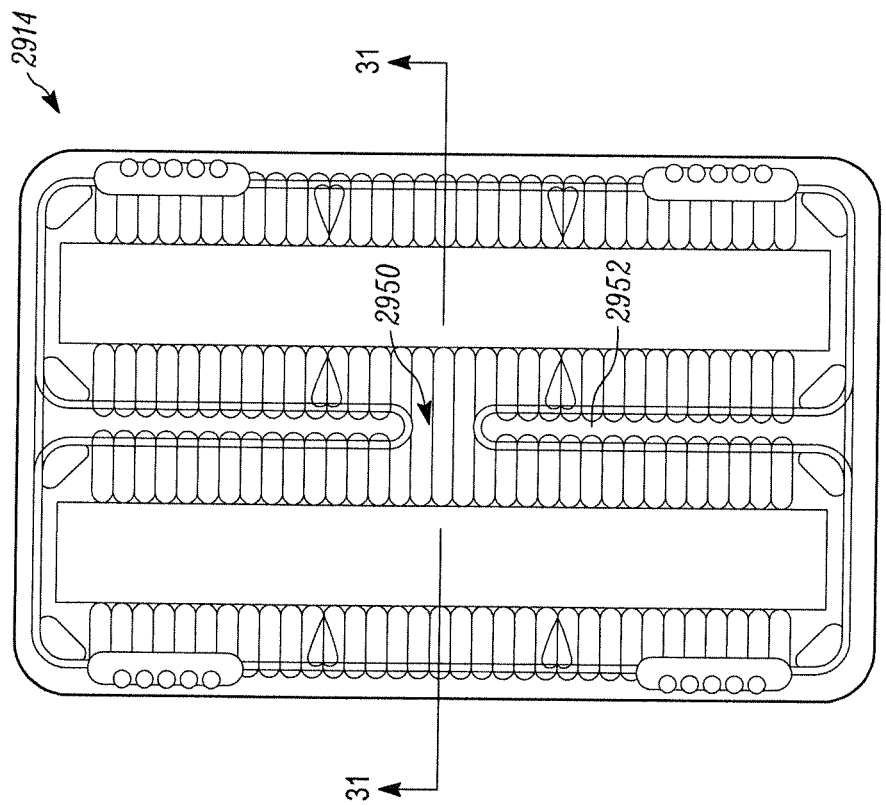
FIG. 30 is a top perspective view of another tray.

FIGS. 30 and 31 illustrate another tray configuration that can be employed with the packages described herein. The tray 2914 includes a perimeter wall 2951 and interior wall 2952 and a tray opening 2950 disposed in the interior wall 2952. The tray opening 2950 does not have a wall height or has a height equal to zero. In this manner, the floor of the column or row will be about parallel to the floor of the tray opening 2950. In this manner, the tray 2914 appears to have a flat bottom across the center of the tray 2914, as shown in FIG. 31.

Figure 32:
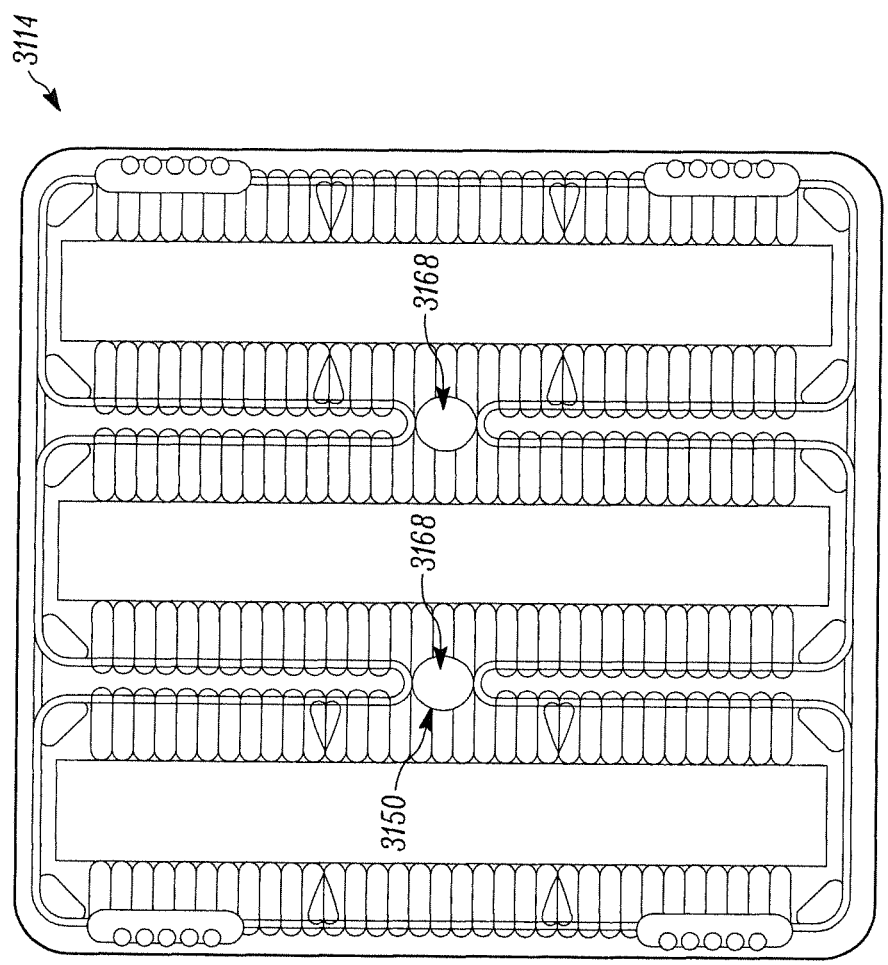
FIG. 32 comprises a top plan view of another tray.
Figure 33:
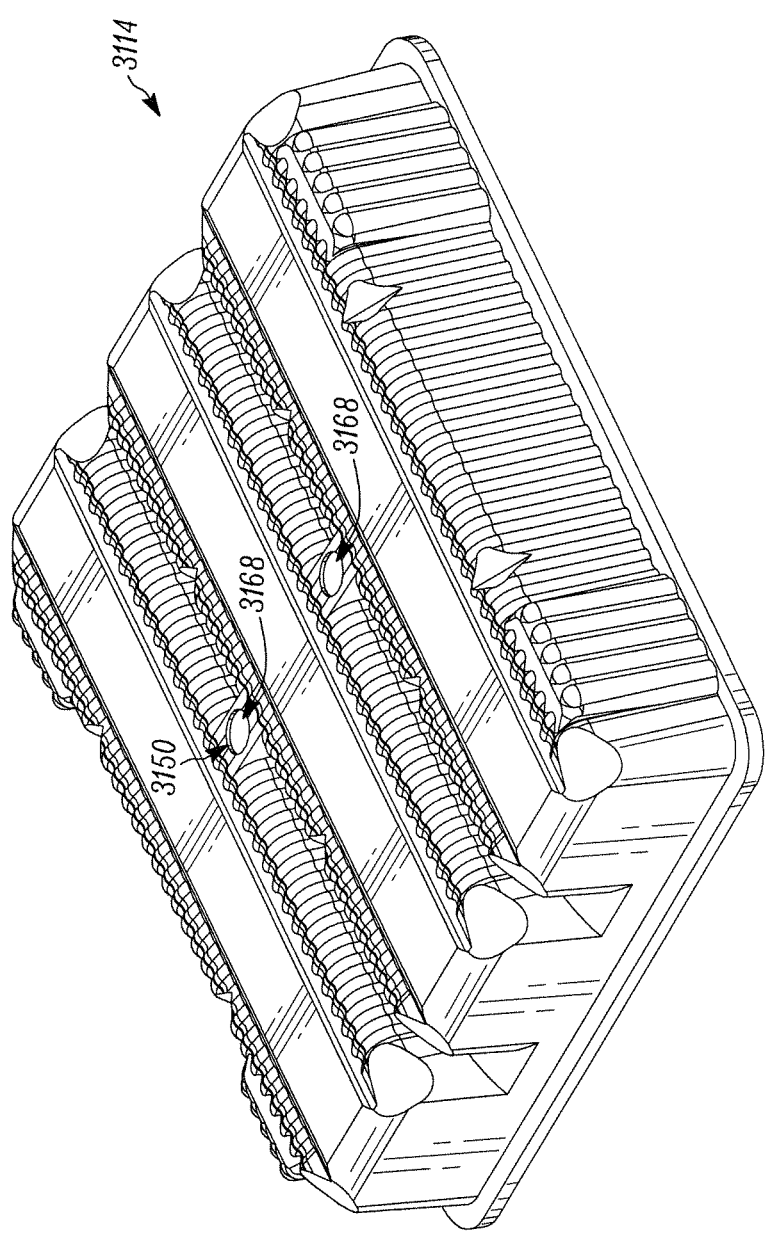
FIG. 33 comprises a bottom perspective view of FIG. 32.

In yet another embodiment, a tray 3114, which may be incorporated into the packages described herein, may include holes or floor openings 3168. These floor openings may be formed, for example, by punching or stamping out a portion of the tray. In this manner, the tray opening 3150 has no wall height or a height of zero. Furthermore, the crumbs collecting in the tray 3114 can fall through the tray, but remain captured by the film wrapped around the tray. Furthermore, the openings 3168 may assist with de-nesting of stacked packages. FIGS. 32 and 33 illustrate one example of such a tray 3114 with holes within the floor of the tray.

Trays used in flow wrapped packages are often shipped to the packaging plant in stacks. To permit easy separation of the trays, the walls of the trays can have de-nesting lugs in some of the walls. The de-nesting lugs are slightly off-set from one another such that the trays adjacent one another do not completely nest together. The de-nesting lug is slight irregular in each of the trays so that the trays do not completely nest together, which makes them difficult to separate from one another. The de-nesting lugs are typically very slight irregularities in the height of the walls, which do not permit movement of the product. Alternatively, the tray openings 150, 1050, 1250 described herein are notably larger than the de-nesting lugs and permit movement of the contained product. Further, the tray openings described herein also may be configured to permit the trays to de-nest, while providing for movement of the products packaged within the tray via tray openings. In this way, the tray openings 150, 1050, 1250 may be formed in an off-set configuration, which thereby removes the needs for separate de-nesting lugs.

Figure 34:
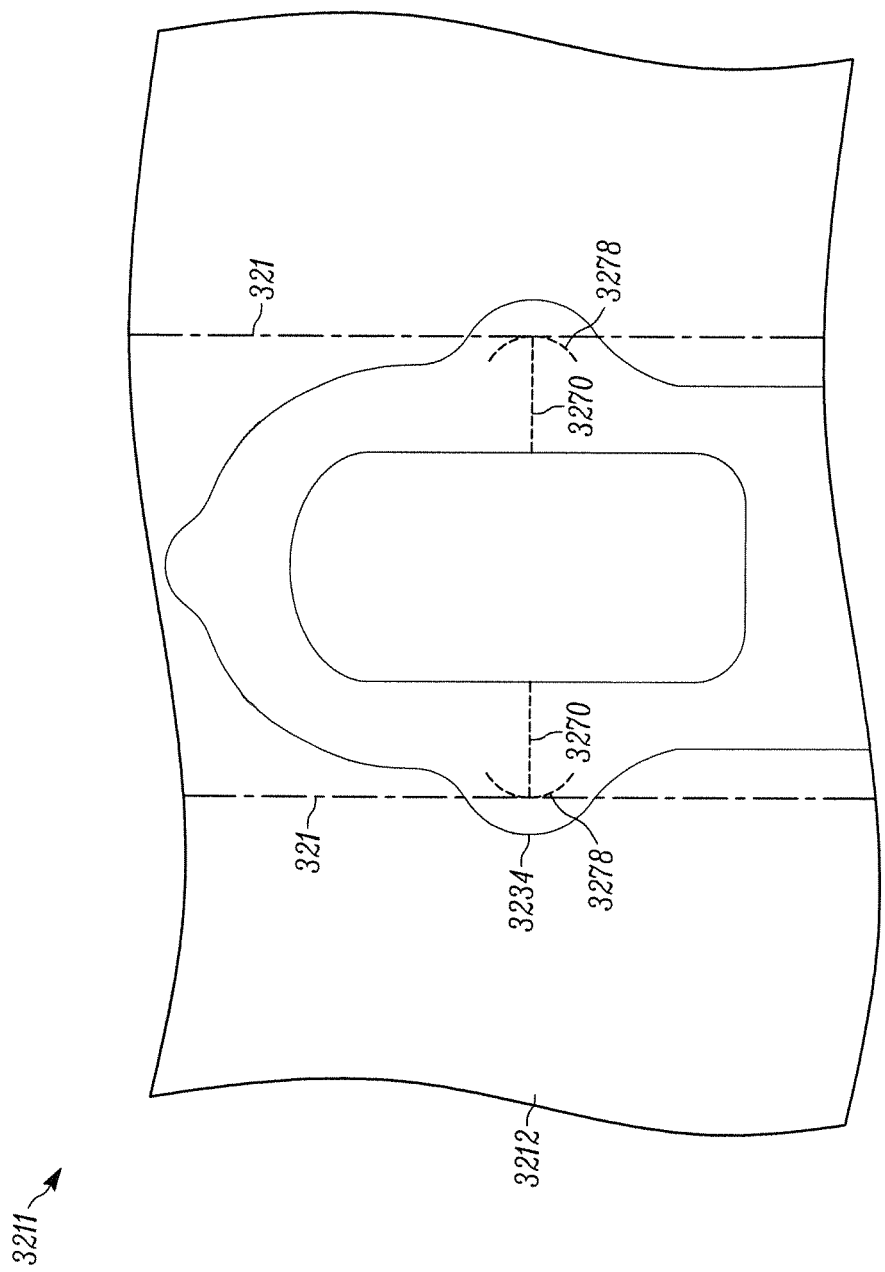
FIG. 34 comprises a plan view of a section of a film laminate formable into a package with an improved access opening.
Figure 35:
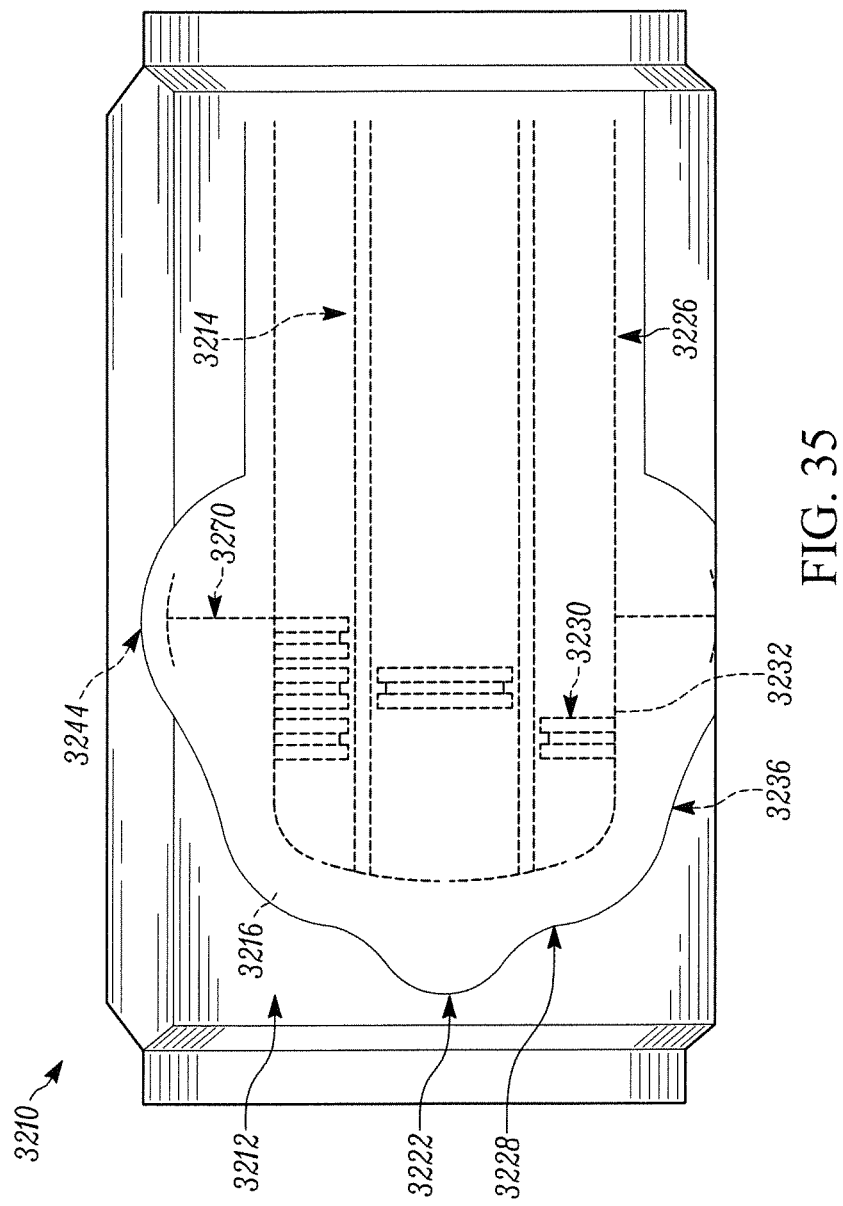
FIG. 35 comprises a top perspective view of a package incorporating the film laminate of FIG. 34.

FIG. 34 illustrates another film laminate that may be used to form a package having improved contents accessibility. The laminate 3211 of FIG. 34 shows the surface of the film 3212 that becomes the inside surface of the package 3210 (FIG. 35), though both first and second cuts are shown for illustrative purposes. The package 3210, shown in FIG. 35, includes a film 3212 wrapped around a support, insert, or tray 3214. The film 3212 comprises an inner film layer 3216 and an outer film layer 3218. The package 3210 includes an access opening 3226 formed, at least in part, by a first, access cut in the first film layer 3216 and a second, perimeter cut in the second film layer 3218. The access cut 3232 forms a flap 3224 and the perimeter cut 3234 forms a sealing layer or panel 3228. To expose the access opening 3226, the sealing layer 3228 can be lifted by grasping a starter portion 3222 and pulling upward to release a portion of the sealing layer 3228 from a remainder of the package 3210.

To permit the package 3210 to be resealed after the access opening 3210 has been initially opened, a pressure sensitive adhesive 3220 (FIGS. 36 and 37) is disposed in at least a portion of a reseal area 3236 between the access cut 3232 and the perimeter cut 3234. Though the pressure sensitive adhesive 3220 is disposed between at least portions of the inner and outer film layers 3216, 3218 (at least in portions of the reseal area), permanent or no adhesive also may be disposed in certain areas between the film layers.

Figure 36:
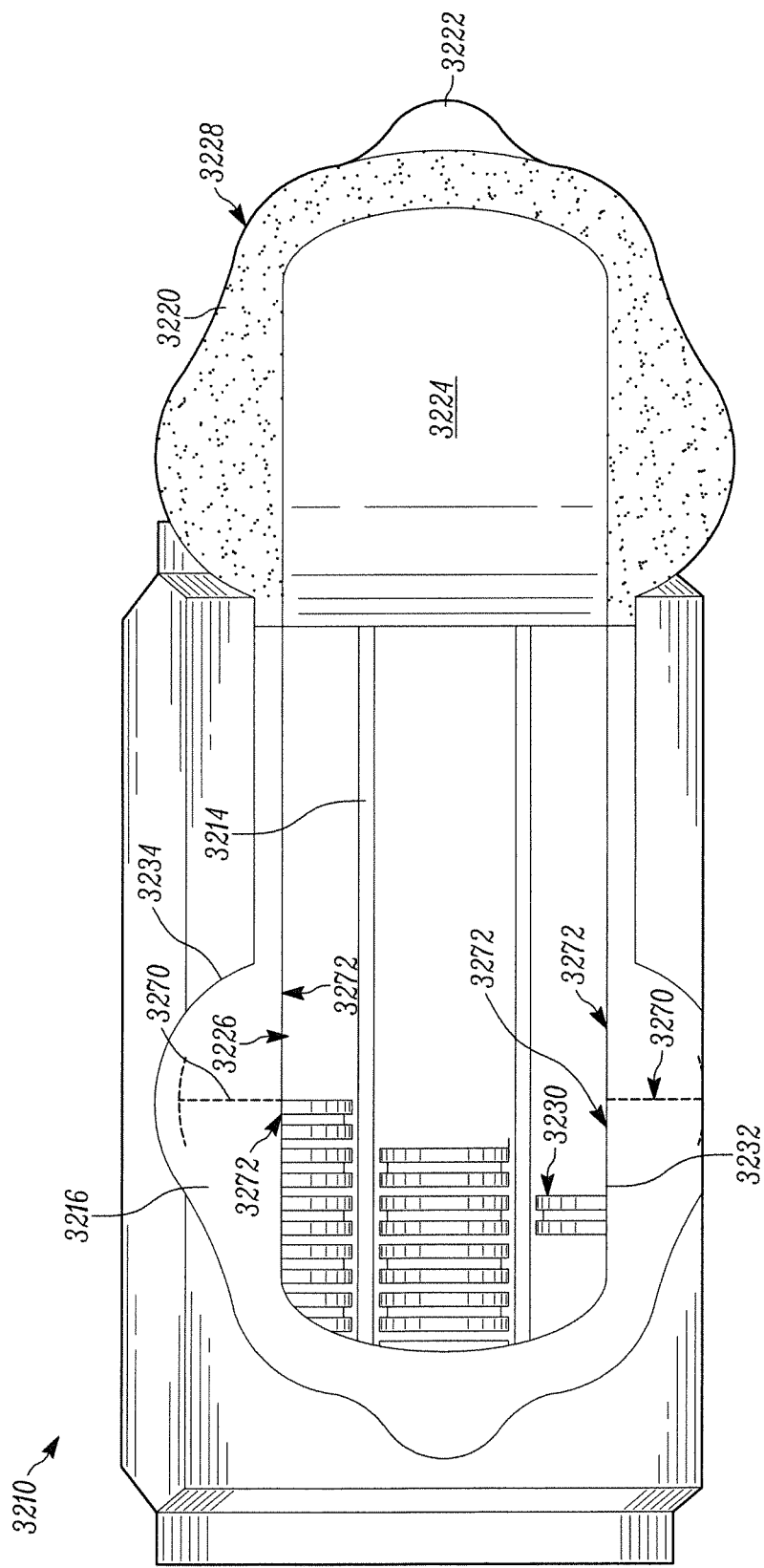
FIG. 36 comprises a top perspective view of the package of FIG. 35 in an open configuration.

Once the package 3210 is opened, as illustrated in FIG. 36, many of the food articles 3230 within the package 3210 are generally available such that they can be individually grasped and removed from the package in any order and without damage to the package or the discrete food articles. As illustrated in FIG. 36, a number of the food articles 3230 are at least partially obscured by the inner film 3216. To provide further or improved access to those food articles 3230 not easily accessible, an extension line of weakness 3270 extends from the first, access cut 3232 into the inner film layer 3216. In one illustrative approach, the extension line of weakness 3270 extends nearly orthogonal to the first, access cut 3232.

As mentioned above, the extension line of weakness typically does not automatically rupture upon initial package opening when the starter portion 3222, sealing panel 3228 and flap 3224 are lifted for the first time. Instead, after initial opening, a consumer may either apply pressure or pull on the film 3216 at the extension line of weakness 3270 to rupture, tear, or break the extension line of weakness 3270. The extension line of weakness 3270 may be mechanically or laser formed and may include a line of perforations, a score, and a partial depth cut in the film, among others. Further, the inner film layer 3216 may include indicia to indicate the location where the film should be ruptured.

Figure 37:
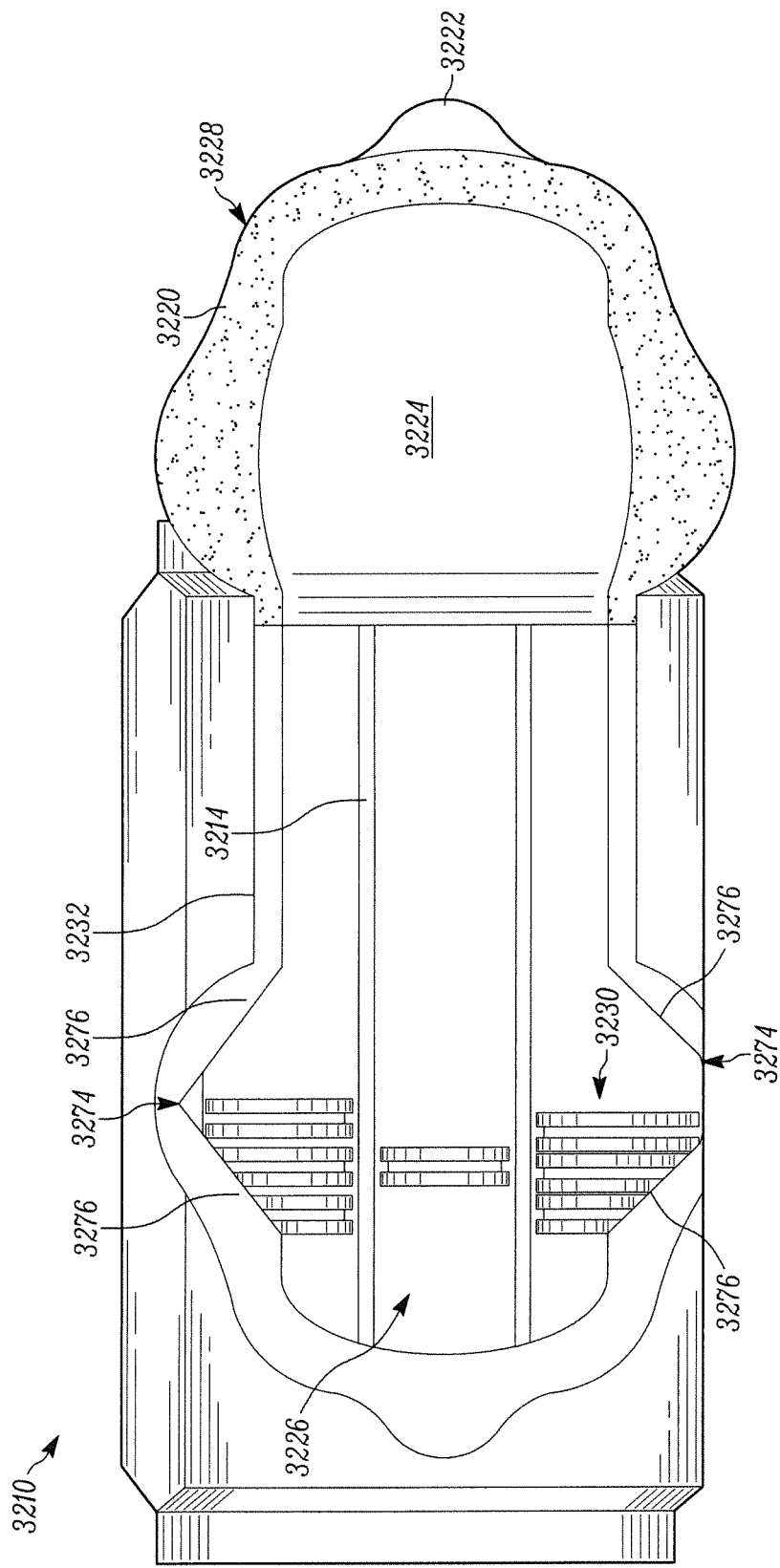
FIG. 37 comprises a top perspective view of the package of FIG. 36 in a further open configuration FIG. 38 comprises a plan view of a section of a film laminate formable into another package with an improved access opening.

Once the extension line of weakness 3270 in film 3216 is ruptured, the flaps 3272 adjacent either side of the line of weakness 3270 may drop down or may be folded underneath the remainder of the inner film layer 3216 to increase the size of the access opening 3226. As illustrated in FIG. 37, once the flaps are folded into the package 3210, the expanded opening portions 3274 provide a consumer increased access to the food articles 3230 disposed within the package 3210. Further, once the flaps 3272 are folded into the package 3210, the access opening is defined both by the inner, access cut 3232 and the fold line 3276 in the inner film layer 3216.

As mentioned above, the reseal area 3236 includes the area between the first, access cut 3232 of the inner film layer 3216 and the second, perimeter cut 3234 of the outer film layer 3218. To retain the reseal characteristic of the package, the reseal area 3236 and the second, perimeter cut 3234 extend beyond or outside of the first, access cut 3232 and the extension line of weakness 3270. As illustrated, the second, perimeter cut 3234 may have a bulbous configuration that creates a bulbous portion 3244 of the sealing layer 3228 to accommodate the extension lines of weakness 3270 on the inner film layer 3216. To prevent the extension line of weakness 3270 from continuing to rupture and damaging the package reseal capabilities, the package may include a tear-inhibiting feature 3278 adjacent to the extension line of weakness 3270. In one illustrative embodiment, the tear-inhibiting feature 3278 is an arced line at the termination of the extension line of weakness 3270.

Figure 38:
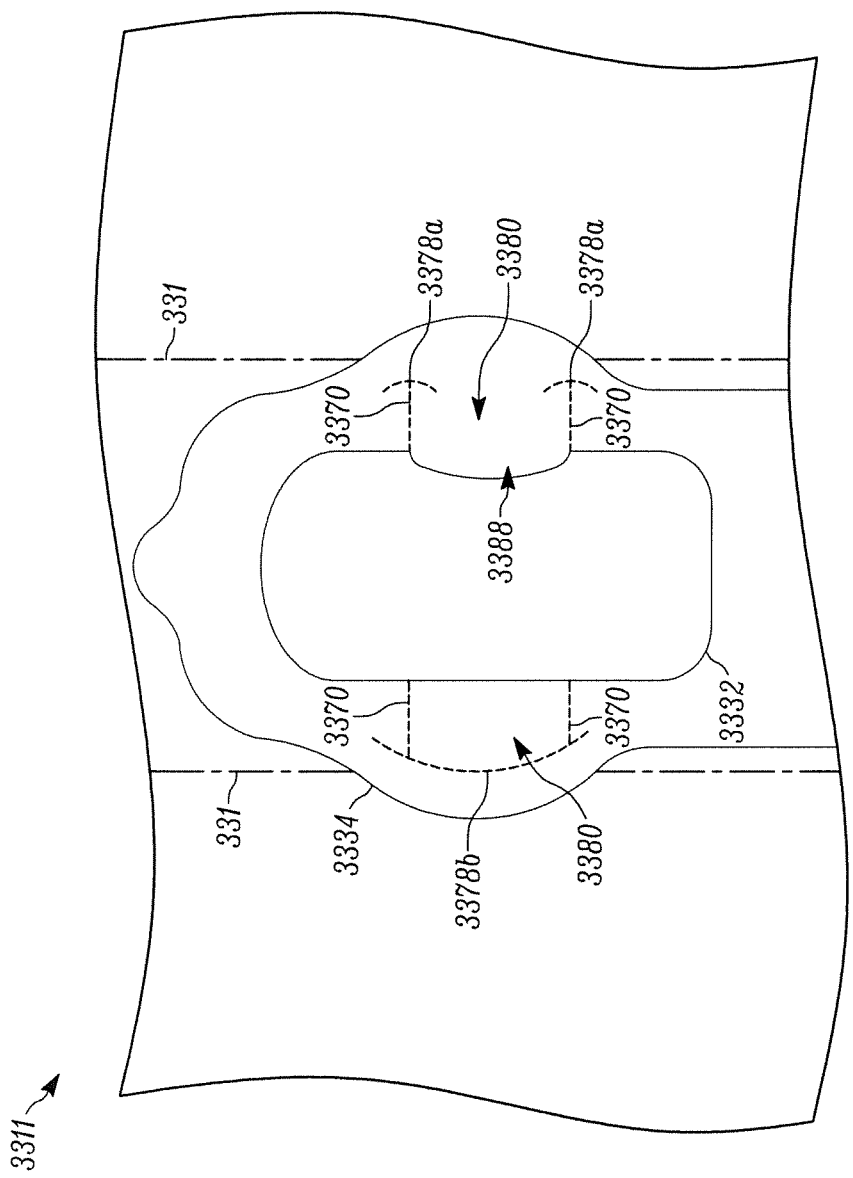
Figure 39:
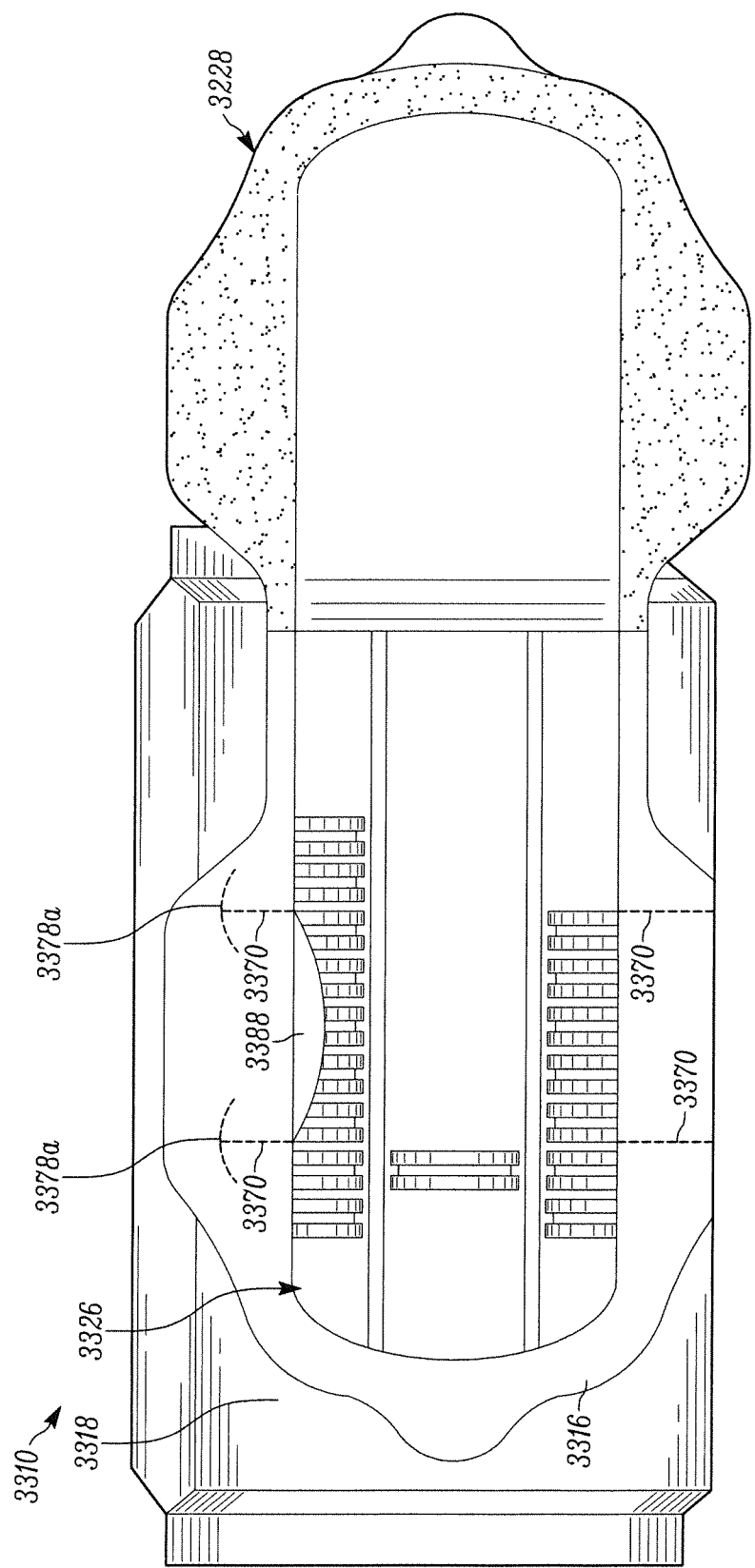
FIG. 39 comprises a top perspective view of a package incorporating the film laminate of FIG. 38 in an open configuration.
Figure 40:
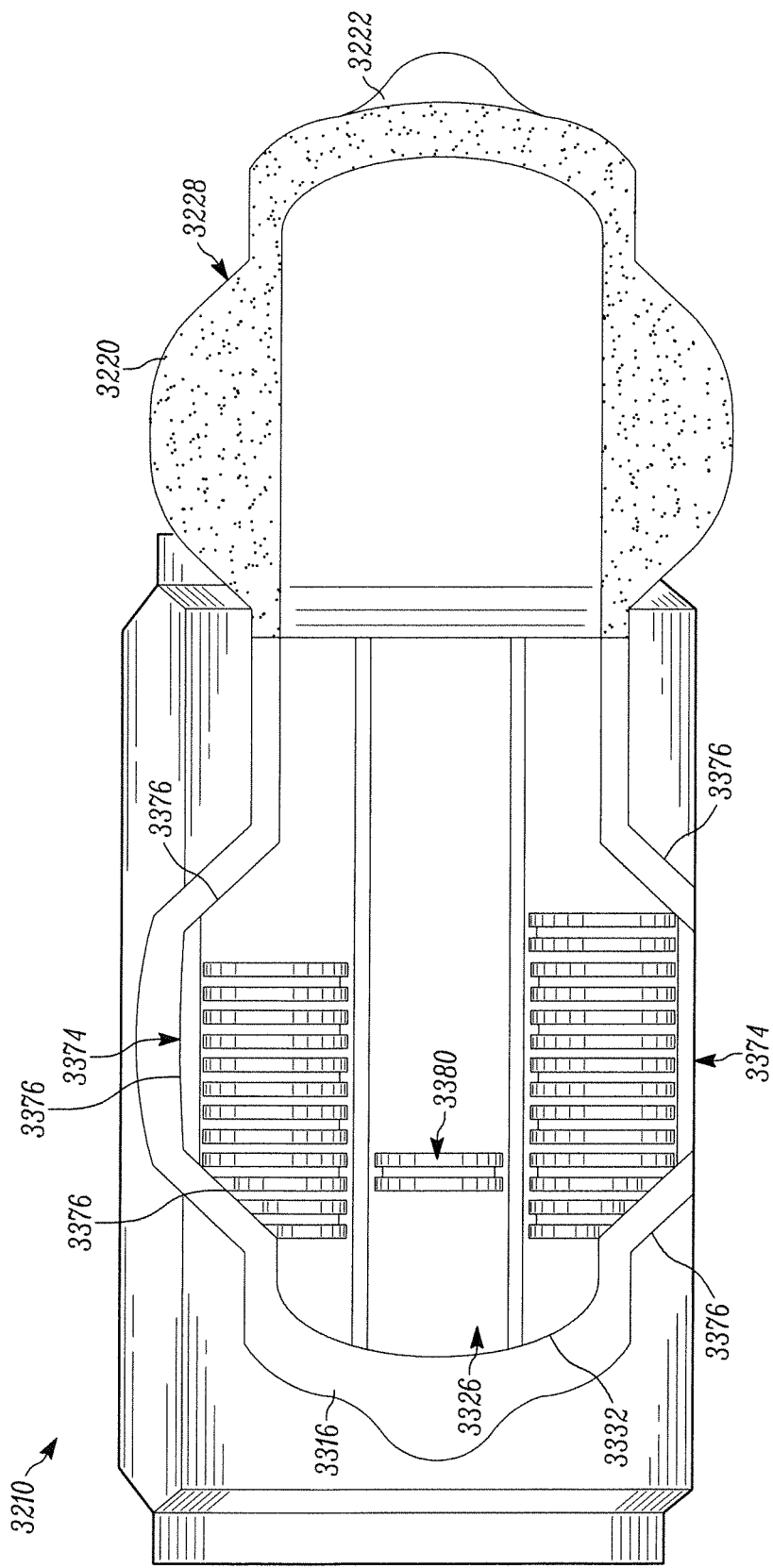
FIG. 40 comprises a top perspective view of the package of FIG. 39 in a further open configuration.

FIG. 38 illustrates another laminate 3311 that is formable into a package 3310 (FIG. 39) that may be manipulated to have an expanded access opening 3326 (FIG. 40). The fold lines 331 are depicted with a different dashed pattern than the lines of weakness 3370, 3378*a*, 3378*b* that are cut or otherwise formed into the film. Instead of a single extension line of weakness on each side of the access opening, the package 3310 includes two extension lines of weakness 3370 with an inner layer segment 3380 disposed therebetween on each side of the access opening 3326. In this manner, a consumer can push or pull upward on the inner layer segment 3380 to rupture the extension lines of weakness 3370. To further assist the consumer in rupturing the extension lines of weakness 3370, an inner layer tab 3388 (defined, in part, by the first, access cut 3332) may be located adjacent the inner layer segment 3380 and may extend into the access opening 3326 as defined by the first, access cut 3332. This inner layer tab 3388 may help highlight the location of the inner layer segment 3380 and the extension lines of weakness 3370.

Once the extension lines of weakness 3370 have been ruptured, the inner layer segment 3380 (and any associated inner layer tabs 3388) may be folded into the package 3310 to expose the expanded opening portions 3374. To prevent the extension lines of weakness 3370 from rupturing the film 3316 beyond the reseal area 3326, a tear-inhibiting feature 3378 may be disposed in the inner layer film 3316 at the end of the extension lines of weakness 3370. Further, as illustrated in FIG. 38, the tear-inhibiting feature may span a single extension line of weakness 3378*a* or may span more than one extension line of weakness 3378*b*.

As illustrated in FIG. 40, once the inner layer segments 3380 are folded underneath the remaining inner layer film 3316 and the expanded opening portions 3374 are exposed, the user may easily remove the food articles 3380 adjacent thereto without interference from the inner layer film 3316. Further, the expanded opening sections 3374 are then defined by the fold lined 3376 in the inner film layer 3316.

While FIG. 40 illustrates a package having inner layer segments 3380 folded therein to expose the expanded opening sections 3374, in other configurations, a user also may lift portions of the film around the access opening to provide additional access to the articles within the container. For example, FIGS. 5-10 illustrate packages 310, 410 with two expanded opening portions along each side of the access opening 326, 426 and a side tab disposed in between the two expanded opening portions can be lifted by a user to further expose the articles within the package.

Figure 52:
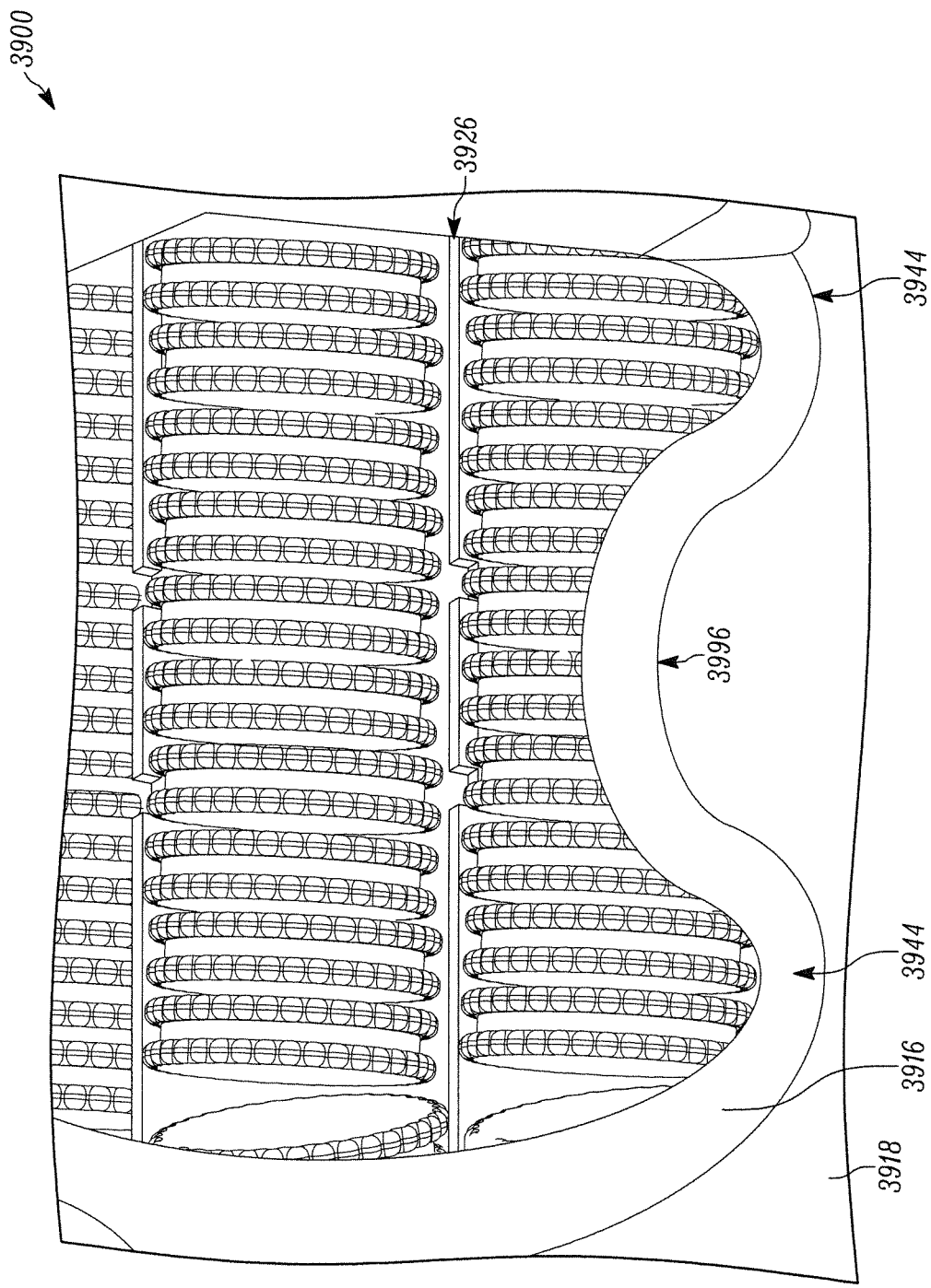
FIGS. 52 and 53 comprise top plan views of a portion of a package.
Figure 53:
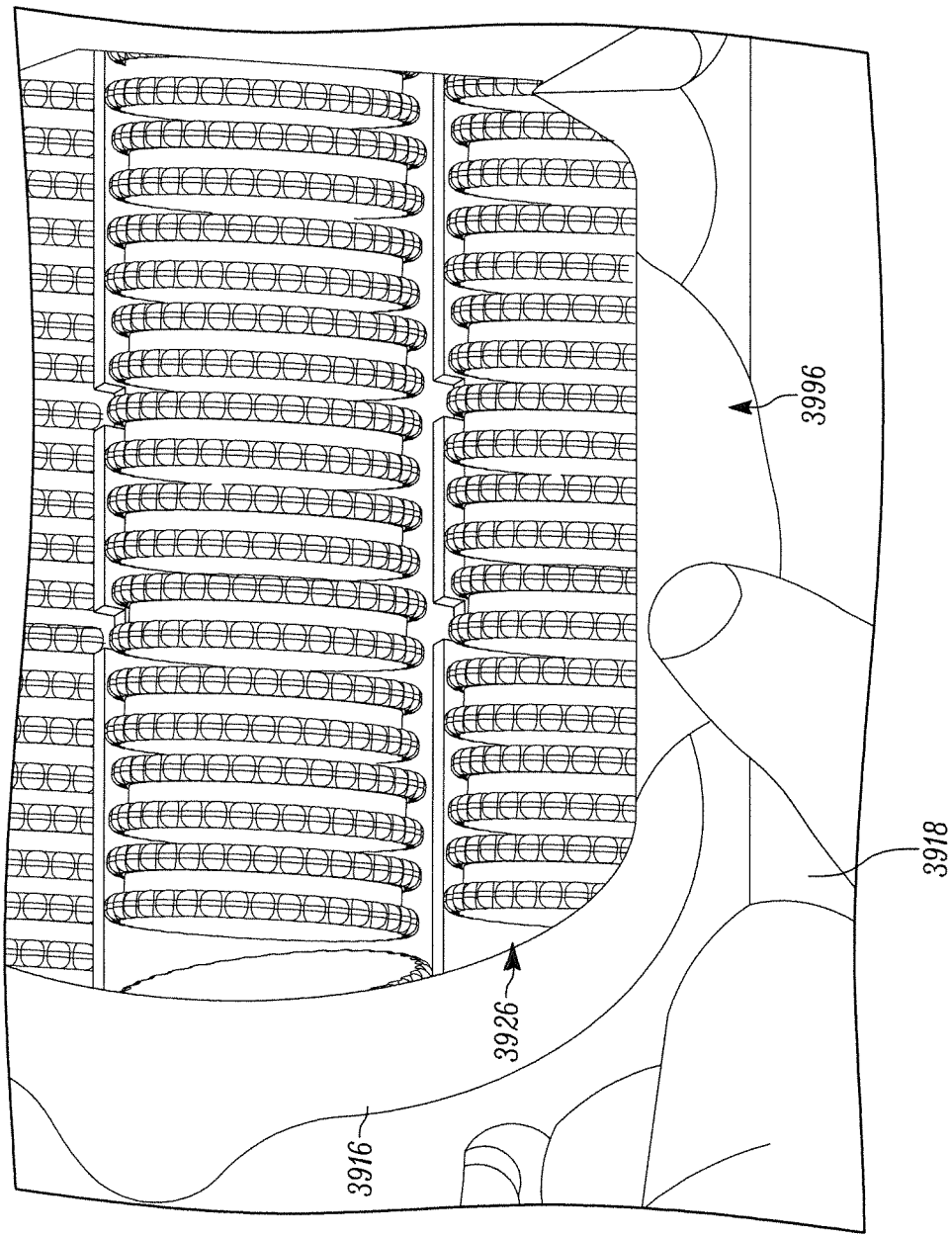

To illustrate, FIG. 52 shows a portion of a package 3910 that includes two expanded opening sections 3944 disposed on one side of the access opening 3926. Both the inner film layer and the outer film layer extend into the access opening 3926 at the location of the side tab 3996 disposed between the expanded opening portions 3944. To further provide a user access to the packaged articles, a user may grasp the side tab 3996 and lift upward, as shown in FIG. 53, to provide additional access to the packaged articles.

Figure 41:
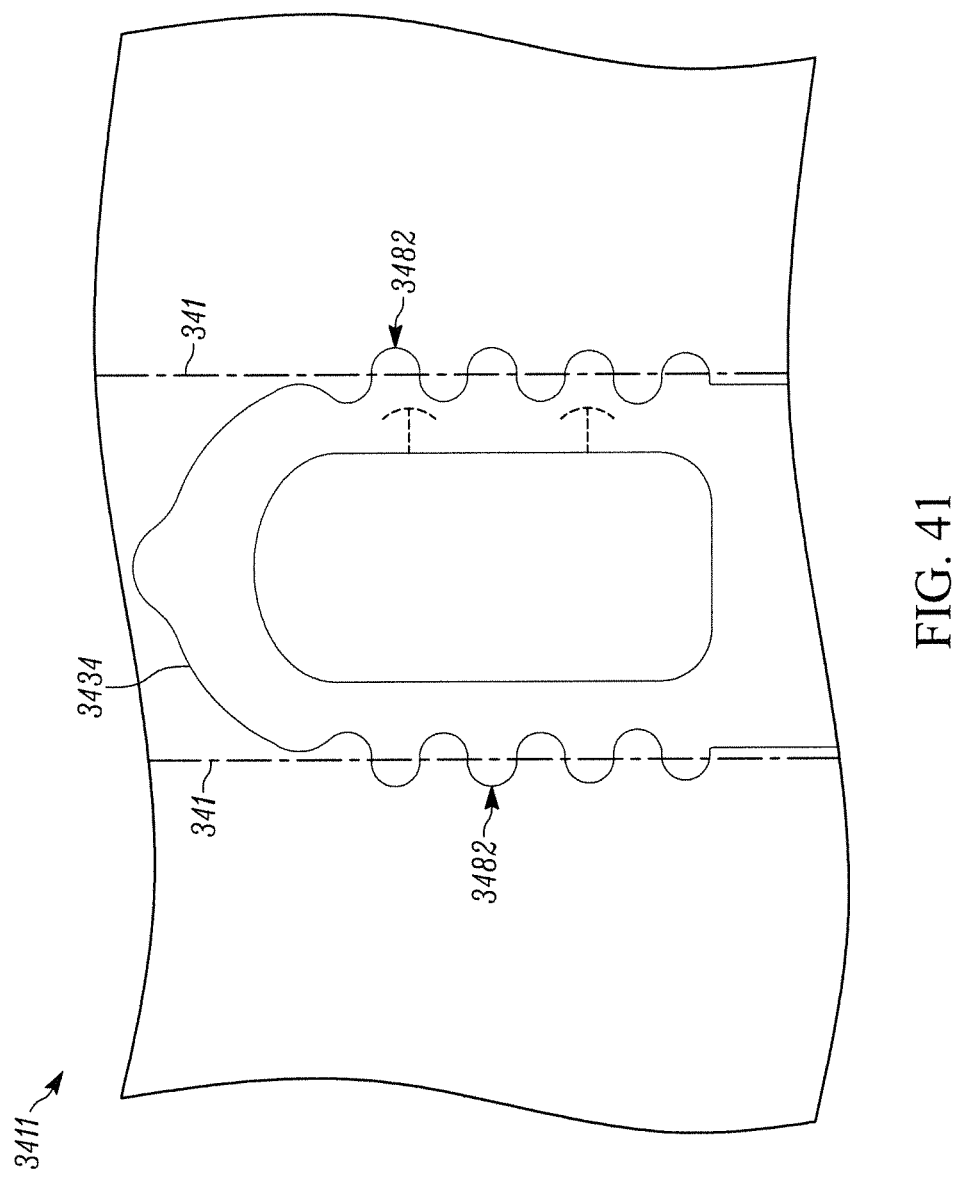
FIG. 41 comprises a plan view of a section of a film laminate formable into another package with an improved access opening.
Figure 42:
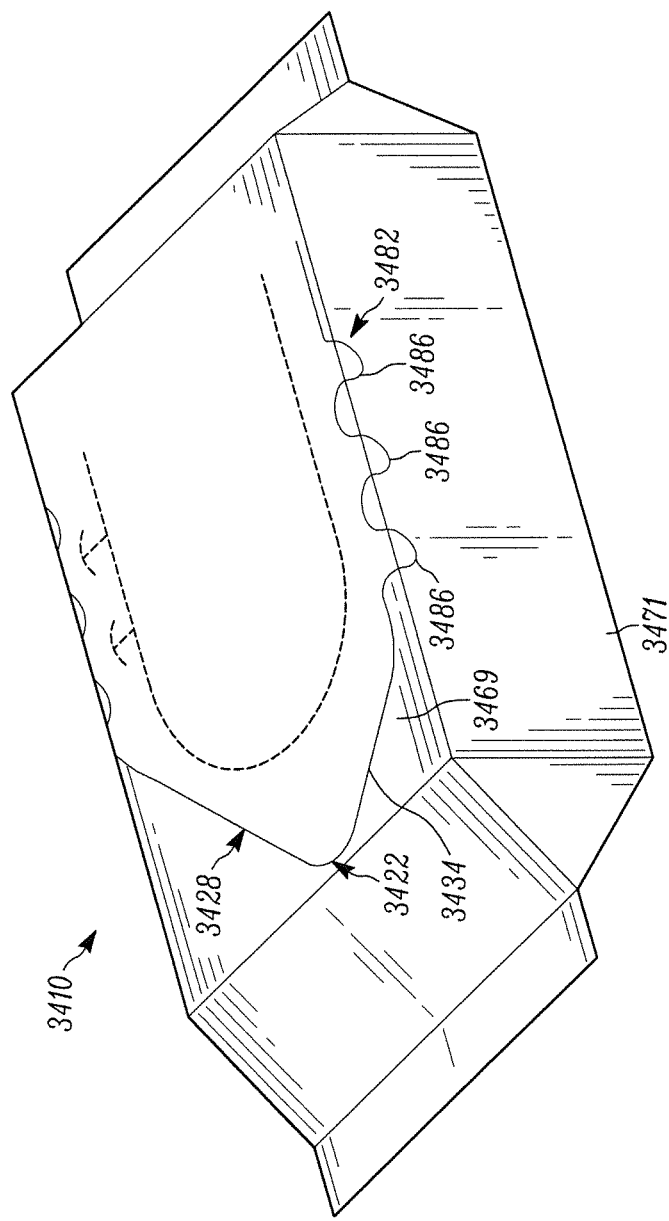
FIG. 42 comprises a side perspective view of a package incorporating the film laminate of FIG. 41 in an initial closed configuration.

FIGS. 34, 38, and 41, illustrating the laminates 3211, 3311, 3411, also indicate fold lines 321, 331, 341, respectively. The outer, perimeter cuts 3234, 3334, 3434 that define, in part, the sealing panels 3228, 3328, 3428 (FIGS. 35, 39, and 42) extend over the fold lines 321, 331, 341 such that the sealing panels 3228, 3328, 3428 and the bulbous portions of the reseal areas extend from a top to a side of the respective packages 3210, 3310, 3410. FIGS. 34, 38, and 41 illustrate the surface of the laminates 3211, 3311, 3411 that become the inside surface of the package. The perimeter cut, however, is shown in sold lines for illustrative purposes, though these would not be necessarily visually apparent on the inside surface of the laminates 3211, 3311, 3411. Further, the fold lines 321, 331, 341 employ a different dashed pattern than the lines of weakness formed in the laminate.

As mentioned above, the packages described herein may include a package integrity feature that indicates to a consumer that the package has been previously opened. One illustrative package 3410 (FIG. 42) includes an integrity feature 3482 that is formed, in part, by having a second, perimeter cut 3434 extend from a top face 3469 of the package to an adjacent side face 3471 thereof. FIG. 41 depicts a portion of the film laminate 3411 that may be formed into the package 3410, and, as illustrated, the second, perimeter cut 3434 extends over the package fold line 341 that delineates the location between the top face and the side faces of the package. Further, in one illustrative configuration, the perimeter cut 3434 has a wavy or undulating configuration.

To open the package 3410, a consumer may pull upward on the starter tab 3422 thereby lifting at least a portion of the sealing layer 3428 and inner film flap 3424 from a reminder of the package 3410 to expose the access opening 3426. Further, the portions of the sealing layer 3428 disposed on the sides of the food package, such as side extensions 3486, are released from the inner film 3416 layer upon opening, as shown in FIGS. 43 and 44.

Figure 46:
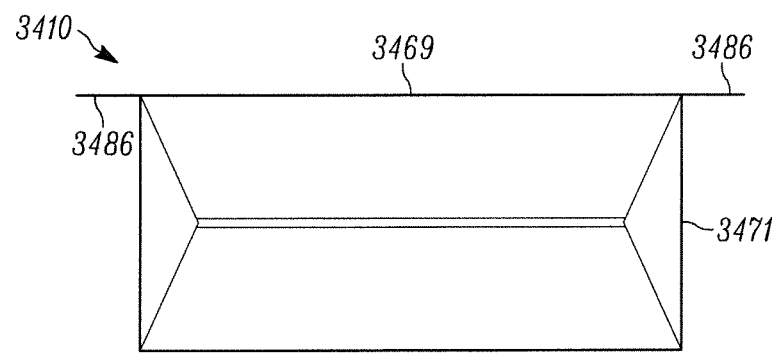
FIG. 46 comprises an end view of the package of FIG. 45.

To reseal the package 3410, the sealing layer 3428 is at least partially readhered to the top surface 3469. The sealing layer 3428, however, is not easily resealed or readhered to the side surface 3471 that it was adhered to prior to initial package opening. In operation, it is difficult for a consumer to realign the side extensions 3486 with their original positions on the inner, first film layer 3416, such that the misalignment provides a tamper indicator. Furthermore, the side extensions 3486 tend to extend directly outward from the sealing panel 3428 such that they provide a further visual indicator that the package has been previously opened. As illustrated in FIG. 46, the side extensions 3486, when not adhered to the side of the package, extend outward form a remainder of the package 3410 because the film forming the sealing panel 3428 generally attempts to regain a flat configuration. In addition, the package 3410 may not have a pressure sensitive adhesive disposed between the inner and outer films in the area of the side extensions or may have a pressure sensitive adhesive with a weaker strength than used in the remainder of the reseal area between the access and perimeter cuts. More specifically, the pressure sensitive adhesive disposed in that area may not be disposed in the same concentration or in the same amount as elsewhere in the areas forming the reseal area.

Figure 43:
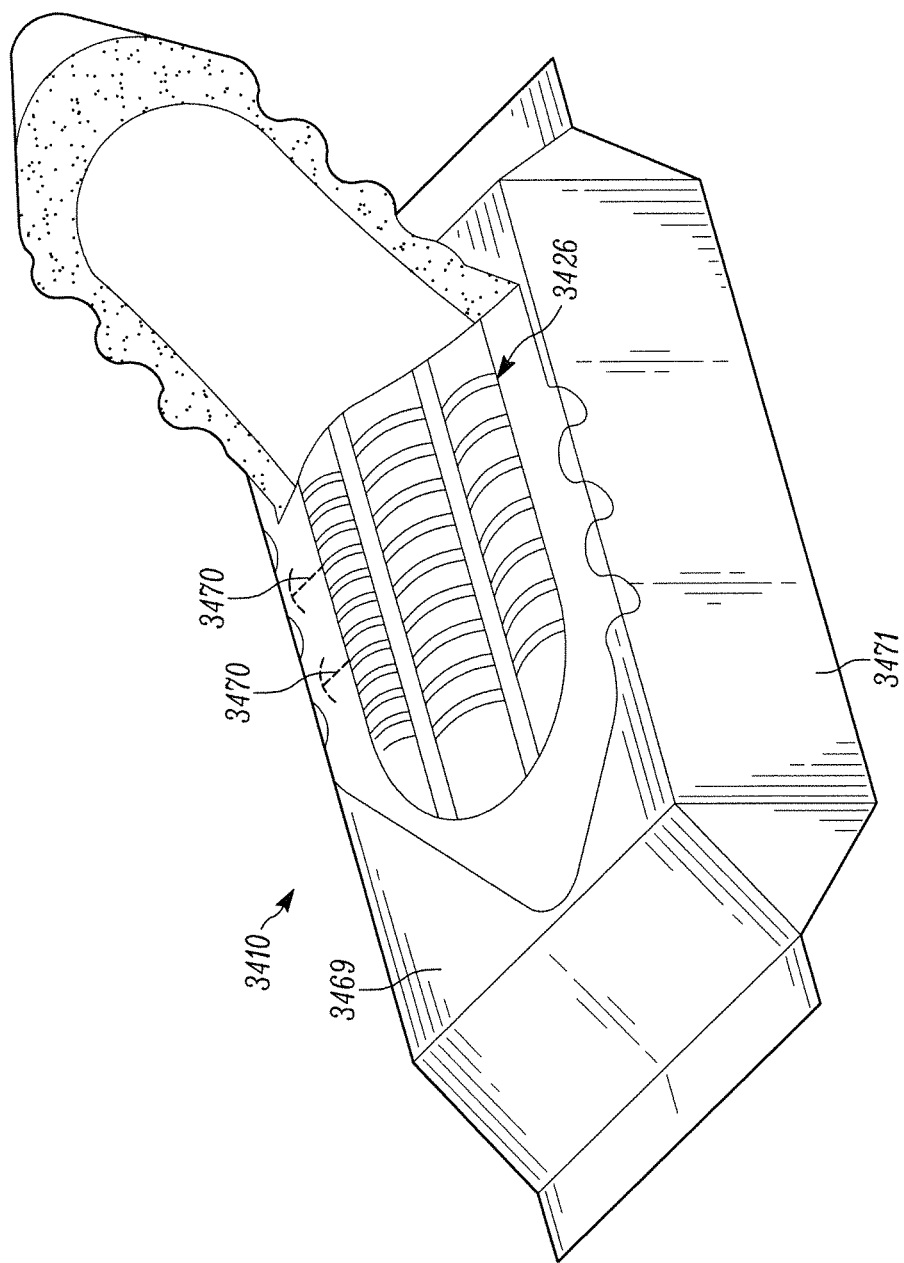
FIG. 43 comprises a side perspective of the package of FIG. 42 in an open configuration.
Figure 44:
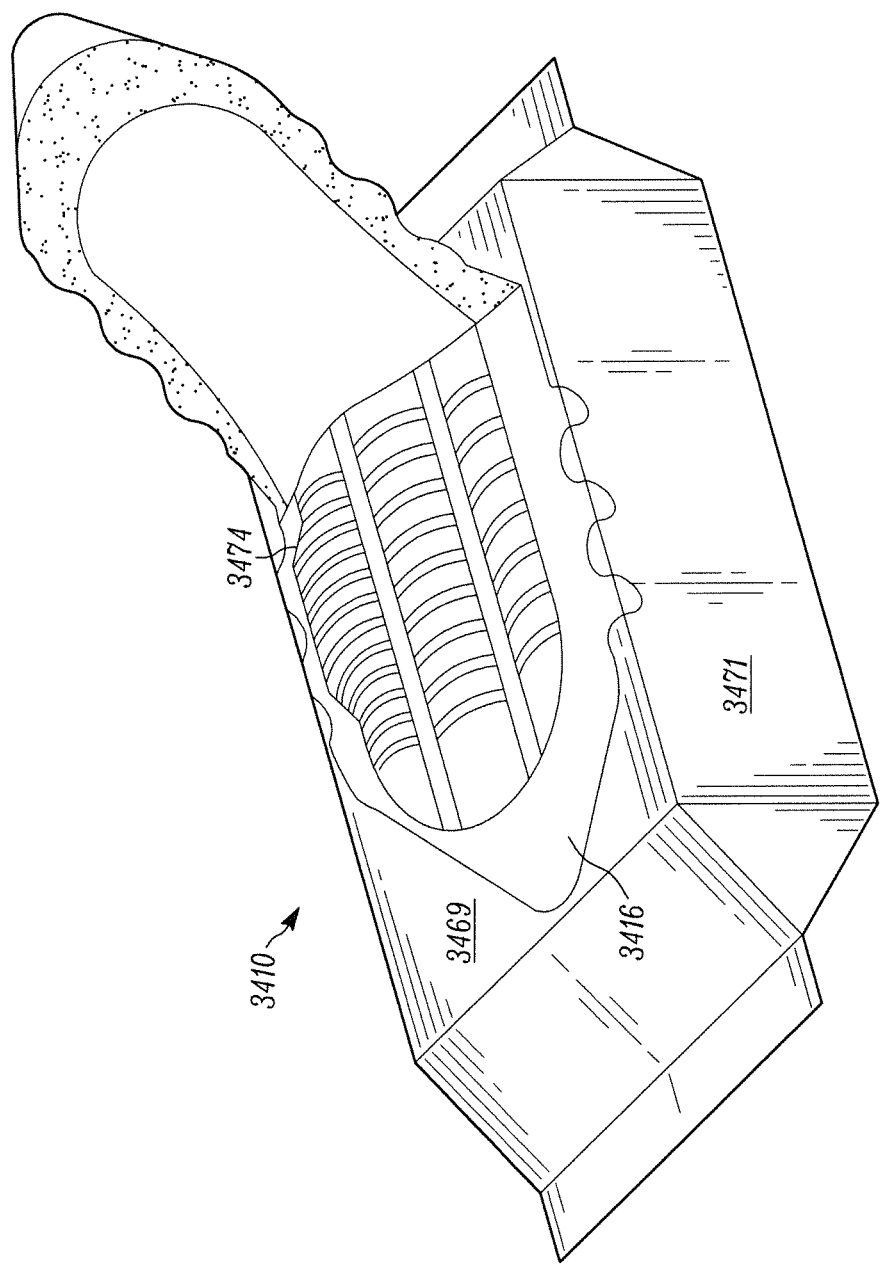
FIG. 44 comprises a top perspective of the package of FIG. 42 in a further open configuration.
Figure 45:
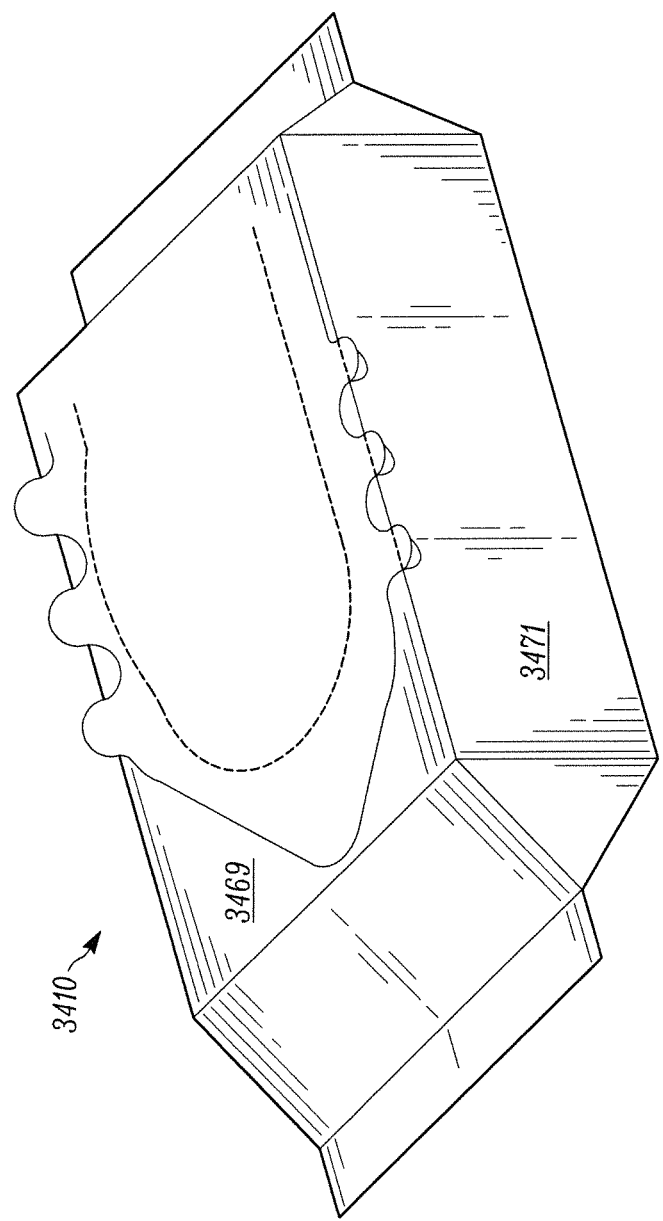
FIG. 45 comprises a top perspective view of the package of FIG. 42 is a closed configuration, after initial opening.

As illustrated in FIGS. 41-45, the extension lines of weakness described in previous embodiments may be incorporated into a package with sealing layer extension integrity feature. As illustrated in FIG. 43, after initial opening the extension lines of weakness 3470 are not automatically ruptured, but may be manually torn to expose the expanded opening sections 3474. The access opening 3426 with an expanded opening portions 3474 on one side thereof is illustrated in FIG. 44.

Figure 47:
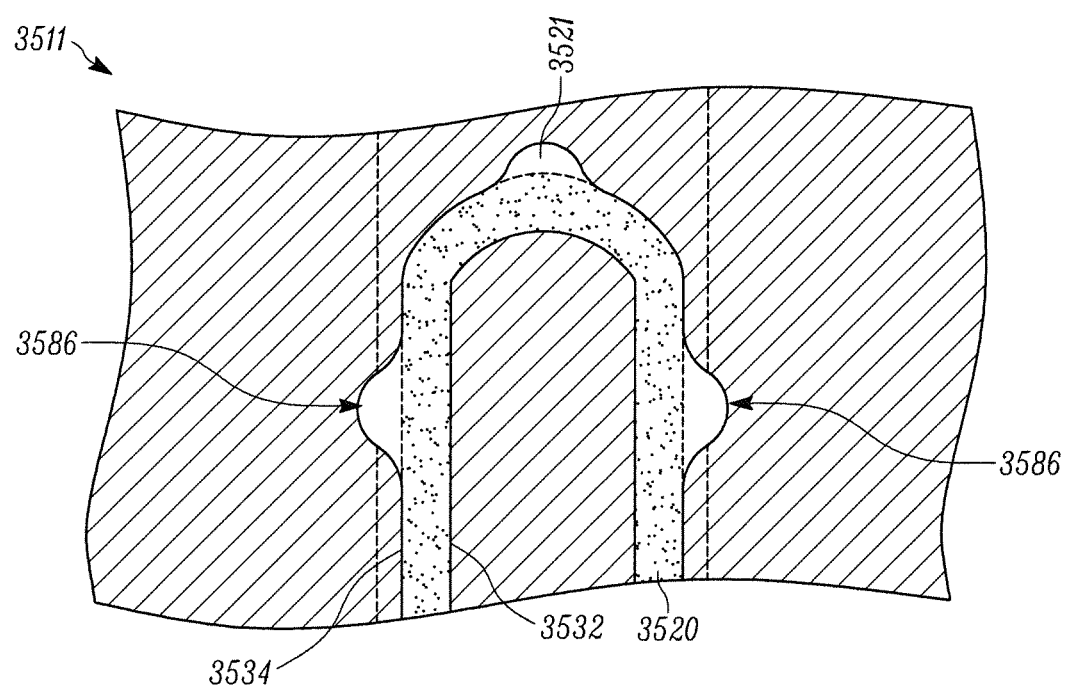
FIG. 47 comprises a plan view of a section of film laminate formable into a package with a package integrity feature.
Figure 48:
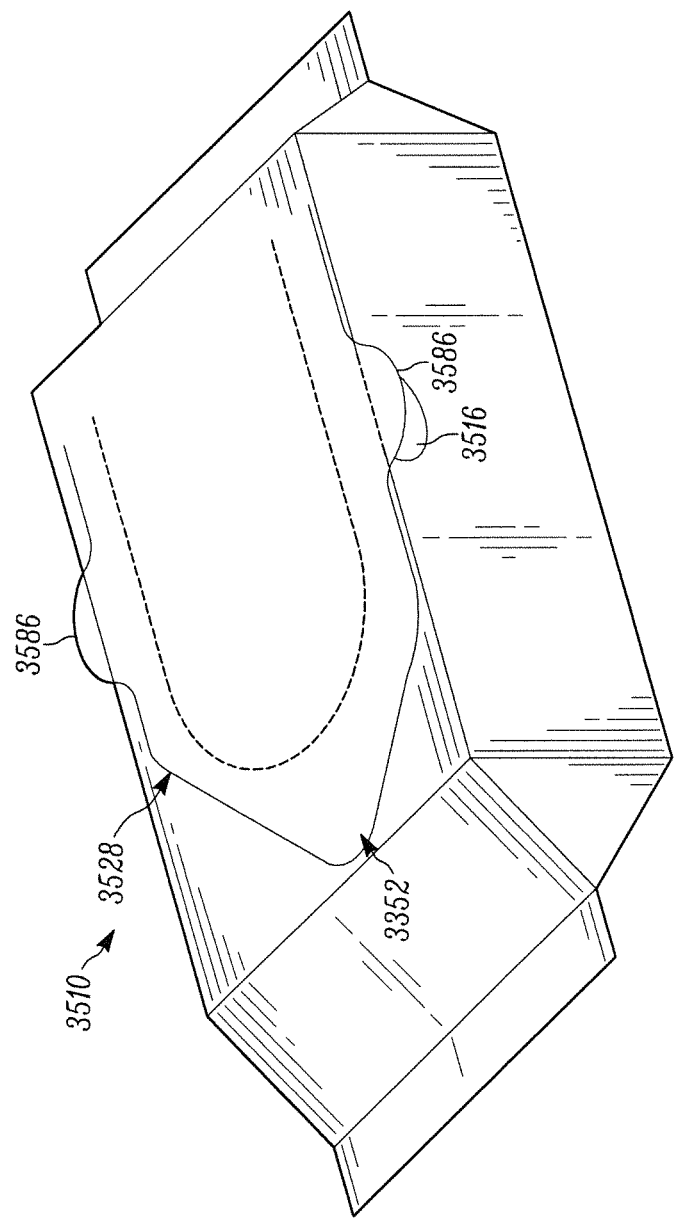
FIG. 48 comprises a side perspective of a package incorporating the laminate of FIG. 47 in a closed configuration, after initial opening.

FIG. 47 illustrates a laminate 3511 with inner and outer film layers that may be formed into the package 3510 shown in FIG. 48. Similar to those previously described, laminate 3511 illustrates both the first, access cut 3532 and the second, perimeter cut 3534 in solid lines, though both may not be visible from one side of the laminate. FIG. 47 also depicts where the pressure sensitive adhesive 3520 will be disposed in between the access cut 3532 and the perimeter cut 3534. In addition to the pressure sensitive adhesive 3520 disposed in between the cuts 3532, 3534, the laminate may include a permanent or pressure sensitive adhesive in between the inner and outer film layers in other sections, shown in cross hatching. As shown in FIG. 47, there are three areas without adhesive disposed between the film layers. The first area 3521 becomes the starter portion 3522 (FIG. 48) that can be grasped by a user to open the package. The bulbous areas along the sides of the cut 3534 that eventually forms the sealing panel 3528 also do not have adhesive. More specifically, the portion of the film where the side extensions 3586 are subsequently disposed may not have any adhesive disposed between the inner and outer film layers. In this manner, after the package is opened and reclosed, as shown in FIG. 48, the side extensions 3586 do not readhere to the inner film layer 3516. In a similar embodiment, the areas forming the side extensions 3586 may have weaker or less adhesive than the other areas forming the package reseal area.

Figure 49:
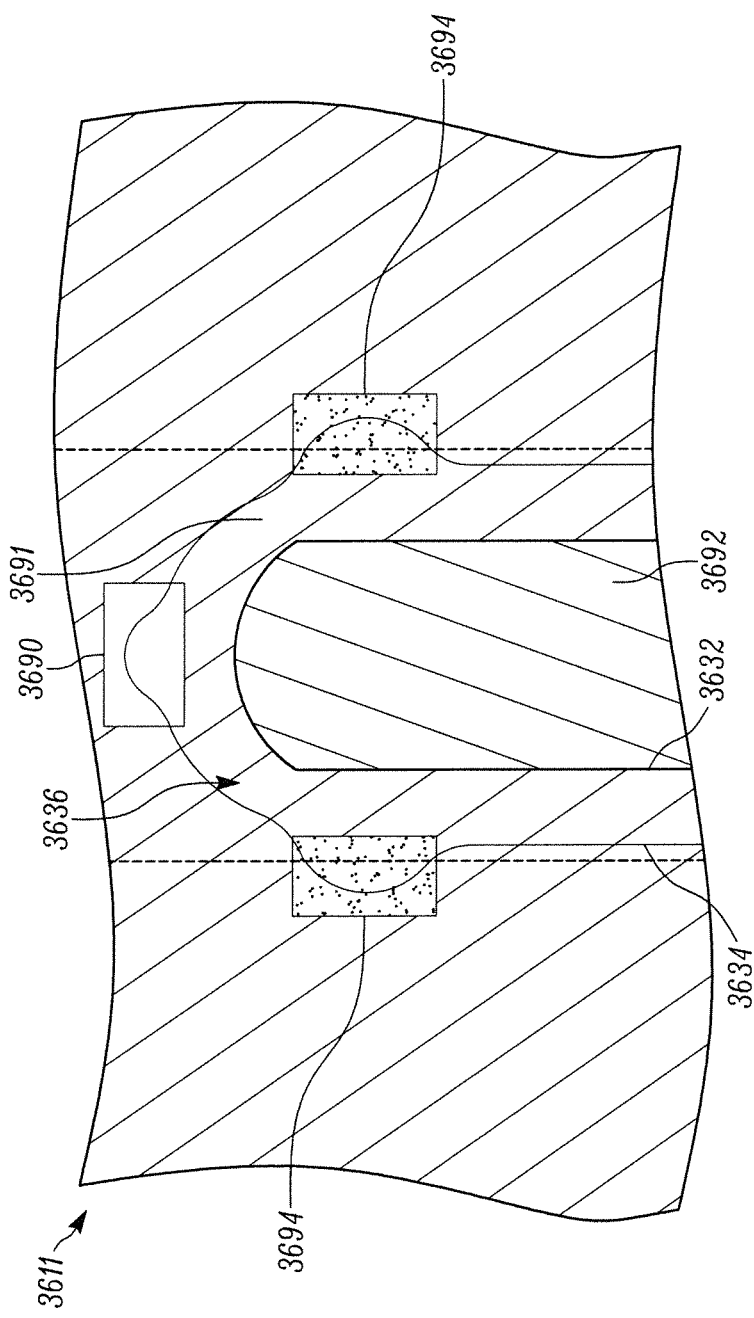
FIG. 49 comprises a plan view of a section of a film laminate formable into another package with a package integrity feature.
Figure 50:
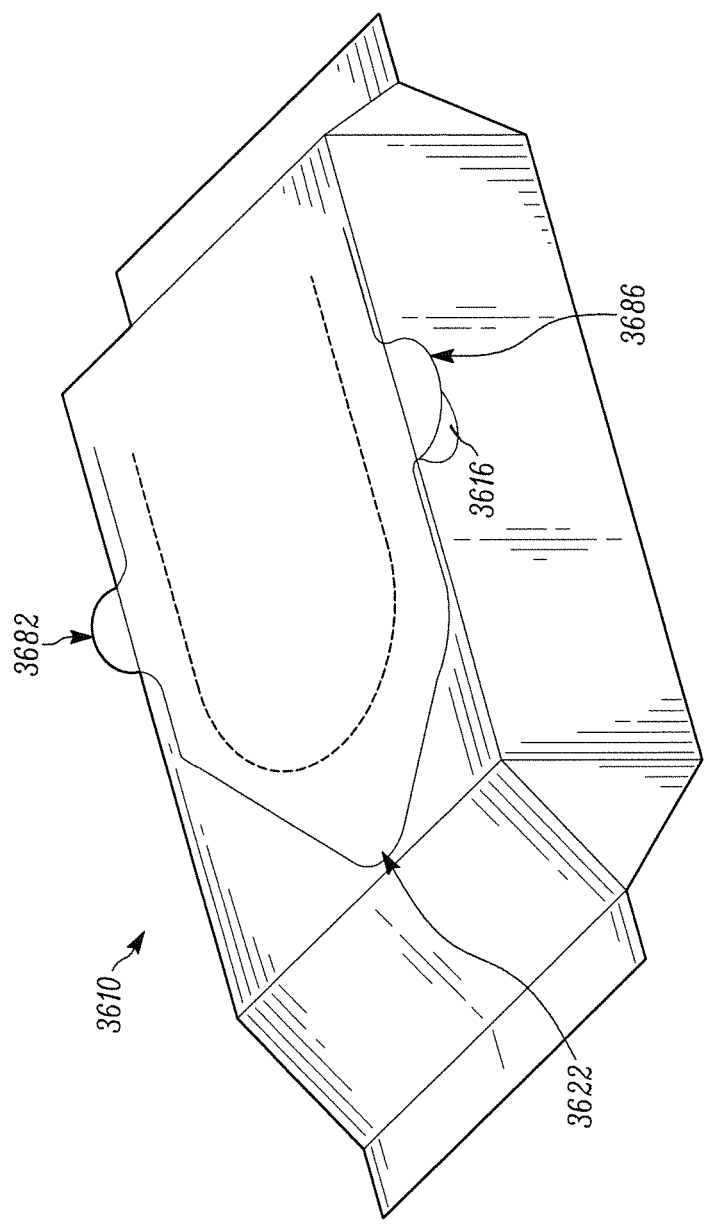
FIG. 50 comprises a side perspective of a package incorporating the laminate of FIG. 49 in an initial closed configuration.
Figure 51:
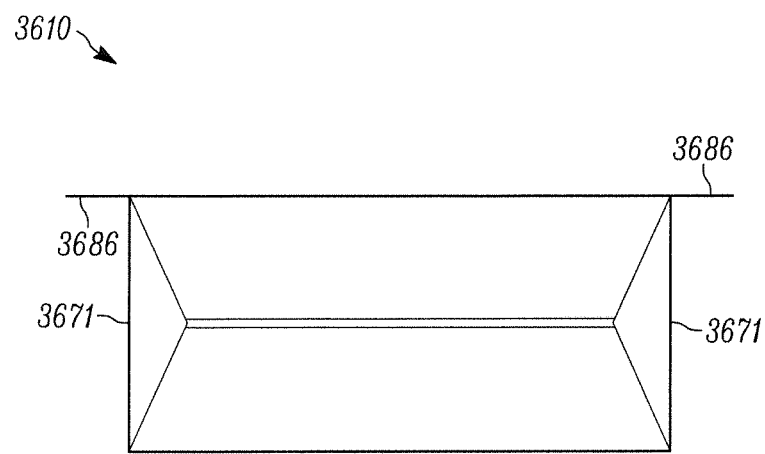
FIG. 51 comprises an end view of the package of FIG. 50 in the closed configuration, after initial opening.

FIG. 49 illustrates another laminate configuration 3611 with inner and outer film layers that may be formed into package 3610. Laminate 3611 illustrates both the first, access cut 3632 and second, perimeter cut 3634 in solid lines for clarity purposes, though both may not be visible from one side of the laminate. The laminate 3611 includes a portion 3690 that does not have any adhesive between the inner and outer film layers. This portion 3690 subsequently becomes the starter portion 3622 (FIG. 50) when the package 3610 is formed. A reseal adhesive is disposed between the inner and outer film layers in the area designated 3691, which includes a large portion of the reseal area between the access cut 3632 and the perimeter cut 3634 and much of the area outside of the perimeter cut 3634. The laminate 3611 further includes a permanent adhesive in the area 3692 that forms the flap defined by the access cut 3632. In addition, the laminate 3611 includes a weaker pressure sensitive adhesive disposed in areas 3694 or possibly a pressure sensitive adhesive of the same strength as that disposed in section 3691, but in a lighter coating. In this manner, the adhesive disposed in area 3694 is weaker than the adhesive disposed in a majority of the reseal area 3636. This weaker bond permits the side extensions 3686 to remain attached to the inner film layer 3616 prior to initial opening, but does not provide sufficient bonding subsequent to initial package opening to reseal the side extensions 3686 after initial opening. In this manner, the side extensions 3686 extend from the sides 3671 of the package thereby indicating that the package 3610 has been previously opened, as illustrated in FIG. 51.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed:

1. A food package comprising:
a tray with at least one article disposed in at least one row;
a film forming at least a top of the food package;
an access opening disposed in the top of the food package, the access opening defined by a cut in the film forming a flap;
a sealing layer adhesively sealed to the film around the access opening;
a reseal area at least partially surrounding the access opening and against which the sealing layer is reclosable; and
a starter portion graspable by a consumer thereby permitting the flap to be released from a remainder of the top to expose the access opening; and
wherein the access opening comprises a front portion cut into the film adjacent the starter portion of the sealing layer and a pair of opposing side portions cut into the film and defining an expanded opening section having a width greater than an adjacent width on both sides thereof, the expanded opening section facilitating removal of the at least one article therethrough and wherein a distance between the cut forming the pair of opposing side portions and a perimeter of the sealing layer at the expanded opening section is not smaller than 0.125-inch, wherein each of the opposing side portions of the cut have an arcuate portion that bows outwardly toward an adjacent edge of the top of the package.

2. The food package of claim 1 wherein the reseal area is narrower adjacent the expanded opening section as compared to both sides thereof.

3. The food package of claim 1 wherein the at least one article comprises discrete food articles and the tray is configured to permit the discrete food articles to move longitudinally within a row of the tray to permit the discrete food articles to advance into position underneath the expanded opening section.

4. The food package of claim 1 wherein the reseal area is defined by the cut forming the access opening and a perimeter of the sealing layer around the access opening, the reseal area having a pair of arcuate portions where the front portion cut into the film adjacent the starter portion joins the pair of opposing side portions cut into the film, the pair of arcuate portions disposed not less than 0.5-inch from an end of the tray adjacent the starter portion.

5. The food package of claim 1 wherein the access opening has a centerline that is non-linear.

6. The food package of claim 1 wherein the cut defining the pair of opposing side portions of the access opening replicate one another.

7. The food package of claim 1 wherein the cut defining the pair of opposing side portions of the access opening are symmetrical with one another.

8. The food package of claim 1 wherein the sealing layer is defined by a perimeter cut that corresponds to an overall shape of the cut defining the access opening such that the perimeter cut and the cut in the film have equivalent configurations.

9. The food package of claim 8 wherein the reseal area has a reseal width that varies such that the distance between the perimeter cut of the sealing layer and the cut into the film is not uniform along a length of the pair of opposing side portions of the access opening.

10. The food package of claim 9 wherein a pull force required to release the sealing layer from the film varies along the length of the pair of opposing side portions of the access opening and corresponds to the reseal width.

11. The food package of claim 1 wherein the cut defining the access opening extends outwardly toward an adjacent top edge of the package and at least to an inner edge of a flange of the tray at the expanded opening section such that the at least one article within the at least one row disposed underneath the expanded opening section is capable of being removed therefrom unimpeded by the film of the food package.

12. The food package of claim 1 wherein the cut defining the access opening extends at least to one of the sidewalls of the tray.

13. The food package of claim 12 wherein the at least one article comprises discrete food articles and wherein the front portion of the access opening is disposed at least one of perpendicular to an array of the discrete food articles or parallel to an array of the discrete food articles.

14. The food package of claim 1 further comprising an extension line of weakness extending from the access cut into the film, the extension line of weakness being unruptured prior to initial package opening such that the extension line of weakness does not automatically rupture upon initial opening and requiring that the extension line of weakness be manually ruptured to expand the access opening.

15. The food package of claim 14 wherein the extension line of weakness has a tear-inhibiting feature and wherein the sealing layer has a bulbous portion such that the sealing layer extends outward to extend beyond the tear-inhibiting feature thereby retaining the resealability of the package subsequent to rupture of the extension line of weakness.

16. A food package comprising:
a tray with at least one article disposed in at least one row;
a film forming at least a top of the food package;
an access opening disposed in the top of the food package, the access opening defined by a cut in the film forming a flap;
a sealing layer adhesively sealed to the film around the access opening;
a reseal area at least partially surrounding the access opening and against which the sealing layer is reclosable; and
a starter portion graspable by a consumer thereby permitting the flap to be released from a remainder of the top to expose the access opening; and
wherein the access opening comprises a front portion cut into the film adjacent the starter portion of the sealing layer and a pair of opposing side portions cut into the film and defining an expanded opening section having a width greater than an adjacent width on both sides thereof, the expanded opening section facilitating removal of the at least one article therethrough and wherein a distance between the cut forming the pair of opposing side portions and a perimeter of the sealing layer at the expanded opening section is not smaller than 0.125-inch,
wherein the at least one article comprises discrete food articles and wherein the tray is configured to permit the discrete food articles to move longitudinally and laterally therein.

17. The food package of claim 16 wherein the reseal area is at least one of:
narrower adjacent the expanded opening section as compared to both sides thereof;
defined by the cut forming the access opening and a perimeter of the sealing layer around the access opening, the reseal area having a pair of arcuate portions where the front portion cut into the film adjacent the starter portion joins the pair of opposing side portions cut into the film, the pair of arcuate portions disposed not less than 0.5-inch from an end of the tray adjacent the starter portion; and
configured with a reseal width that varies such that the distance between the perimeter of the sealing layer and the cut into the film is not uniform along a length of the pair of opposing side portions of the access opening, wherein a pull force required to release the sealing layer from the film varies along the length of the pair of opposing side portions of the access opening and corresponds to the reseal width.

18. The food package of claim 16 wherein the tray is configured to permit the discrete food articles to move longitudinally within a row of the tray to permit the discrete food articles to advance into position underneath the expanded opening section.

19. The food package of claim 16 wherein the access opening has a centerline that is non-linear.

20. The food package of claim 16 wherein the sealing layer is defined by a perimeter cut that corresponds to an overall shape of the cut defining the access opening such that the perimeter cut and the cut in the film have equivalent configurations.

21. The food package of claim 16 wherein the cut defining the access opening is at least one of:

extending outwardly toward an adjacent top edge of the package and at least to an inner edge of a flange of the tray at the expanded opening section such that the discrete food articles within the at least one row disposed underneath the expanded opening section are capable of being removed therefrom unimpeded by the film of the food package;

extending at least to one of the sidewalls of the tray; and extending from a first side of the package to a second side of the package and over the top and defining the flap that is liftable to expose the access opening, the tray having a side wall disposed around a perimeter of the tray and an interior wall forming the at least two rows, the interior wall having tray openings therein permitting the discrete food articles disposed in one row of the tray to move into another of the rows of the tray without being removed from the package.

22. A food package comprising:

a tray with at least one article disposed in at least one row;

a film forming at least a top of the food package;

an access opening disposed in the top of the food package, the access opening defined by a cut in the film forming a flap;

a sealing layer adhesively sealed to the film around the access opening;

a reseal area at least partially surrounding the access opening and against which the sealing layer is reclosable; and a starter portion graspable by a consumer thereby permitting the flap to be released from a remainder of the top to expose the access opening; and wherein the access opening comprises a front portion cut into the film adjacent the starter portion of the sealing layer and a pair of opposing side portions cut into the film and defining an expanded opening section having a width greater than an adjacent width on both sides thereof, the expanded opening section facilitating removal of the at least one article therethrough and wherein a distance between the cut forming the pair of opposing side portions and a perimeter of the sealing layer at the expanded opening section is not smaller than 0.125-inch, wherein the cut forming the access opening extends from a first side of the package to a second side of the package and over the top and defining the flap that is liftable to expose the access opening; and wherein the tray has a side wall disposed around a perimeter of the tray and an interior wall forming at least two rows, the interior wall having tray openings therein permitting the at least one article disposed in one row of the at least two rows of the tray to move into another of the at least two rows of the tray without being removed from the package.

23. The food package of claim 22 wherein the reseal area is at least one of:

narrower adjacent the expanded opening section as compared to both sides thereof;

defined by the cut forming the access opening and a perimeter of the sealing layer around the access opening, the reseal area having a pair of arcuate portions where the front portion cut into the film adjacent the starter portion joins the pair of opposing side portions cut into the film, the pair of arcuate portions disposed not less than 0.5-inch from an end of the tray adjacent the starter portion; and configured with a reseal width that varies such that the distance between the perimeter of the sealing layer and the cut into the film is not uniform along a length of the pair of opposing side portions of the access opening, wherein a pull force required to release the sealing layer from the film varies along the length of the pair of opposing side portions of the access opening and corresponds to the reseal width.

24. The food package of claim 22 wherein the at least one article comprises discrete food articles and the tray is configured to permit the discrete food articles to move longitudinally and laterally therein to permit the discrete food articles to advance into position underneath the expanded opening section.

25. The food package of claim 22 wherein the access opening has a centerline that is non-linear.

26. The food package of claim 22 wherein the sealing layer is defined by a perimeter cut that corresponds to an overall shape of the cut defining the access opening such that the perimeter cut and the cut in the film have equivalent configurations.

27. The food package of claim 22 wherein the cut defining the access opening is at least one of:

extending outwardly toward an adjacent top edge of the package and at least to an inner edge of a flange of the tray at the expanded opening section such that the at least one article within the at least one row disposed underneath the expanded opening section is capable of being removed therefrom unimpeded by the film of the food package; and extending at least to one of the sidewalls of the tray.

* * * * *